(12) United States Patent
Happel

(10) Patent No.: US 10,926,199 B1
(45) Date of Patent: Feb. 23, 2021

(54) ROUND BAFFLE BOX WATER TREATMENT SYSTEM WITH AT LEAST ONE SIDEWALL BAFFLE

(71) Applicant: Oldcastle Infrastructure, Inc., Auburn, WA (US)

(72) Inventor: Tom Happel, Cocoa, FL (US)

(73) Assignee: Oldcastle Infrastructure, Inc., Auburn, WA (US)

( * ) Notice: Subject to any disclaimer, the term of this patent is extended or adjusted under 35 U.S.C. 154(b) by 0 days.

(21) Appl. No.: 16/211,671

(22) Filed: Dec. 6, 2018

Related U.S. Application Data

(63) Continuation-in-part of application No. 16/104,737, filed on Aug. 17, 2018, now Pat. No. 10,238,993, (Continued)

(51) Int. Cl.
*E03F 5/14* (2006.01)
*B01D 21/00* (2006.01)
(Continued)

(52) U.S. Cl.
CPC ..... *B01D 21/0042* (2013.01); *B01D 21/0045* (2013.01); *B01D 21/0048* (2013.01);
(Continued)

(58) Field of Classification Search
CPC . E03F 5/0403; E03F 5/101; E03F 5/14; E03F 5/16; B01D 21/0042; B01D 21/0087; B01D 21/2405; B01D 21/2472
(Continued)

(56) References Cited

U.S. PATENT DOCUMENTS

| 122,209 A | 12/1871 | Ashman |
| 232,948 A | 10/1880 | Dernham |
| (Continued) | | |

FOREIGN PATENT DOCUMENTS

| CA | 2455239 | 7/2005 |
| JP | 2004353407 | 12/2004 |

OTHER PUBLICATIONS

Rising and Non-Rising Stem, Telescoping Valves, Halliday Products, retrieved on Jun. 15, 2009, retrieved from www.hallidayproducts.com/ssg.html, 4 pages.
(Continued)

*Primary Examiner* — Christopher Upton
(74) *Attorney, Agent, or Firm* — Brian Steinberger; Hilary F. Steinberger; Law Offices of Brian S. Steinberger, P.A.

(57) ABSTRACT

Vertically oriented cylindrical vaults, boxes, systems, and methods of treatment systems to capture pollutants from storm water runoff and prevent the conveyance of these pollutants from entering a receiving water body or landscape area, which is designed to be a part of a local permanent storm water drainage infrastructure. A flow deflector can include a flow spreader for splitting an incoming flow into two flow paths that interact with high profile vertical baffle(s), and with low profile vertical baffles, and angled low profile vertical baffles that extend above downwardly inclined surfaces of a horizontal deflector having an opening for allowing debris to fall. Treated water can pass out of an outflow pipe on an opposite side of the cylindrical vault. A bottom open skimmer or a flow restrictive skimmer or a hydro-variant skimmer can be used in front of the output flow port. A hydro slide system can be used to push debris toward the middle of a sloped floor for easier removal through access points in the vault lid. The input flow port can be spaced approximately 90 degrees from the output port.
(Continued)

And the input port and the output port can be on the same sides of the cylindrical vault.

17 Claims, 79 Drawing Sheets

Related U.S. Application Data which is a continuation-in-part of application No. 15/639,685, filed on Jun. 30, 2017, now Pat. No. 10,202,285, which is a continuation-in-part of application No. 14/288,455, filed on May 28, 2014, now abandoned.

(60) Provisional application No. 62/506,188, filed on May 15, 2017, provisional application No. 61/828,958, filed on May 30, 2013.

(51) Int. Cl.
*B01D 21/02* (2006.01)
*E03F 5/04* (2006.01)
*E03F 5/10* (2006.01)

(52) U.S. Cl.
CPC ......... *B01D 21/0087* (2013.01); *B01D 21/02* (2013.01); *E03F 5/0403* (2013.01); *E03F 5/101* (2013.01); *E03F 5/14* (2013.01)

(58) Field of Classification Search
USPC .............. 210/170.03, 519, 523, 532.1, 538
See application file for complete search history.

(56) References Cited

U.S. PATENT DOCUMENTS

| | | |
|---|---|---|
| 587,559 A | 8/1897 | Riley |
| 664,945 A | 1/1901 | Guion |
| 783,556 A | 2/1905 | Van Buskirk |
| 809,201 A | 1/1906 | Lutz |
| 920,961 A | 5/1909 | Keil |
| 1,060,338 A | 4/1913 | Gschwind |
| 1,442,348 A | 1/1923 | McDermet |
| 1,935,642 A | 11/1933 | Laughlin |
| 2,010,540 A | 8/1935 | Evans |
| 2,102,310 A | 12/1937 | Egan |
| 2,182,795 A | 12/1939 | Day |
| 2,263,259 A | 11/1941 | Boosey |
| 2,360,961 A | 10/1944 | Mayo |
| 2,436,793 A | 3/1948 | Danel |
| 2,485,755 A | 10/1949 | Loosli |
| 2,559,784 A | 7/1951 | Moore |
| 2,615,526 A | 10/1952 | Lane |
| 2,652,946 A | 9/1953 | Beatty |
| 2,796,988 A | 6/1957 | Loffler |
| 3,091,339 A | 5/1963 | Marra et al. |
| 3,237,915 A | 3/1966 | Palmer et al. |
| 3,282,430 A | 11/1966 | Kinne |
| 3,527,348 A | 9/1970 | Lalonde et al. |
| 3,631,983 A | 1/1972 | Mail |
| 4,024,881 A | 5/1977 | Weiland |
| 4,070,863 A | 1/1978 | Brown |
| 4,189,386 A | 2/1980 | Aman |
| 4,198,717 A | 4/1980 | Kessel |
| 4,278,190 A | 7/1981 | Oory et al. |
| 4,297,219 A | 10/1981 | Kirk et al. |
| 4,308,141 A | 12/1981 | Clendenen |
| 4,326,952 A | 4/1982 | Blake |
| 4,422,931 A | 12/1983 | Wolde-Michael |
| 4,509,717 A | 4/1985 | Wright et al. |
| 4,668,405 A | 5/1987 | Boze |
| 4,689,145 A | 8/1987 | Mathews et al. |
| 4,722,800 A * | 2/1988 | Aymong ............ B01D 21/0042 210/519 |
| 4,738,644 A | 4/1988 | Happel |
| 4,765,889 A | 8/1988 | Grujanac |
| 4,785,966 A | 11/1988 | Waltke |
| 4,895,653 A | 1/1990 | Cherochak |
| 4,913,819 A | 4/1990 | Patterson |
| 5,034,122 A | 7/1991 | Wiesemann |
| 5,037,541 A | 8/1991 | Ruey-Jang et al. |
| 5,069,781 A | 12/1991 | Wilkes |
| 5,114,274 A | 5/1992 | Heiler |
| 5,133,619 A | 7/1992 | Murfae et al. |
| 5,176,838 A | 1/1993 | Chin |
| 5,232,587 A | 8/1993 | Hegemier et al. |
| 5,284,580 A | 2/1994 | Shyh |
| 5,372,714 A | 12/1994 | Logue, Jr. |
| 5,378,376 A | 1/1995 | Zenner |
| 5,397,464 A | 3/1995 | Hannon |
| 5,403,474 A | 4/1995 | Emery |
| 5,405,539 A | 4/1995 | Schneider |
| 5,480,254 A | 1/1996 | Autry et al. |
| 5,486,287 A | 1/1996 | Murphy et al. |
| 5,498,331 A | 3/1996 | Monteith |
| 5,518,024 A | 5/1996 | Weeks et al. |
| 5,535,554 A | 7/1996 | Harris, Jr. |
| 5,562,819 A | 10/1996 | Turner, Jr. et al. |
| 5,575,925 A | 11/1996 | Logue, Jr. |
| 5,632,889 A | 5/1997 | Tharp |
| 5,643,445 A | 7/1997 | Billias et al. |
| 5,670,039 A | 9/1997 | Harris |
| 5,779,888 A | 7/1998 | Bennett |
| 5,810,510 A | 9/1998 | Urriola |
| 5,820,762 A | 10/1998 | Bamer et al. |
| 5,855,774 A | 1/1999 | Boelter |
| 5,904,842 A | 5/1999 | Billias et al. |
| 5,980,740 A | 11/1999 | Harms et al. |
| 5,985,157 A | 11/1999 | Leckner et al. |
| 6,032,421 A | 3/2000 | Yamada |
| 6,077,448 A | 6/2000 | Tran-Quoc-Nam et al. |
| 6,086,756 A | 7/2000 | Roy |
| 6,086,758 A | 7/2000 | Schilling et al. |
| 6,099,743 A | 8/2000 | Pedersen |
| 6,106,706 A | 8/2000 | Roy et al. |
| 6,106,707 A | 8/2000 | Morris et al. |
| 6,125,865 A | 10/2000 | Bacon Cochrane |
| 6,149,803 A | 11/2000 | Diloreto, Jr. et al. |
| 6,178,565 B1 | 1/2001 | Franco |
| 6,190,545 B1 | 2/2001 | Williamson |
| 6,200,484 B1 | 3/2001 | McInnis |
| 6,231,758 B1 | 5/2001 | Morris et al. |
| 6,270,663 B1 | 8/2001 | Happel |
| 6,287,459 B1 | 9/2001 | Williamson |
| 6,294,095 B1 | 9/2001 | Lewis |
| 6,315,897 B1 | 11/2001 | Maxwell |
| 6,334,953 B1 | 1/2002 | Singleton |
| 6,379,541 B1 | 4/2002 | Nicholas |
| 6,428,692 B2 | 8/2002 | Happel |
| 6,478,954 B1 | 11/2002 | Turner, Jr. et al. |
| 6,517,709 B1 | 2/2003 | Cardwell et al. |
| 6,531,059 B1 | 3/2003 | Morris et al. |
| 6,537,446 B1 | 3/2003 | Sanguinetti |
| 6,551,023 B2 | 4/2003 | Allard |
| 6,562,233 B1 | 5/2003 | Schilling et al. |
| 6,638,424 B2 | 10/2003 | Stever et al. |
| 6,651,825 B2 | 11/2003 | Turner, Jr. et al. |
| 6,666,974 B2 | 12/2003 | Page |
| 6,668,390 B1 | 12/2003 | Gonzalez |
| 6,733,665 B1 | 5/2004 | Khalil |
| 6,780,310 B1 * | 8/2004 | Howe ................ E03F 5/0404 210/170.03 |
| 6,797,161 B2 | 9/2004 | Use et al. |
| 6,797,162 B2 | 9/2004 | Happel |
| 6,800,195 B1 | 10/2004 | Batten et al. |
| 6,824,677 B2 | 11/2004 | Martinez |
| 6,866,153 B2 | 3/2005 | Turner, Jr. et al. |
| 6,869,525 B1 | 3/2005 | Happel |
| 6,872,029 B2 | 3/2005 | Allard et al. |
| 6,884,343 B2 | 4/2005 | Harris et al. |
| 6,936,163 B2 | 8/2005 | Use et al. |
| 6,939,461 B2 | 9/2005 | Use et al. |
| 6,951,607 B2 | 10/2005 | Use et al. |

(56) References Cited

U.S. PATENT DOCUMENTS

| | | |
|---|---|---|
| 6,974,540 B1 | 12/2005 | Fleischmann |
| 6,976,808 B2 | 12/2005 | Allard |
| 6,979,148 B2 | 12/2005 | Happel et al. |
| 6,986,621 B1 | 1/2006 | Allard |
| 6,994,783 B2 | 2/2006 | Use et al. |
| 6,998,039 B2 | 2/2006 | Harris et al. |
| 7,005,060 B2 | 2/2006 | Pitt |
| 7,011,743 B2 | 3/2006 | Use et al. |
| 7,083,721 B2 | 8/2006 | McClure et al. |
| 7,094,337 B2 | 8/2006 | Williams et al. |
| 7,094,338 B2 | 8/2006 | Morris et al. |
| 7,112,274 B1 | 9/2006 | Sanguinetti |
| 7,128,341 B1 | 10/2006 | Dahl et al. |
| 7,128,832 B2 | 10/2006 | Wade |
| 7,132,045 B1 | 11/2006 | Trangsrud |
| 7,153,417 B2 | 12/2006 | Happel |
| 7,156,987 B1 | 1/2007 | Sanguinetti |
| 7,270,747 B2 | 9/2007 | Happel et al. |
| 7,282,142 B2 | 10/2007 | Kraft |
| 7,288,188 B2 | 10/2007 | Al-Assfour |
| 7,294,256 B2 | 11/2007 | Happel et al. |
| 7,309,420 B1 | 12/2007 | Trangsrud |
| 7,328,809 B2 | 2/2008 | Gigas et al. |
| 7,396,471 B2 | 7/2008 | Wimberger |
| 7,488,414 B2 | 2/2009 | Wimberger |
| 7,494,585 B2 | 2/2009 | Nino |
| 7,524,414 B1 | 4/2009 | Barragan |
| 7,549,820 B1 | 6/2009 | Happel |
| 7,658,857 B2 | 2/2010 | Wacome |
| 7,662,280 B1 | 2/2010 | Cooney |
| 7,771,591 B2 | 8/2010 | Lucas |
| 7,785,464 B2 | 8/2010 | Happel |
| 7,815,800 B2 | 10/2010 | Komatsu |
| 7,824,551 B2 | 11/2010 | Wanielista et al. |
| 7,846,327 B2 | 12/2010 | Happel et al. |
| 7,883,620 B2 | 2/2011 | Owen |
| 7,897,047 B2 | 3/2011 | Wanielista et al. |
| 7,927,484 B2 | 4/2011 | Wanielista et al. |
| 7,955,507 B2 | 6/2011 | Wanielista et al. |
| 7,959,799 B2 | 6/2011 | Happel et al. |
| 7,981,283 B2 | 7/2011 | Happel |
| 7,981,300 B2 | 7/2011 | Wacome |
| 8,002,984 B1 | 8/2011 | Wanielista et al. |
| 8,002,985 B1 | 8/2011 | Wanielista et al. |
| 8,017,006 B2 | 9/2011 | Lopez |
| 8,034,234 B2 | 10/2011 | Happel |
| 8,034,236 B1 | 10/2011 | Happel |
| 8,034,237 B2 | 10/2011 | Happel et al. |
| 8,038,879 B2 | 10/2011 | Kraft |
| 8,051,568 B2 | 11/2011 | Moody et al. |
| 8,083,937 B2 | 12/2011 | Happel |
| 8,101,079 B1 | 1/2012 | Wanielista et al. |
| 8,142,666 B1 | 3/2012 | Happel |
| 8,153,005 B1 | 4/2012 | Wanielista et al. |
| 8,216,453 B2 | 7/2012 | Moody et al. |
| 8,221,632 B2 | 7/2012 | McInnis et al. |
| 8,231,780 B2 | 7/2012 | Happel |
| 8,252,182 B1 | 8/2012 | Chang et al. |
| 8,366,923 B1 | 2/2013 | Happel |
| 8,393,827 B1 | 3/2013 | Happel |
| 8,425,150 B1 | 4/2013 | Happel |
| 8,491,797 B1 | 7/2013 | Happel |
| 8,622,652 B1 | 1/2014 | Happel |
| 8,651,767 B1 | 2/2014 | Happel |
| 8,658,044 B2 | 2/2014 | Cobb |
| 8,974,144 B1 | 3/2015 | Happel |
| 9,068,312 B1 | 6/2015 | Happel |
| 9,340,965 B2 | 5/2016 | Happel |
| 9,534,368 B1 | 1/2017 | Happel |
| 10,202,285 B1* | 2/2019 | Happel ............ E03F 5/0403 |
| 10,238,993 B1* | 3/2019 | Happel ............ E03F 5/0403 |
| 2001/0047954 A1 | 12/2001 | Happel |
| 2003/0026659 A1 | 2/2003 | Wu |
| 2003/0089652 A1 | 5/2003 | Matsui |
| 2003/0121846 A1 | 7/2003 | Use et al. |
| 2003/0132150 A1 | 7/2003 | Happel |
| 2003/0136717 A1 | 7/2003 | Tseng |
| 2003/0172487 A1 | 9/2003 | Thompson et al. |
| 2003/0175079 A1 | 9/2003 | Happel et al. |
| 2004/0065601 A1 | 4/2004 | Martinez |
| 2004/0222159 A1 | 11/2004 | Peters, Jr. et al. |
| 2004/0222170 A1 | 11/2004 | Hauge |
| 2004/0226869 A1 | 11/2004 | McClure et al. |
| 2005/0051499 A1 | 3/2005 | Nino |
| 2005/0069386 A1 | 3/2005 | Happel et al. |
| 2005/0183997 A1 | 8/2005 | Happel et al. |
| 2005/0218049 A1 | 10/2005 | Happel |
| 2006/0016767 A1 | 1/2006 | Olson |
| 2006/0086676 A1 | 4/2006 | Smith |
| 2006/0096935 A1 | 5/2006 | Harding |
| 2006/0163130 A1 | 7/2006 | Happel et al. |
| 2006/0201860 A1 | 9/2006 | Happel et al. |
| 2006/0207922 A1 | 9/2006 | Dussich |
| 2008/0006304 A1 | 1/2008 | Treherne |
| 2009/0045135 A1 | 2/2009 | Khudenko et al. |
| 2009/0114579 A1 | 5/2009 | Dyer |
| 2009/0134081 A1 | 5/2009 | Happel |
| 2009/0166279 A1 | 7/2009 | Happel et al. |
| 2010/0032363 A1 | 2/2010 | Happel |
| 2010/0078370 A1 | 4/2010 | Happel |
| 2011/0168612 A1 | 7/2011 | Happel |
| 2011/0278237 A1 | 11/2011 | McInnis |
| 2012/0073675 A1 | 3/2012 | Dupuis |
| 2014/0102479 A1 | 4/2014 | Steffen |
| 2014/0352729 A1 | 12/2014 | Happel |
| 2015/0114893 A1 | 4/2015 | Moll |
| 2015/0129473 A1 | 5/2015 | Kent |
| 2015/0183659 A1 | 7/2015 | Kent |
| 2015/0258472 A1 | 9/2015 | Kent |
| 2017/0342698 A1 | 11/2017 | Fink |
| 2019/0078310 A1* | 3/2019 | Kent ............ E03F 5/14 |

OTHER PUBLICATIONS

Aluminum Slide and Weir Glass, Water and Waste Water Valves and Gates, retrieved on Jun. 15, 2009, retrieved from http://ncvg.net/products/alumslideweir.html, 10 pages.

Happel, Utility U.S. Appl. No. 14/151,284, filed Jan. 9, 2014, Office Action Summary dated Dec. 24, 2014, 12 pages.

Applied Polymer Systems, Inc., Polymer Enhanced Best Management Practice (PEBMP) Application Guide, Revised 2016, 83 pages.

Technical Guidance for the Use of Polyacrylamides (PAM) and PAM Blends for Soil Erosion Control and Storm Water Clarification, Applied Polymer Systems, Inc., Nov. 2002, 8 pages.

Applied Polymer Systems, Inc., APS 800 Series Pond Long, retrieved from http://siltstop.com/p.php? go=pinfo&PID=333-aps_800_series_pond_log, retrieved Aug. 28, 2017, 3 pages.

Applied Polymer Systems, Inc., Water Treatment, retrieved from http://siltstop.com/p.php?go=pinfo&PID=15-water_treatment, retrieved on Aug. 28, 2017, 8 pages.

Stormwater Best Management Practice, Polymer Flocculation, United States Environmental Protection Agency, Oct. 2013, http://www.siltstop.com/pictures/US_EPA_Polymer_Flocculant_Handout_3-14.pdf, 7 pages.

Happel, T., Utility U.S. Appl. No. 15/639,685, filed Jun. 30, 2017, Office Action Summary dated Aug. 10, 2018, 7 pages.

Happel, T., Utility U.S. Appl. No. 15/248,202, filed Aug. 26, 2016, Office Action Summary dated Jun. 1, 2018, 10 pages.

Spantek, Expanded Metal, Expanded Metal Patterns, no date available, 4 pages.

Bioclean, Debris Separating Baffle Box, Dual Stage Hydrodynamic Separator, no date available, 2 pages.

Bio-Clean, Submittal Drawings to Lake County, Florida from Bio-Clean, a Forterra Company, Regarding Magnolia Lane Drainage, submitted Mar. 7, 2017, 8 pages.

(56) References Cited

OTHER PUBLICATIONS

Bio-Clean, Final Project Drawings approved by Lake County, Florida from Bio-Clean, a Forterra Company, regarding Magnolia Lane Drainage, Mar. 23, 2017, 1 page.

\* cited by examiner

ROUND BAFFLE BOX WATER TREATMENT SYSTEM WITH AT LEAST ONE SIDEWALL BAFFLE

CROSS REFERENCE TO RELATED APPLICATIONS

This application is a Continuation-In-Part of U.S. patent application Ser. No. 16/104,737 filed Aug. 17, 2018, now U.S. Pat. No. 10,238,993, which is a Continuation-In-Part of U.S. patent application Ser. No. 15/639,685 filed Jun. 30, 2017, now U.S. Pat. No. 10,202,285, which claims the benefit of priority to U.S. Provisional Patent Application Ser. No. 62/506,188 filed May 15, 2017, and U.S. patent application Ser. No. 15/639,685 is a Continuation In Part of U.S. patent application Ser. No. 14/288,455 filed May 28, 2014, now abandoned, which claims the benefit of priority to U.S. Provisional Application Ser. No. 61/828,958 filed May 30, 2013, and U.S. patent application Ser. No. 14/288,455 is a Continuation In Part of U.S. patent application Ser. No. 14/097,302 filed Dec. 5, 2013, now U.S. Pat. No. 9,340,965, which claims the benefit of priority to U.S. Provisional Patent Application Ser. No. 61/735,277 filed Dec. 10, 2012, and U.S. patent application Ser. No. 14/097,302 is a Continuation In Part of U.S. patent application Ser. No. 13/096,456 filed Apr. 28, 2011 now U.S. Pat. No. 8,622,652, which is a Continuation In Part of U.S. patent application Ser. No. 12/790,215 filed May 28, 2010, now U.S. Pat. No. 8,366,923, and U.S. patent application Ser. No. 13/096,456 is a Continuation In Part of U.S. patent application Ser. No. 14/614,077 filed Nov. 6, 2009, now U.S. Pat. No. 8,142,666. The entire disclosure of each of the applications listed in this paragraph are incorporated herein by specific reference thereto.

FIELD OF INVENTION

This invention relates to water detention and treatment, and in particular to vaults, boxes, systems, and methods of treatment systems to capture pollutants from storm water runoff and prevent the conveyance of these pollutants from entering a receiving water body or landscape area, which is designed to be a part of a local permanent storm water drainage infrastructure, where a single treatment system combines a vertically oriented cylindrical vault with a flow deflector, and horizontal deflector with at least one vertical baffle, with or without skimmers, along with inexpensive methods for servicing the system.

BACKGROUND AND PRIOR ART

Since the passage of the Clean Water Act in 1972 the federal government through the Environmental Protection Agency (EPA) has mandated progressively tighter controls over the quantities of pollutants and contaminants that are allowed to be released into our nation's waters. These progressively tighter mandates also encompass control of peak flows and/or volumes and the rate at which they can be discharged into existing water ways or drainage infrastructures. These resulting mandates and controls have given birth to new programs and procedures collectively referred to as storm water management.

Devices, systems and procedures that remove or reduce the pollutants and contaminates and/or control peak flows and volumes are often referred to as best management practices (BMPs). The BMPs can utilize natural, artificial or man-made techniques, and even combinations of either and/or both. Some examples of these BMPs include trash filters, sedimentation basins, retention and detention ponds, wetlands, infiltration trenches, grass swales, various types of media filters, and various types of natural filter systems including sand filters, and aggregate filters including natural and artificial wetlands.

BMPs typically use one or more mechanisms to remove the pollutants and contaminates. These mechanisms include sedimentation, filtration, absorption, adsorption, flocculation, stripping, leaching, bioremediation, and chemical processes including oxidation reduction, ion exchange, and precipitation.

Furthermore, storm water treatment systems can also be classified in relationship to the treatment level in which they are being used. In this respect, the term treatment is generally used to describe the unit processes that are used to reduce the quantities of pollutants and containments in storm water runoff.

For example, basic or pre-treatment typically refers to the removal of gross solids, sediments and larger debris through the processes of settling and screening. Enhanced or advanced treatment typically refers to processes or reducing targeted pollutants.

The reduction of solids conveyed in stormwater flow, often referred to as Total Suspended Solids (TSS), is the nation's primary pollutant of concern. Attached to TSS are many other pollutants of concert, so capturing TSS from stormwater runoff has wide spectrum of benefits. Common pollutants typically found in storm water flow can include sediment, foliage, litter, nutrients, metals, hydrocarbons, bacteria and more. A stormwater treatment system that can effectively capture and retain TSS will dramatically reduce the pollutant load entering receiving bodies of water for almost every pollutant of concern.

Thus, the need exists for solutions to the above problems with the prior art.

SUMMARY OF THE INVENTION

A primary objective of the present invention is to provide vaults, boxes, systems and methods treatment for stormwater flow that enters a storm drainage pipe that is generated by rainfall to prevent pollution from being conveyed to a receiving body of water or land area.

Another objective of the present invention is to provide vaults, boxes, systems and methods treatment for reducing water flow velocity and the associated turbulence of flowing stormwater with an inflow deflector inside of a vertically oriented cylindrical vault.

As the stormwater flow enters into the round treatment vault of the invention it can be immediately redirected by a deflector that is adjacent to the inflow. The water flow is redirected along the side wall of the treatment vault. The immediate redirection of the water flow, combined with the much greater cross-sectional area of the vault than the inflow pipe, will greatly reduce the linear velocity of the water flow.

The invention can be designed to be a part of the local permanent storm water drainage infrastructure, where the system combines both drainage conveyance, variable hydraulic capabilities, and easy and inexpensive methods for servicing the invention.

The storm water pollution prevention system can prevent the conveyance of a wide spectrum of pollutants of concern.

The systems and methods can include a round vault with an inflow opening or pipe and an outflow opening or pipe, and a series of horizontal deflectors and vertical baffles that are designed to calm the stormwater flow within the vault.

This calming of the water flow in a round vault is unique to the and is not found in other stormwater treatment system that uses a round vault.

Typically, other stormwater treatment systems that include a round vault accelerates the water flow by encouraging the water flow to spin within the vault. The novel systems and methods do exactly the opposite and are designed to calm the water flow to enhance treatment.

As stormwater flow enters the vault the water flow is immediately redirected by a deflected so that the flow is moving along the side wall of the vault. The change in direction of the water flow combined with the much greater cross-sectional area of the vault greatly reduces the linear velocity of the water flow.

Along the side wall of the vault baffles that extend from the side wall toward the center of the vault redirect the water flow again and further reduce the linear velocity of the water flow. To prevent the stormwater flow from entering the lower settling zone, a horizontal deflector wraps most of the way around the perimeter of the vault.

This horizontal deflector can partially from the side wall toward the center of the vault. There are no baffles or deflectors in the center of the vault. The turbulence of the water flow in the center of vault is relatively calm with considerable cross-sectional area of flow in the direction of the outflow opening.

A skimmer can span in front of the outflow opening in close proximity of a horizontal shelf under the skimmer.

The skimmer and shelf system are such that there is a gap between the shelf system and lower edge of the skimmer that restricts the stormwater flow. By restricting the stormwater flow greater detention time of the water flow within the treatment vault is achieved.

Greater detention time within the treatment system aids with calming the water flow and allows more time for solids to settle. Solids and liquids that are lighter than water is prohibited from entering into the outflow of the vault by the skimmer. Oil absorbing materials can be utilized in the treatment vault to capture and retain petroleum-based liquids. Debris that is heavier than water will settle into the lower settling zone of the treatment system.

Further objects and advantages of this invention will be apparent from the following detailed description of the presently preferred embodiments which are illustrated schematically in the accompanying drawings.

BRIEF DESCRIPTION OF THE FIGURES

First Embodiment Cylindrical Vault/System with Inflow Deflector, Horizontal Deflector and High Profile Vertical Baffles

Second Embodiment Cylindrical Vault/System with Inflow Deflector, Horizontal Deflector, High Profile Vertical Baffles and Low Profile Vertical Baffles

Third Embodiment Cylindrical Vault/System with Inflow Deflector, Horizontal Deflector, High Profile Vertical Baffles, Low Profile Vertical Baffles and Skimmer

Fourth Embodiment Cylindrical Vault/System with Inflow Deflector, Horizontal Deflector, High Profile Vertical Baffles, Low Profile Vertical Baffles and Flow Restricted Skimmer

Fifth Embodiment Cylindrical Vault/System with
Inflow Deflector, Horizontal Deflector, High Profile
Vertical Baffles, Low Profile Vertical Baffles and
Hydro-Variant Skimmer

Sixth Embodiment Cylindrical Vault/System with
Inflow Deflector, Horizontal Deflector, High Profile
Vertical Baffles, Angled Low Profile Vertical
Baffles and Hydro-Variant Skimmer

Seventh Embodiment Cylindrical Vault/System with
Inflow Deflector, Horizontal Deflector, High Profile
Vertical Baffles, Angled Low Profile Vertical
Baffles Hydro-Variant Skimmer and Hydroslide
System

Eighth Embodiment Cylindrical Vault/System with
Side Inflow Port, Single Direction Inflow Deflector,
Horizontal Deflector, and High Profile Vertical
Baffles

Ninth Embodiment Cylindrical Vault/System with
Side Inflow Port, Single Direction Inflow Deflector,
Horizontal Deflector, High Profile Vertical Baffles
and Low Profile Vertical Baffles

Tenth Embodiment Cylindrical Vault/System with
Side Inflow Port, Single Direction Inflow Deflector,
Horizontal Deflector, High Profile Vertical Baffles,
Low Profile Vertical Baffles and Open Bottom
Skimmer

Eleventh Embodiment Cylindrical Vault/System
with Side Inflow Port, Single Direction Inflow
Deflector, Horizontal Deflector, High Profile
Vertical Baffles, Low Profile Vertical Baffles and
Flow Restricted Skimmer

Twelfth Embodiment Cylindrical Vault/System with Side Inflow Port, Single Direction Inflow Deflector, Horizontal Deflector, High Profile Vertical Baffles, Low Profile Vertical Baffles and Hydro-Variant Skimmer

Thirteenth Embodiment Cylindrical Vault/System with Side Inflow Port, Single Direction Inflow Deflector, Horizontal Deflector, High Profile Vertical Baffles, Angled Low Profile Vertical Baffles and Hydro-Variant Skimmer

Fourteenth Embodiment Cylindrical Vault/System with Side Inflow Port, Single Direction Inflow Deflector, Horizontal Deflector, High Profile Vertical Baffles, Angled Low Profile Vertical Baffles, Hydro-Variant Skimmer and Hydroslide System

Fifteenth Embodiment Cylindrical Vault/System with Inflow and Outflow Ports on Same Side, Single Direction Inflow Deflector, Horizontal Deflector, and High Profile Vertical Baffle

Sixteenth Embodiment Cylindrical Vault/System with Inflow and Outflow Ports on Same Side, Single Direction Inflow Deflector, Horizontal Deflector, High Profile Vertical Baffle and Low Profile Vertical Baffles

Seventeenth Embodiment Cylindrical Vault/System with Inflow and Outflow Ports on Same Side, Single Direction Inflow Deflector, Horizontal Deflector, High Profile Vertical Baffle, Low Profile Vertical Baffles and Open Bottom Skimmer

Eighteenth Embodiment Cylindrical Vault/System with Inflow and Outflow Ports on Same Side, Single Direction Inflow Deflector, Horizontal Deflector, High Profile Vertical Baffle, Low Profile Vertical Baffle and Flow Restricted Skimmer

Nineteenth Embodiment Cylindrical Vault/System with Inflow and Outflow Ports on Same Side, Single Direction Inflow Deflector, Horizontal Deflector, High Profile Vertical Baffle, Low Profile Vertical Baffles and Hydro-Variant Skimmer

Twentieth Embodiment Cylindrical Vault/System with Inflow and Outflow Ports on Same Side, Single Direction Inflow Deflector, Horizontal Deflector, High Profile Vertical Baffle, Angled Low Profile Vertical Baffles and Hydro-Variant Skimmer

Twenty First Embodiment Cylindrical Vault/System with Inflow and Outflow Ports on Same Side, Single Direction Inflow Deflector, Horizontal Deflector, High Profile Vertical Baffle, Angled Low Profile Vertical Baffles. Hydro-Variant Skimmer and Hydroslide System

Twenty Second Embodiment Rectangular Vault/System with Inflow Deflector, Horizontal Deflector, High Profile Vertical Baffles and Horizontal Deflector

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1:
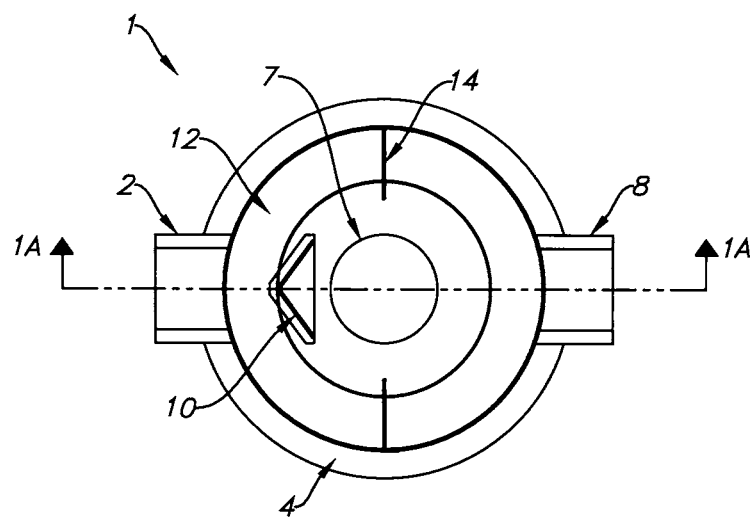
FIG. 1 is a top view of a first embodiment of a cylindrical vault/system with inflow deflector, horizontal deflector, and high profile vertical baffles.
Figure 1A:
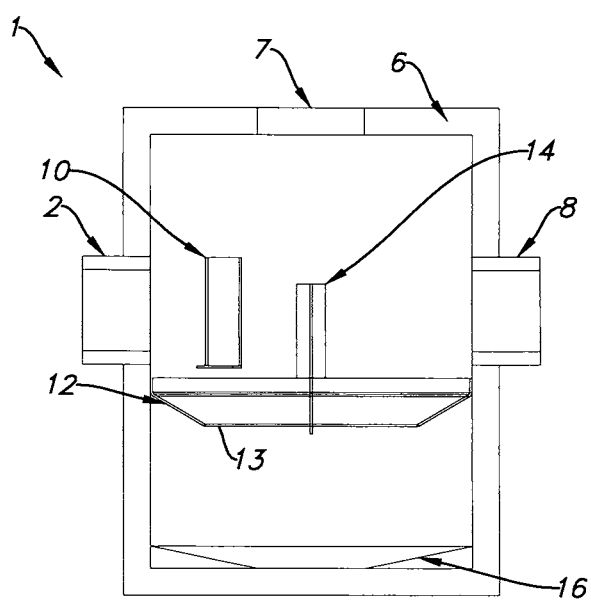
FIG. 1A is a side cross-sectional view of the cylindrical vault/system of FIG. 1 along arrows 1A.
Figure 1B:
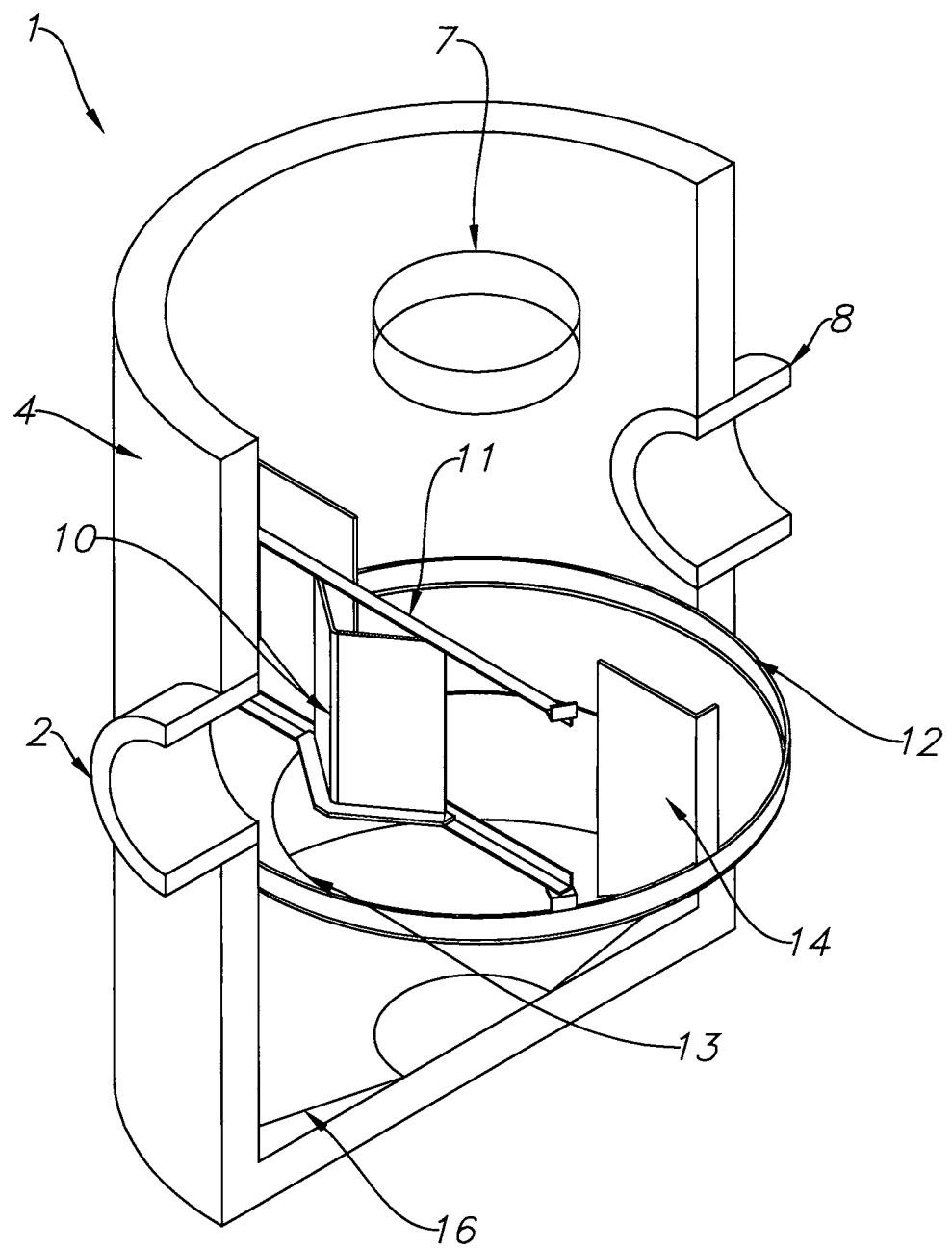
FIG. 1B is partial cut-away perspective view of the cylindrical vault/system of FIG. 1 and FIG. 1A.
Figure 1C:
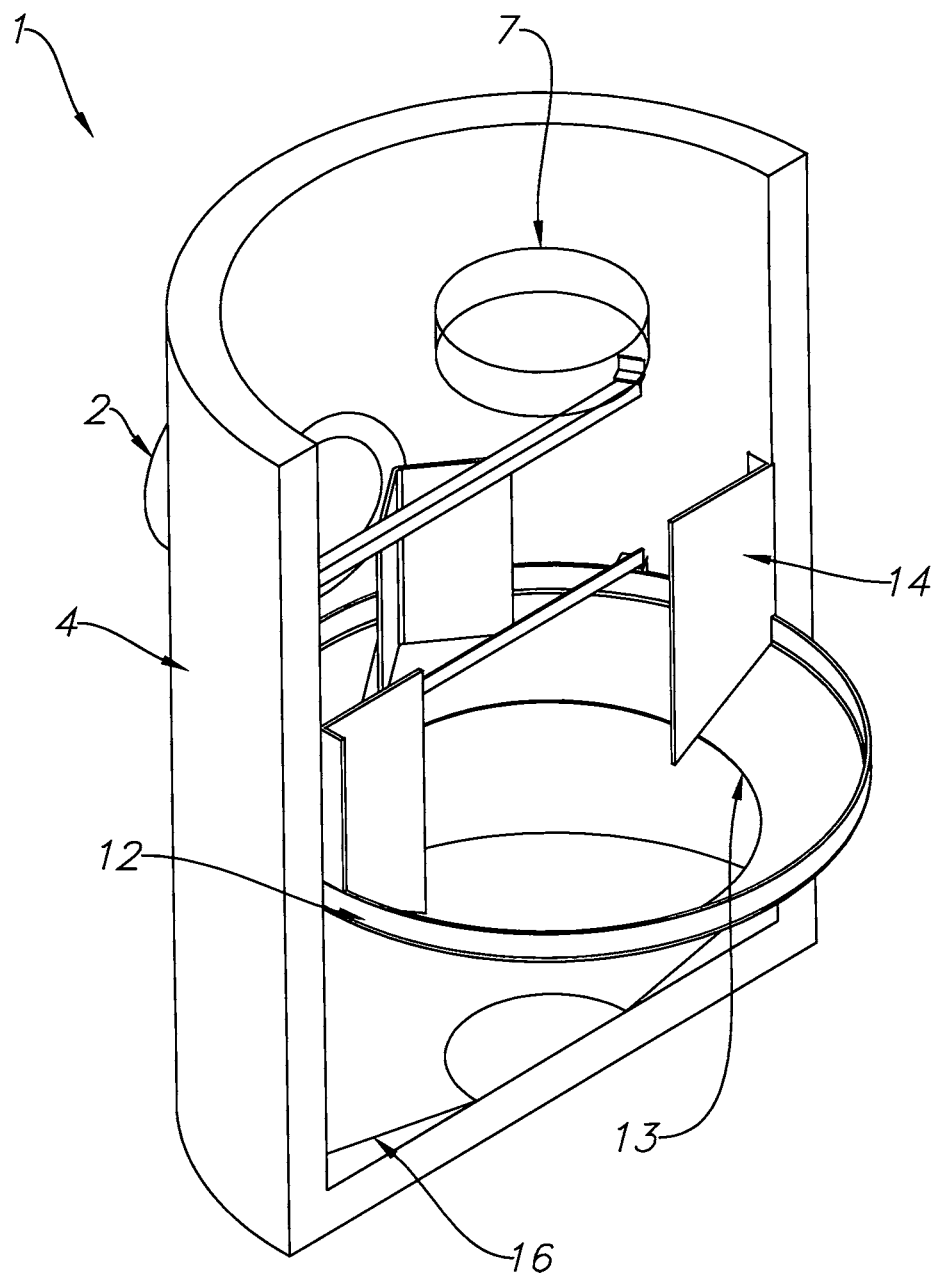
FIG. 1C another partial cut-away perspective view of the cylindrical vault/system of FIG. 1 and FIG. 1A.
Figure 1D:
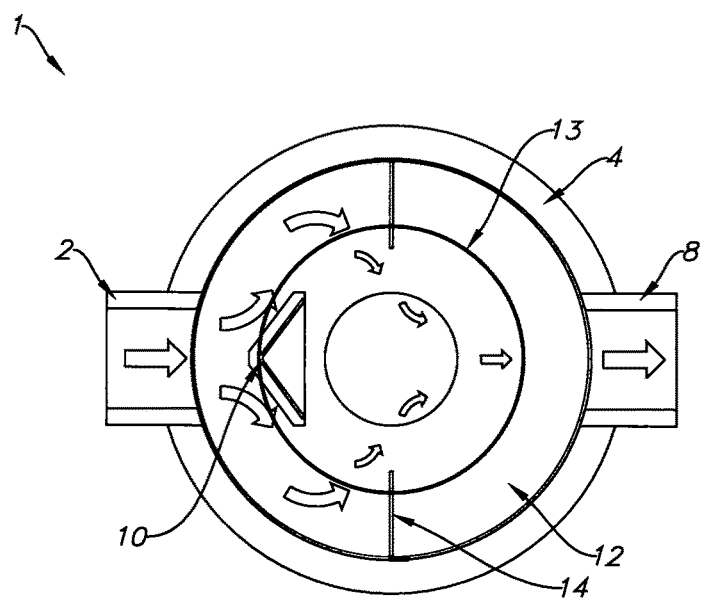
FIG. 1D is another top view of the cylindrical vault/system of FIG. 1 showing flow line arrows inside the vault.
Figure 1E:
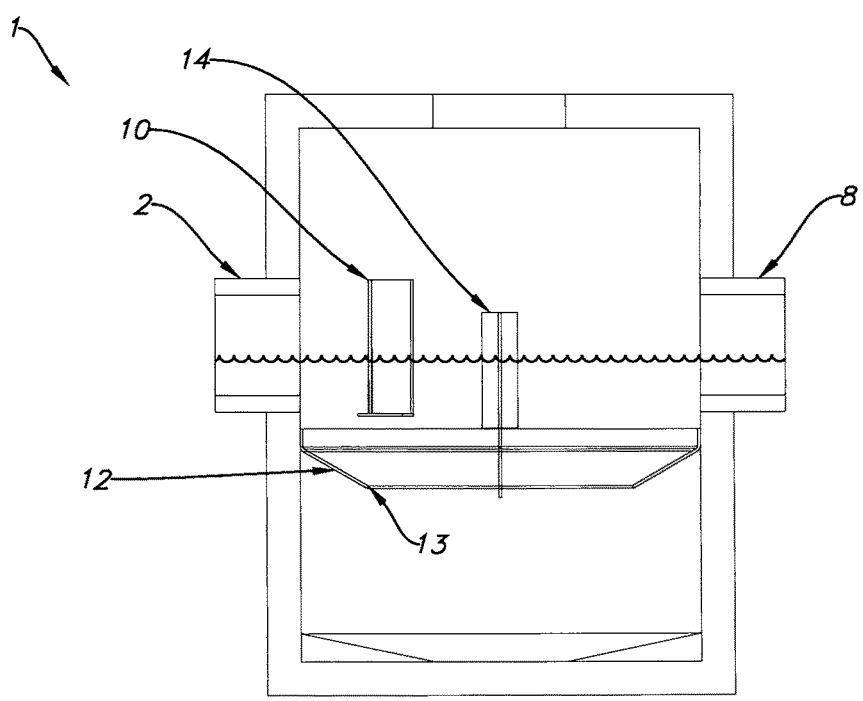
FIG. 1E is another view of the cylindrical vault/system of FIG. 1A showing a low flow water line.
Figure 1F:
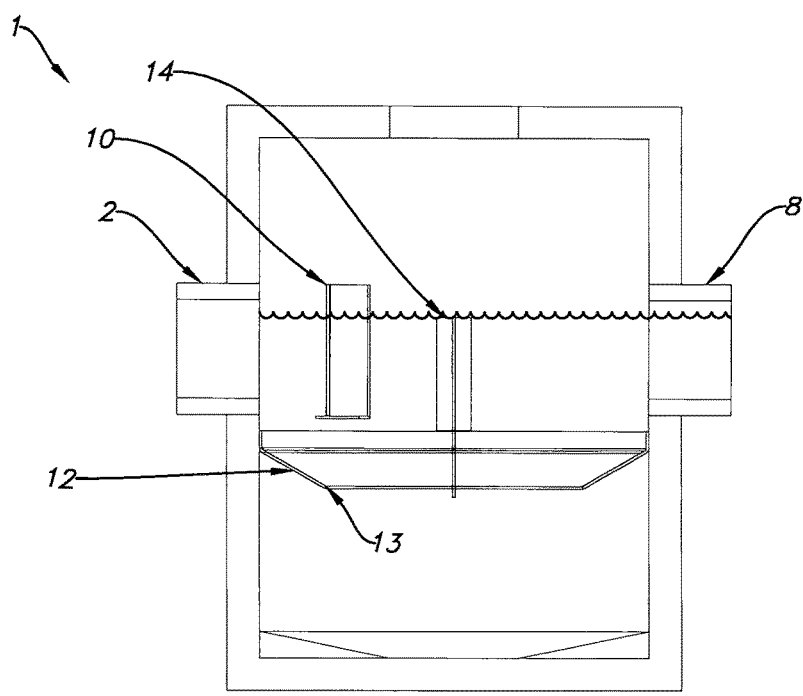
FIG. 1F is another view of the cylindrical vault/system of FIG. 1A showing a high flow water line.
Figure 1G:
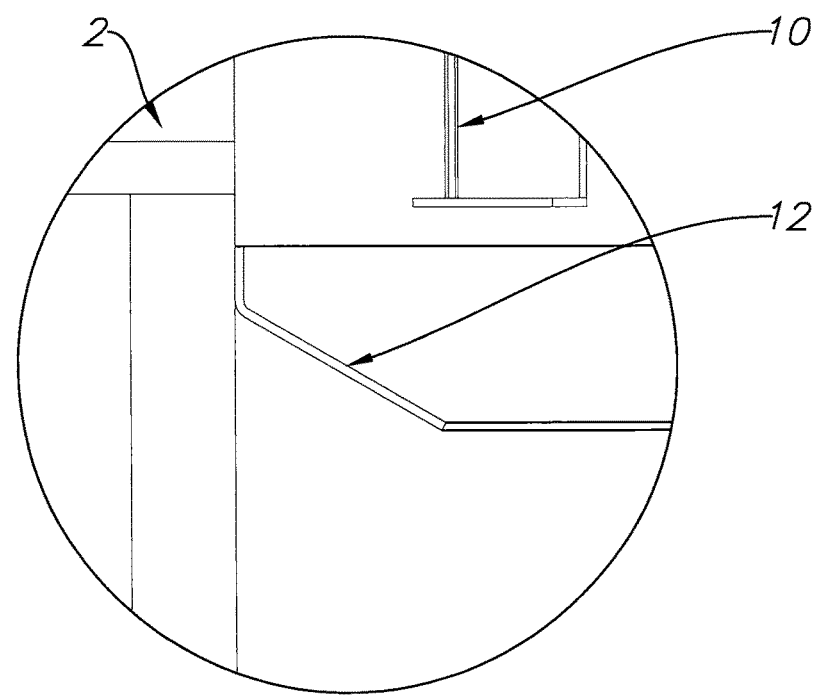
FIG. 1G is an enlarged view of the inflow port and the inflow deflector and the horizontal deflector shown in FIG. 1A.

A list of components will now be described.
1 First embodiment cylindrical vault/system with inflow deflector, horizontal deflector and high profile baffles
2 inflow pipe/line
4 side walls of vault/box
6 top of vault/box
7 access point
8 outflow pipe/line
10 inflow deflector/flow spreader
11 braces holding inflow deflector/flow spreader
12 horizontal deflector
13 central opening in horizontal deflector
14 high profile vertical baffle(s)
16 sloped floor
20 Second embodiment cylindrical vault/system with inflow deflector, horizontal deflector, high profile baffles, and low profile baffles.
22 low profile baffle(s)
30 Third embodiment cylindrical vault/system with inflow deflector, horizontal deflector, high profile baffles, and low profile baffles and skimmer.
32 open bottom skimmer
40 Fourth embodiment cylindrical vault/system with inflow deflector, horizontal deflector, high profile baffles, low profile baffles and flow restricted skimmer.
42 flow restricted skimmer
44 gap
46 shelf 50 Fifth embodiment cylindrical vault/system with inflow deflector, horizontal deflector, high profile baffles, low profile baffles and hydro-variant skimmer.
52 hydro-variant skimmer/skimmer panel
54 gap
56 shelf
58 track system/vertical channel(s)
60 Sixth embodiment cylindrical vault/system with inflow deflector, horizontal deflector, high profile baffles, angled low profile baffles and hydro-variant skimmer.
62 angled low profile baffle(s)
70 Seventh embodiment cylindrical vault/system with inflow deflector, horizontal deflector, high profile baffles, angled low profile baffles and hydro-variant skimmer and hydroslide system.
72 hydroslide system
73 water connection(s)
74 upper horizontal water line(s)
75 vertical water line(s)
76 spray bar(s) alongside floor corners
77 nozzle(s)/spray head(s)
78 spray knife/knive(s)
79 spray lever(s)
80 Eighth embodiment cylindrical vault/system with side inflow port, single direction inflow deflector, horizontal deflector, and high profile baffles
82 side inflow pipe line
84 single direction inflow deflectors
90 Ninth embodiment cylindrical vault/system with side inflow port, single direction inflow deflector, horizontal deflector, low profile baffles and high-profile baffles
100 Tenth embodiment cylindrical vault/system with side inflow port, single direction inflow deflector, horizontal deflector, low profile baffles, high profile baffles and open bottom skimmer
110 Eleventh embodiment cylindrical vault/system with side inflow port, single direction inflow deflector, horizontal deflector, low profile baffles, high profile baffles and flow restricted skimmer
120 Twelfths embodiment cylindrical vault/system with side inflow port, single direction inflow deflector, horizontal deflector, low profile baffles, high profile baffles and hydro-variant skimmer system
130 Thirteenth embodiment cylindrical vault/system with side inflow port, single direction inflow deflector, horizontal deflector, angled low profile baffles, high profile baffle and hydro-variant skimmer system
140 Fourteenth embodiment cylindrical vault/system with side inflow port, single direction inflow deflector, horizontal deflector, angled low profile baffles, high profile baffles and hydro-variant skimmer system and hydroslide system
150 Fifteenth embodiment cylindrical vault/system with inflow and outflow ports on same side, single direction inflow deflector, horizontal deflector, and high profile baffles
152 inflow port
154 outflow port
156 single direction inflow deflector
160 Sixteenth embodiment cylindrical vault/system with inflow and outflow ports on same side, single direction inflow deflector, horizontal deflector, high profile baffles and low profile baffles
170 Seventeenth embodiment cylindrical vault/system with inflow and outflow ports on same side, single direction inflow deflector, horizontal deflector, high profile baffles, low profile baffles and open bottom skimmer
180 Eighteenth embodiment cylindrical vault/system with inflow and outflow ports on same side, single direction inflow deflector, horizontal deflector, high profile baffles, low profile baffles and flow restricted skimmer
190 Nineteenth embodiment cylindrical vault/system with inflow and outflow ports on same side, single direction inflow deflector, horizontal deflector, high profile baffles, low profile baffles and hydro-variant skimmer system
200 Twentieth embodiment cylindrical vault/system with inflow and outflow ports on same side, single direction inflow deflector, horizontal deflector, high profile baffles, angled low profile baffles and hydro-variant skimmer system
210 Twenty first embodiment cylindrical vault/system with inflow and outflow ports on same side, single direction inflow deflector, horizontal deflector, high profile baffles, angled low profile baffles, hydro-variant skimmer system and hydroslide system
220 Twenty second embodiment rectangular vault/system with inflow deflector, high profile vertical baffles and horizontal deflector.
222 inflow pipe/line
224 side walls of vault/box
226 top of vault/box
227 access point
228 outflow pipe/line
230 inflow deflector/flow spreader
232 braces holding inflow deflector/flow spreader
234 horizontal deflector
235 high profile baffle(s)
236 sloped floor First Embodiment Cylindrical Vault/System with Inflow Deflector, Horizontal Deflector and High Profile Vertical Baffles FIG. 1 is a top view of a first embodiment of a cylindrical vault/system 1 with inflow deflector 10, horizontal deflector 12, and high profile vertical baffles 14. FIG. 1A is a side cross-sectional view of the cylindrical vault/system 1 of FIG. 1 along arrows 1A. FIG. 1B is partial cut-away perspective view of the cylindrical vault/system 1 of FIG. 1 and FIG. 1A. FIG. 1C another partial cut-away perspective view of the cylindrical vault/system 1 of FIG. 1 and FIG. 1A. FIG. 1D is another top view of the cylindrical vault/system 1 of FIG. 1 showing flow line arrows inside the vault. FIG. 1E is another view of the cylindrical vault/system 1 of FIG. 1A showing an HG low flow water line. FIG. 1F is another view of the cylindrical vault/system 1 of FIG. 1A showing a high flow water line. FIG. 1G is an enlarged view of the inflow port 2 and the inflow deflector 10 and the horizontal deflector 12 shown in FIG. 1A.

Referring to FIGS. 1-1G, the cylindrical vault/system 1 can include an inflow pipe/line 2, which allows stormwater to pass into the vault 1. An inflow deflector 10, can function as a flow spreader to split the incoming flow path into two flow paths. The inflow deflector 10 can be mounted to side walls inside of the vault 1 by braces 11. The inflow deflector 10 which functions as a flow spreader, can include the flow spreaders shown and described in U.S. Pat. No. 8,142,666 to Happel and U.S. Pat. No. 9,534,368 to Happel, and in U.S. patent application Ser. No. 15/639,685 filed Jun. 30, 2017 to Happel; Ser. No. 15/686,931 filed Aug. 25, 2017 to Happel; Ser. No. 15/948,011 filed Apr. 9, 2018 to Happel; Ser. No. 16/104,737 filed Aug. 17, 2018 to Happel; and Ser. No. 16/124,885 filed Sep. 7, 2018 to Happel, which are all incorporated by reference in their entirety.

The inflow deflector 10 can be used for reducing water flow velocity and the associated turbulence. As the stormwater flow enters into the round treatment vault of the invention it is immediately redirected by a deflector 10 that is adjacent to the inflow. The water flow is redirected along the side wall 4 of the treatment vault 1. The immediate redirection of the water flow, combined with the much greater cross-sectional area of the vault 1 than the inflow pipe 2, will greatly reduce the linear velocity of the water flow. Depending on the direction of the outflow relative to the inflow, the inflow deflector can be shaped differently.

If the inflow pipe 2 and the outflow pipe 8 are on opposite sides of the vault, the inflow deflector 10 will be shaped to split the inflow such that the flow is split in opposite directions along the opposite side walls 4.

The two paths formed by the flow spreader 10 can run about the interior rounded walls 4 of the cylindrical vault 1 along the inwardly inclined surface of the horizontal deflector 12 and into high profile vertical baffles 14 that can each extend upward from the horizontal deflector 12.

The function of the horizontal deflector 12 is to encourage the settling of debris in the lower settling zone while blocking turbulence from entering the settling zone. Turbulence in the settling zone can cause debris to scour out and potentially escape the treatment system.

The horizontal deflector 12 is lower than both the inflow 2 and outflow 8 pipes, extends from the side wall 4 toward the center of the round treatment vault 1, and wraps around the vault 1 along the side wall 4. In addition, it is angled downward from the side wall 4. The angled surface of the deflector 12 enables debris that lands on the deflector 12 to slide off toward the center of the vault 1 passing through opening 13 and settling into the settling zone. The angled surface also creates a hydraulic relief which encourages debris to move downward within the vault 1. Because there are no upflow currents within the treatment vault 1, and the horizontal deflector 12 is substantially lower in elevation than the outflow opening 8, debris that engages the deflector 12 can continue downward into the settling zone of the treatment system.

The horizontal deflector 12 extends a limited distance from the side wall 4 so that a vacuum service truck has easy access into the lower settling zone. The configuration of the horizontal deflector can vary depending on the position of the inflow pipe 2 to the outflow pipe 8. If the inflow pipe 2 and the outflow pipe 8 are on opposite sides of the vault 1, the horizontal deflector 12 can symmetrically wrap around both sides of the vault 1 toward the outflow pipe 8, (and can stop short of the skimmer 42 and shelf 46 shown in FIGS. 4-4D).

Debris can fall downward through the central opening 13 of the horizontal deflector 12 to rest on the sloped floor 16. The storm water can pass out of the outflow portal/pipe/line 8. The top 6 of the cylindrical vault 1 can have an access point opening 7 to allow for vacuum lines to pass therethrough and down through the opening 13 in the horizontal deflector 12 to reach the lowest point of the sloped floor 16 in order to remove the debris that has accumulated on floor 16.

Vertical baffles 14 can be located along the wall 4 above the horizontal deflector 12. The 2 primary functions of the vertical baffles 14 are to reduce the linear velocity of the water, and to increase the linear path of the water flow within the treatment system.

As the water flows away from the inflow deflector 10, the flow is concentrated along the side wall 4 of the vault 1 above the horizontal deflector 12. Reducing the linear velocity of the water flow will aid calming the water within the treatment system 1. The greater calming of the water will induce the settling of debris in the lower settling chamber. Because the water flow is traveling a tangent path along the perimeter of the vault, the round shape of the vault 1 continuously changes the direction of the flow path.

In addition, the water flow is influenced such that the cross-sectional area of flow is much greater within the vault 1 as compared to the cross-sectional area of the inflow pipe 1 and the area adjacent to the inflow deflector 10. Based on the concept of Bernoulli's principle, as the cross-sectional area of water flow increases the linear velocity of the flow will decrease.

Figure 2:
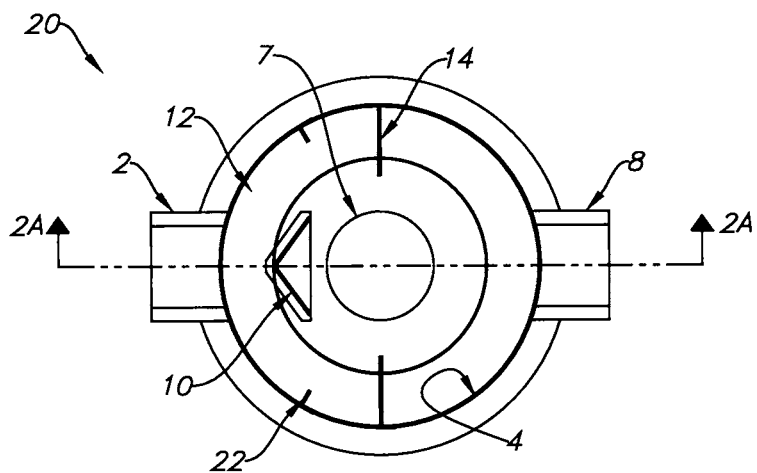
FIG. 2 is a top view of a second embodiment of a cylindrical vault/system with inflow deflector, horizontal deflector, high profile vertical baffles and low profile vertical baffles.

The vertical baffles can be divided into 2 categories (high profile vertical baffles 14 and low profile vertical baffles 22, shown and described in FIGS. 2-2F) which are visually apparent based on the distance that the baffles 14, 22 extend from the side wall 4 toward the center of the vaults 1, 20.

As the flow leaves the vicinity of the inflow deflector 10, the flow will first make contact with 1 or more low profile baffles 22. These low-profile baffles 22 can typically extend just a short distance from the side wall 4. The low-profile baffles 22 are relatively easy for the water flow to flow around, however, they convey significant resistance to the flow such that they effectively reduce the linear velocity of the flow. In addition, these low-profile baffles 22 can be angled (as shown in 62 FIGS. 6-6D) so as to direct the water flow with the debris contained therein downward toward the horizontal deflector 12. After the water flow has passed the low-profile baffles 22 FIGS. 2-2F, the flow engages a high-profile baffle 14. The high-profile baffles 14 extend a greater distance from the side wall of the vault 1 than the low-profile baffles 22.

The high-profile baffles 14 can be sufficiently sized to turn and redirect the water flow toward the center of the vault. However, the high-profile baffles 14 do not extend into the space adjacent to the center of the vault 1. The center of the vault 1 can be left open so that the cross-sectional conveyance at the center is maximized, and so that a substantial open space from access point 7 to opening 13 in the horizontal deflector 12 in the center of the vault 1 is available for servicing.

Depending on the direction of water flowing into and away from the invention, the arrangement and combination of vertical baffles 14 can be adjusted to maximize removal efficiency of pollutants.

Figure 2A:
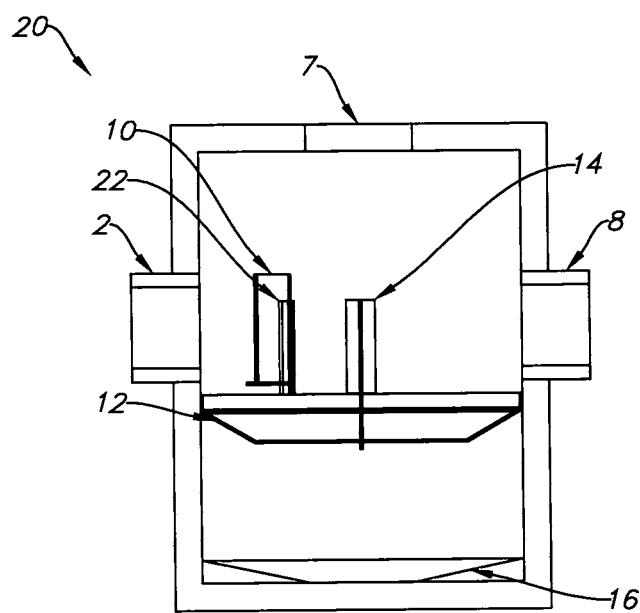
FIG. 2A is a side cross-sectional view of the cylindrical vault/system of FIG. 2 along arrows 2A.
Figure 2B:
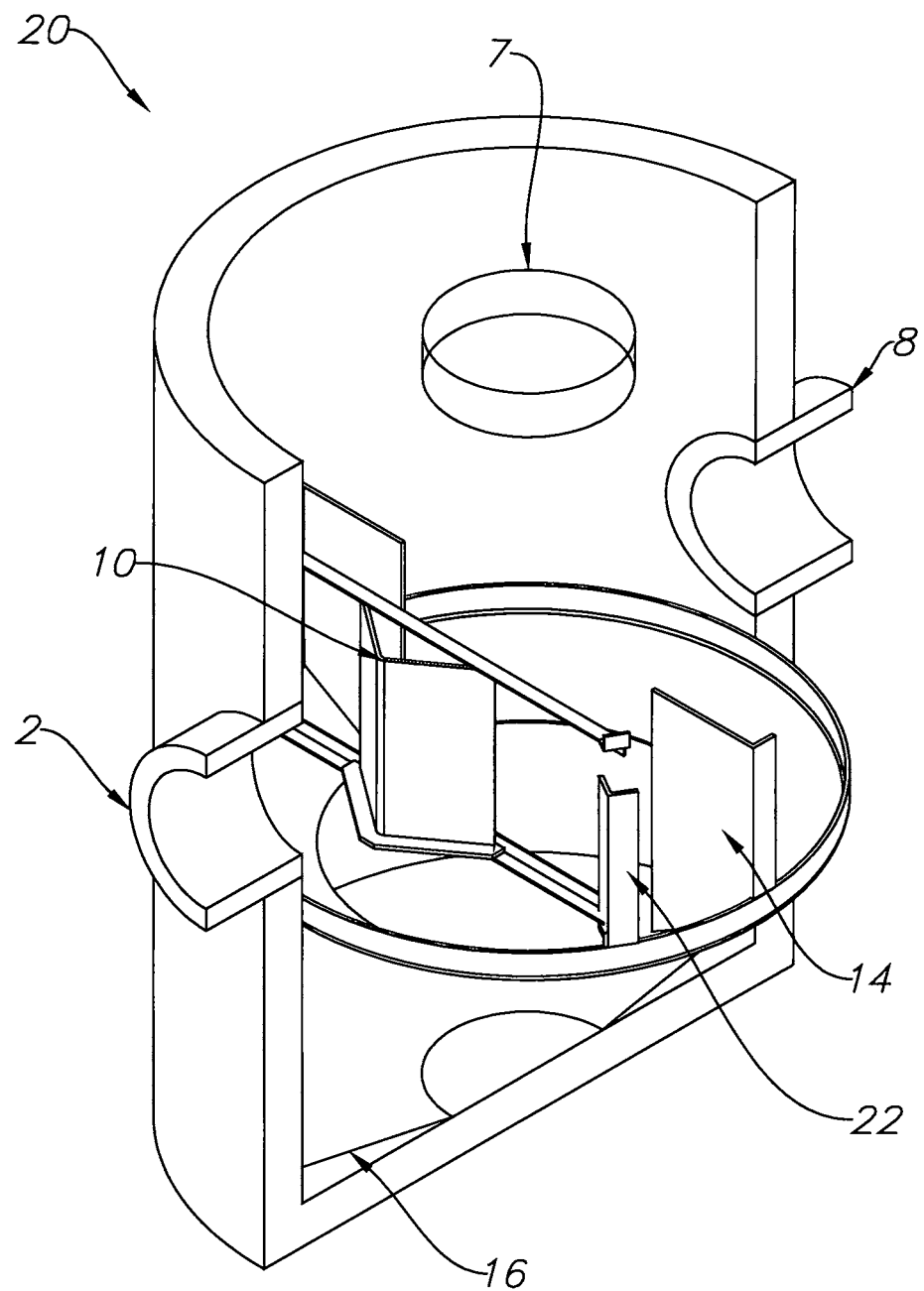
FIG. 2B is partial cut-away perspective view of the cylindrical vault/system of FIG. 2 and FIG. 2A.
Figure 2C:
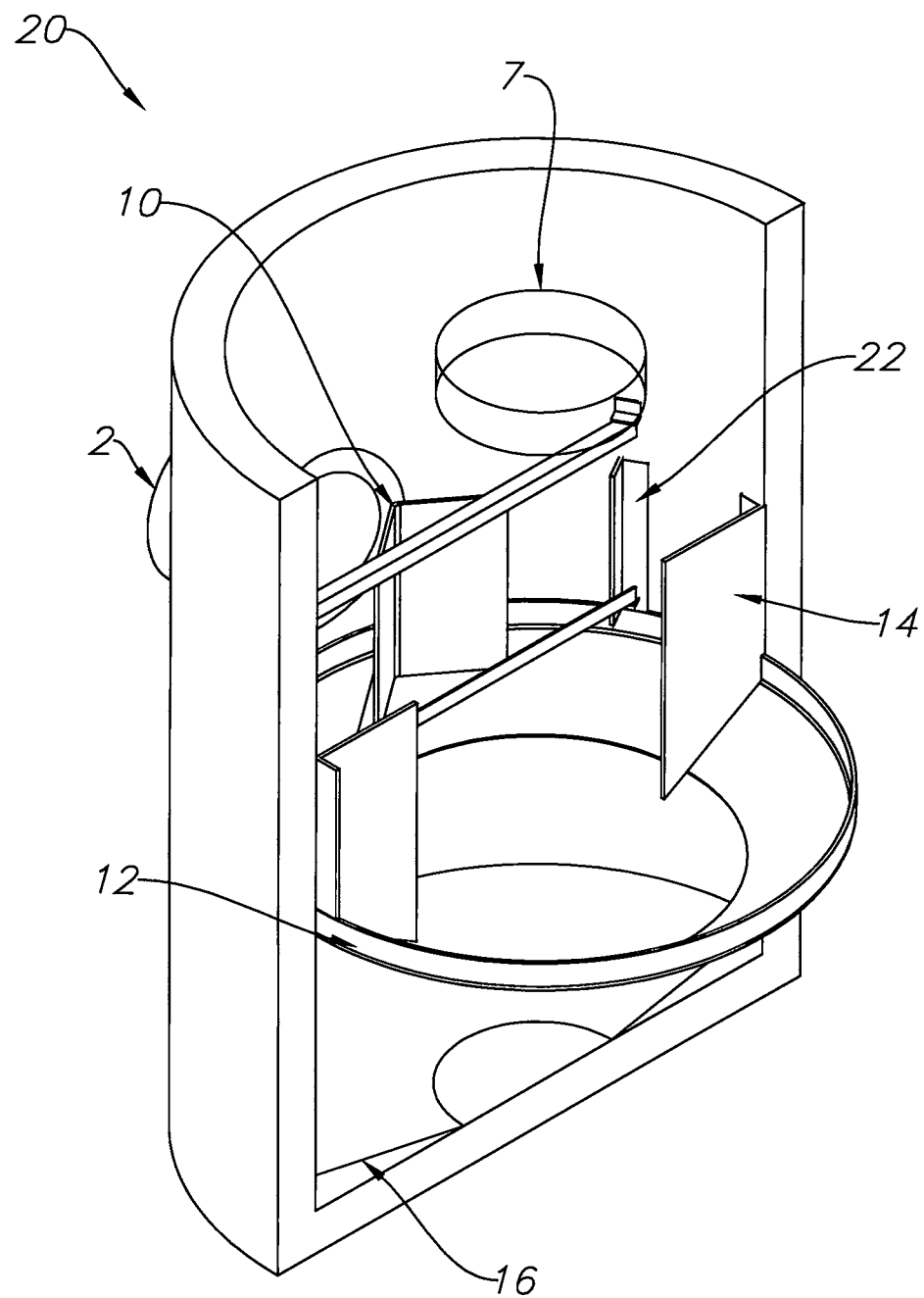
FIG. 2C another partial cut-away perspective view of the cylindrical vault/system of FIG. 2 and FIG. 2A.
Figure 2D:
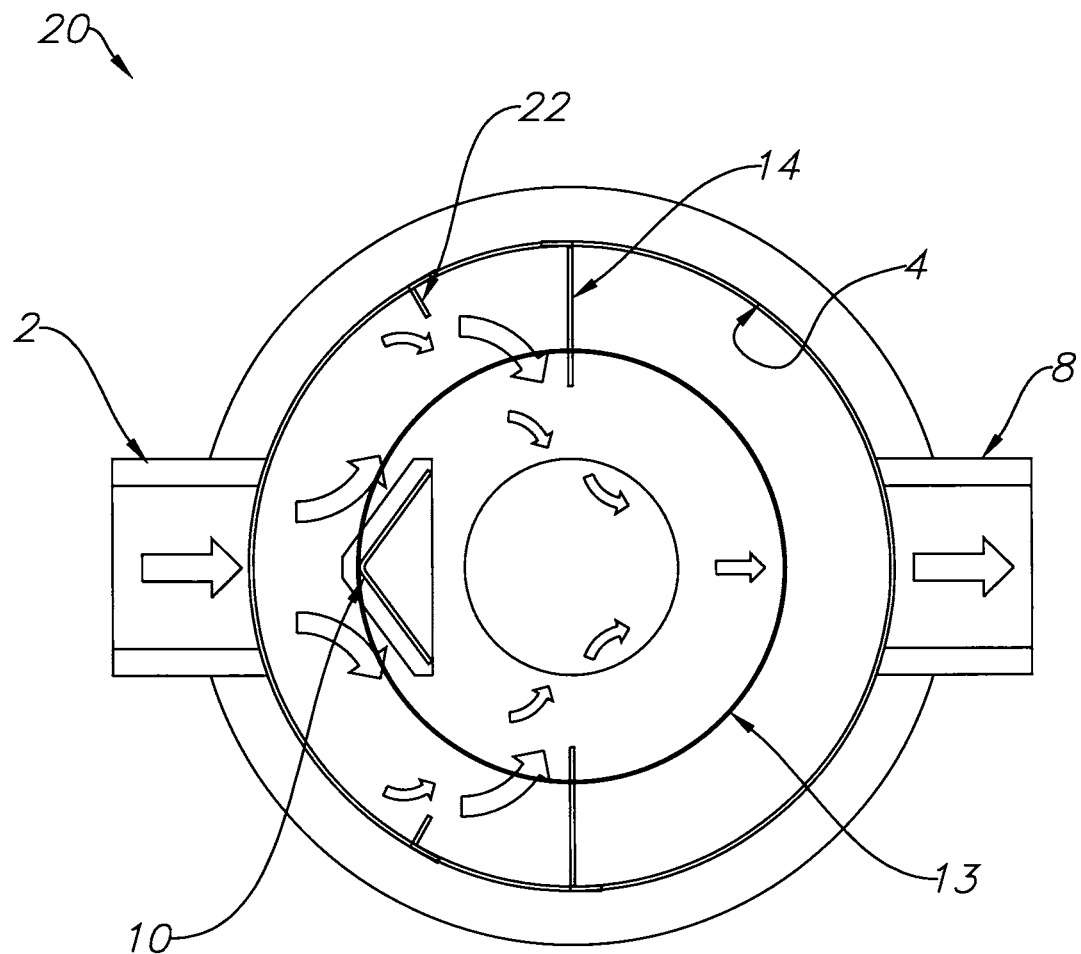
FIG. 2D is another top view of the cylindrical vault/system of FIG. 2 showing flow line arrows inside the vault.

Second Embodiment Cylindrical Vault/System with Inflow Deflector, Horizontal Deflector, High Profile Vertical Baffles and Low Profile Vertical Baffles FIG. 2 is a top view of a second embodiment of a cylindrical vault/system 20 with inflow deflector 10, horizontal deflector 12, high profile vertical baffles 14 and low profile vertical baffles 22. FIG. 2A is a side cross-sectional view of the cylindrical vault/system 1 of FIG. 2 along arrows 2A. FIG. 2B is partial cut-away perspective view of the cylindrical vault/system 1 of FIG. 2 and FIG. 2A. FIG. 2C another partial cut-away perspective view of the cylindrical vault/system 1 of FIG. 2 and FIG. 2A. FIG. 2D is another top view of the cylindrical vault/system 1 of FIG. 2 showing flow line arrows inside the vault 1.

Referring to FIGS. 2-2D, the second embodiment vault 20 is similar to the first embodiment vault 20 with the addition of the low profile vertical baffles 22. As described above, as the flow leaves the vicinity of the inflow deflector 10, the flow will first make contact with 1 or more low profile baffles 22. These low-profile baffles 22 can typically extend just a short distance from the side wall 4. The low-profile baffles 22 are relatively easy for the water flow to flow around, however, they convey significant resistance to the flow such that they effectively reduce the linear velocity of the flow. After the water flow has passed the low-profile baffles 22, the flow engages a high-profile baffle 14. The high-profile baffles 14 extend a greater distance from the side wall of the vault 1 than the low-profile baffles 22.

Figure 3:
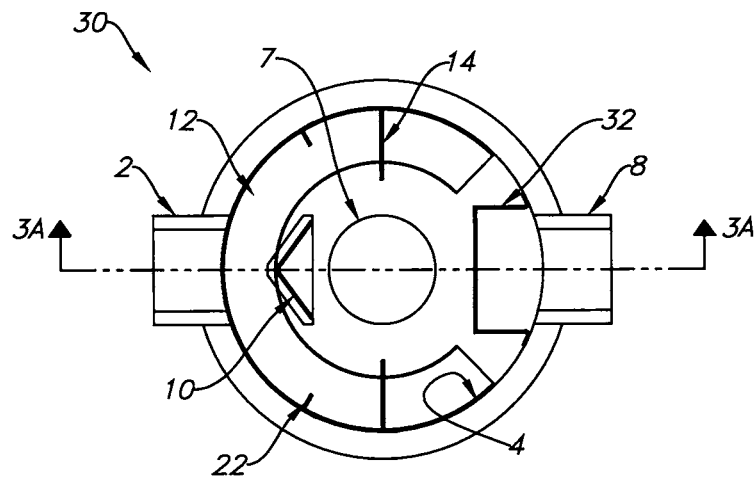
FIG. 3 is a top view of a third embodiment of a cylindrical vault/system with inflow deflector, horizontal deflector, high profile vertical baffles, low profile vertical baffles and skimmer.
Figure 3A:
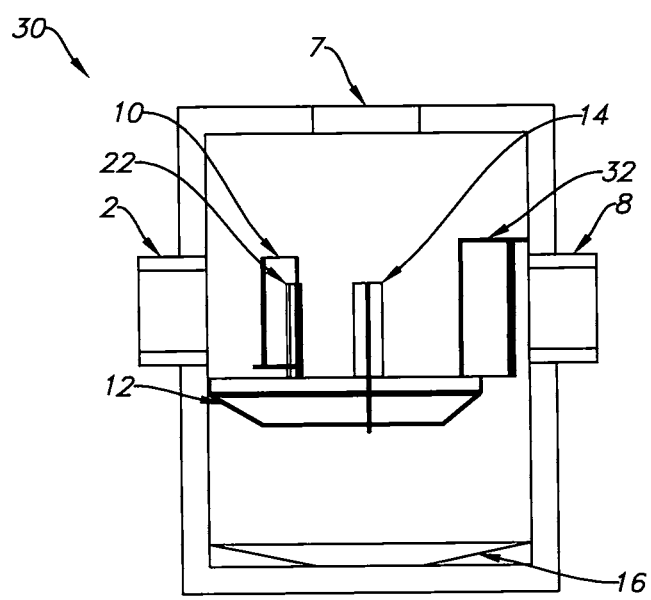
FIG. 3A is a side cross-sectional view of the cylindrical vault/system of FIG. 3 along arrows 3A.
Figure 3B:
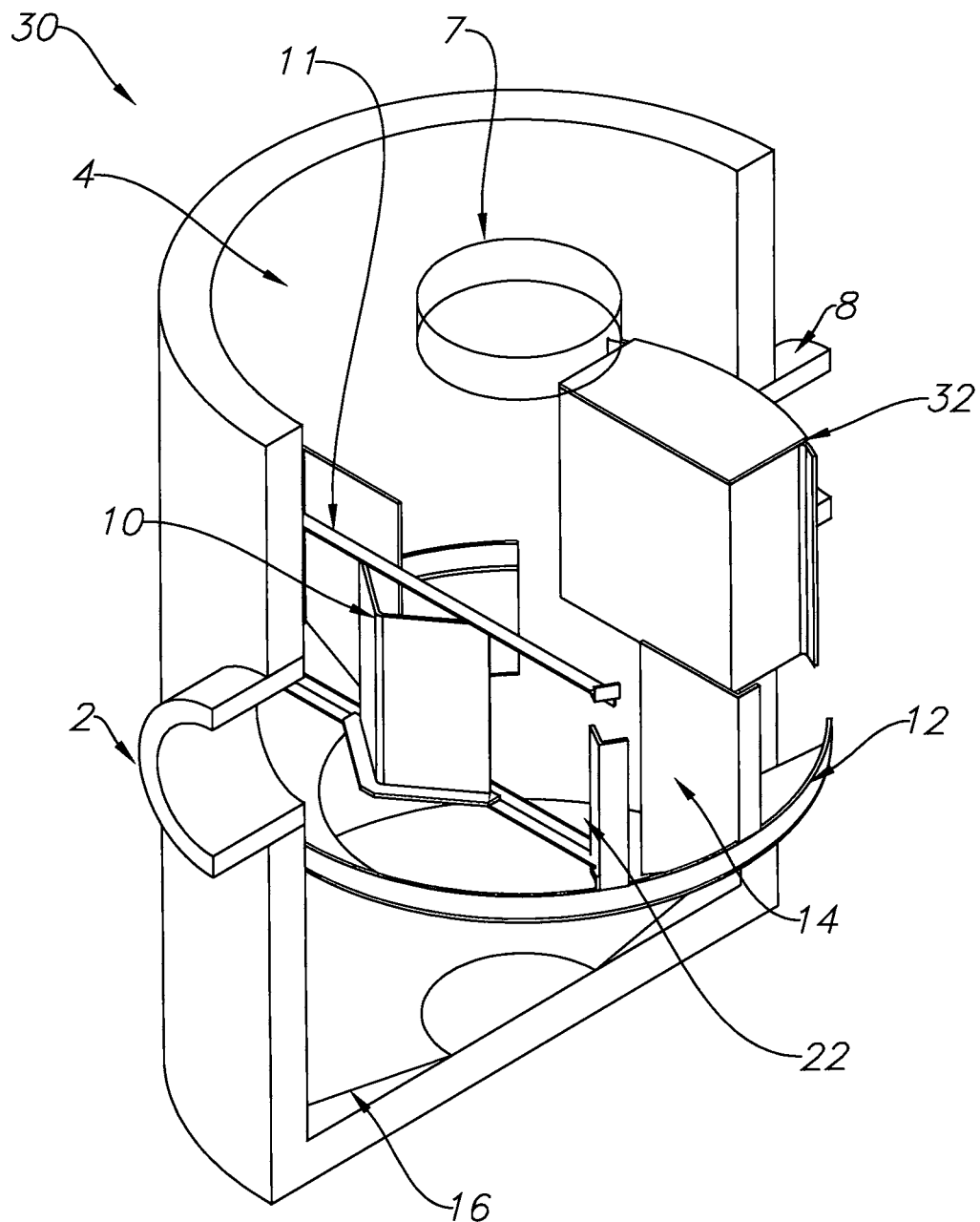
FIG. 3B is partial cut-away perspective view of the cylindrical vault/system of FIG. 3 and FIG. 3A.
Figure 3C:
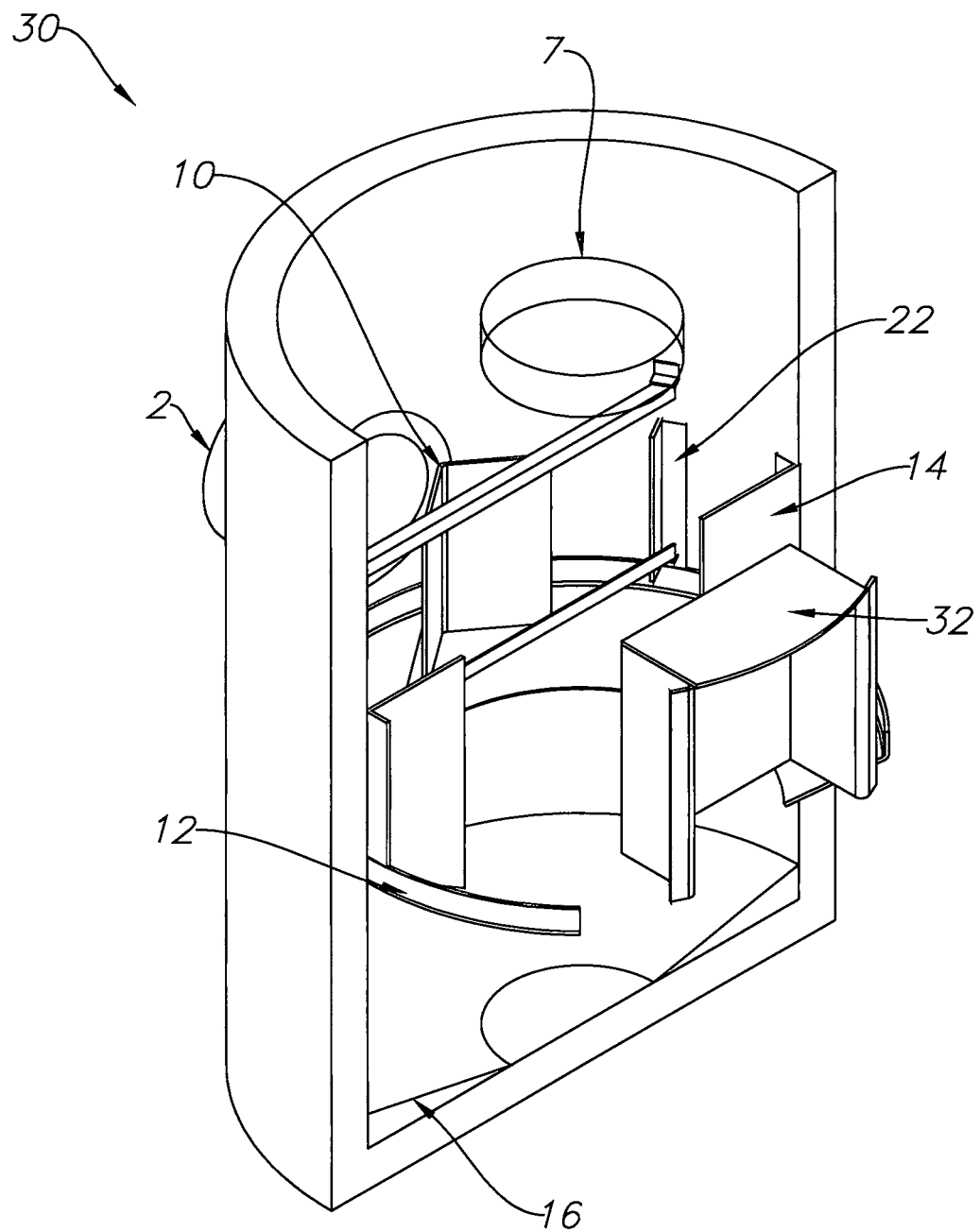
FIG. 3C another partial cut-away perspective view of the cylindrical vault/system of FIG. 3 and FIG. 3A.
Figure 3D:
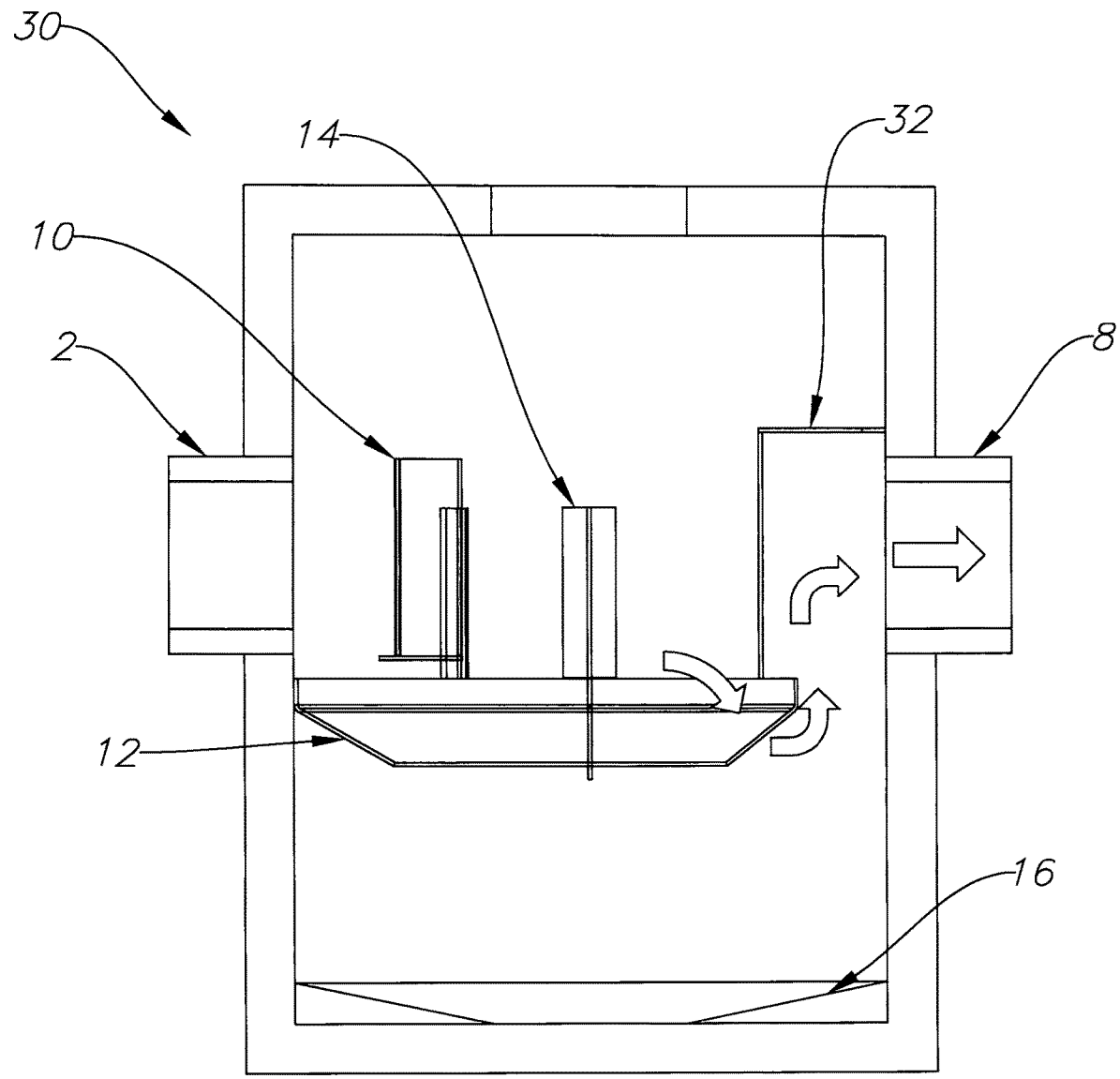
FIG. 3D is another side cross-sectional view of the cylindrical vault/system of FIG. 3A showing flow line arrows inside the vault.
Figure 3E:
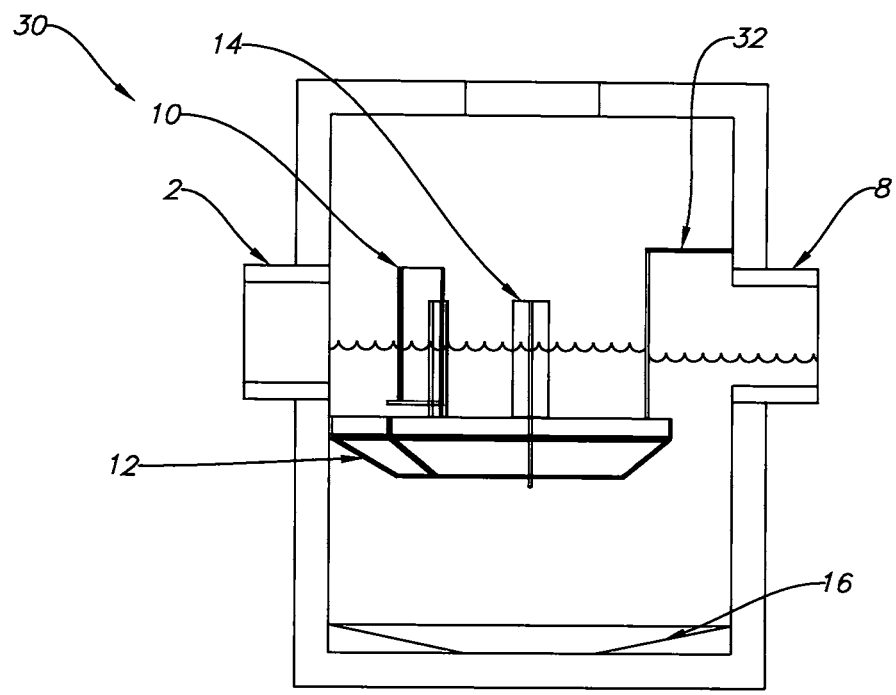
FIG. 3E is another view of the cylindrical vault/system of FIG. 3A showing a low flow water line.
Figure 3F:
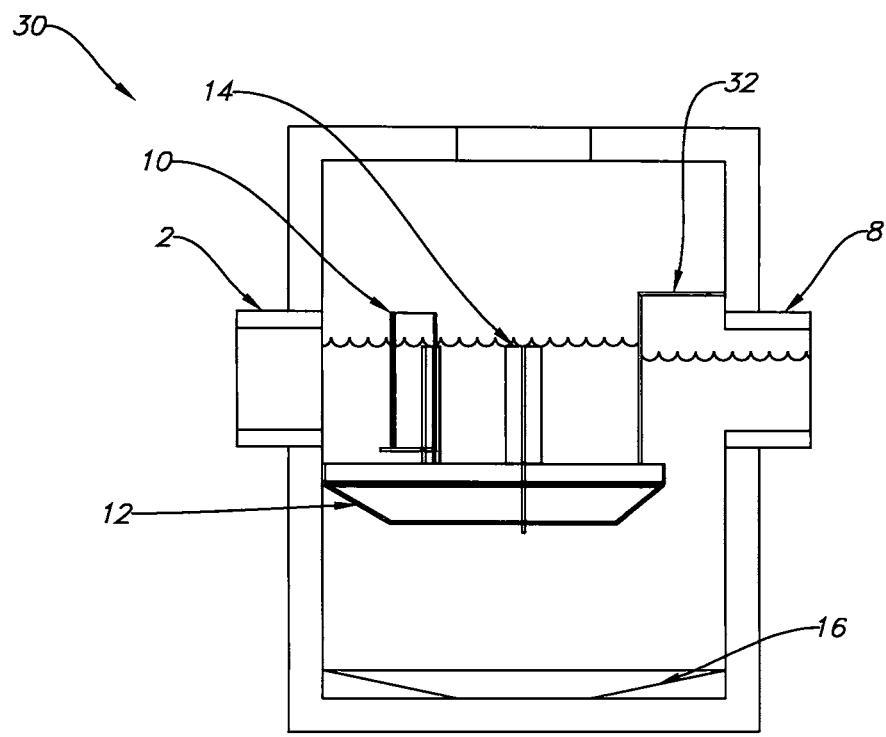
FIG. 3F is another view of the cylindrical vault/system of FIG. 3A showing a low flow water line.

Third Embodiment Cylindrical Vault/System with Inflow Deflector, Horizontal Deflector, High Profile Vertical Baffles, Low Profile Vertical Baffles and Skimmer FIG. 3 is a top view of a third embodiment of a cylindrical vault/system 30 with inflow deflector 10, horizontal deflector 12, high profile vertical baffles 14, low profile vertical baffles 22 and open bottom skimmer 32. FIG. 3A is a side cross-sectional view of the cylindrical vault/system 30 of FIG. 3 along arrows 3A. FIG. 3B is partial cut-away perspective view of the cylindrical vault/system 30 of FIG. 3 and FIG. 3A. FIG. 3C another partial cut-away perspective view of the cylindrical vault/system 30 of FIG. 3 and FIG. 3A. FIG. 3D is another side cross-sectional view of the cylindrical vault/system 30 of FIG. 3A showing flow line arrows inside the vault 30. FIG. 3E is another view of the cylindrical vault/system 30 of FIG. 3A showing a low flow water line. FIG. 3F is another view of the cylindrical vault/system 30 of FIG. 3A showing a low flow water line.

Referring to FIGS. 3-3F, the third embodiment vault 30 can include the features of the previous embodiment 20 with the addition of an open bottom skimmer 32.

The invention can be enhanced by adapting a skimmer 32 in front of the outflow opening or pipe 8. To prevent the conveyance of floating debris such as litter and/or lighter that water liquids such as petroleum products a skimmer 32 can be placed in front of the outflow opening or pipe 8 from which water exits the vault 30. The lower bottom edge of the skimmer 30 will be at an elevation so that when no water is flowing, the Hydraulic Grade Line (HGL) of the water is above the lower edge of the skimmer. As water begins to flow the HGL will automatically begin to rise within the invention and up the face of the skimmer 32. A conveyance along the lower edge of the skimmer will convey water flow allowing water to flow into the outflow opening. As the HGL rises so will the floating debris and liquids within the vault. As the HGL rises the distance between the floating debris and liquids, and the conveyance along the lower edge of the skimmer 32 increases. The skimmer 32 can function as a barrier between the floating debris and liquids and the outflow opening 8 of the vault 30 while still enabling water flow to continue to exit the vault 30.

Figure 4:
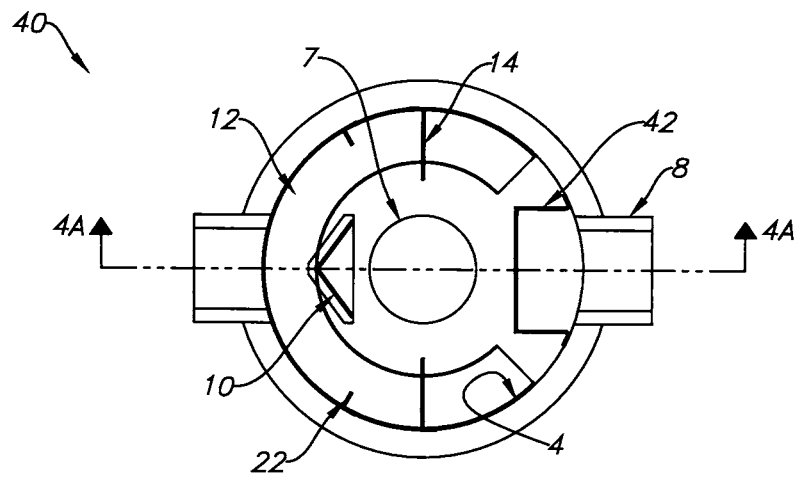
FIG. 4 is a top view of a fourth embodiment of a cylindrical vault/system with inflow deflector, horizontal deflector, high profile vertical baffles, low profile vertical baffles and flow restricted skimmer.
Figure 4A:
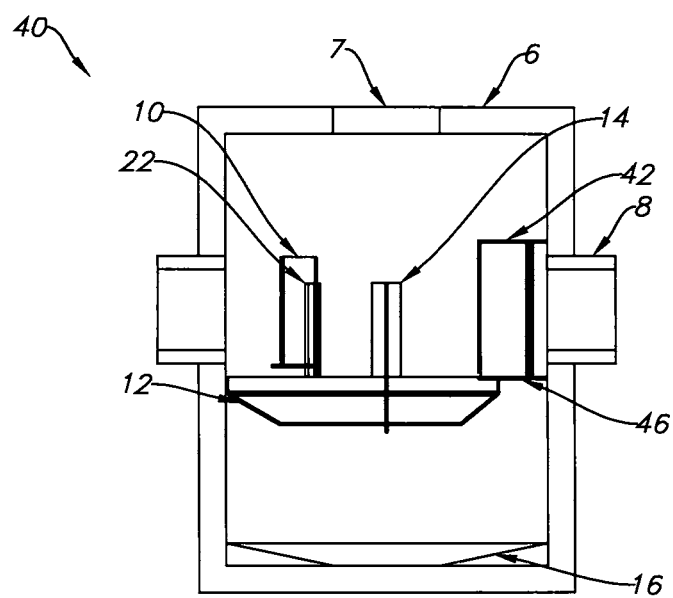
FIG. 4A is a side cross-sectional view of the cylindrical vault/system of FIG. 4 along arrows 4A.
Figure 4B:
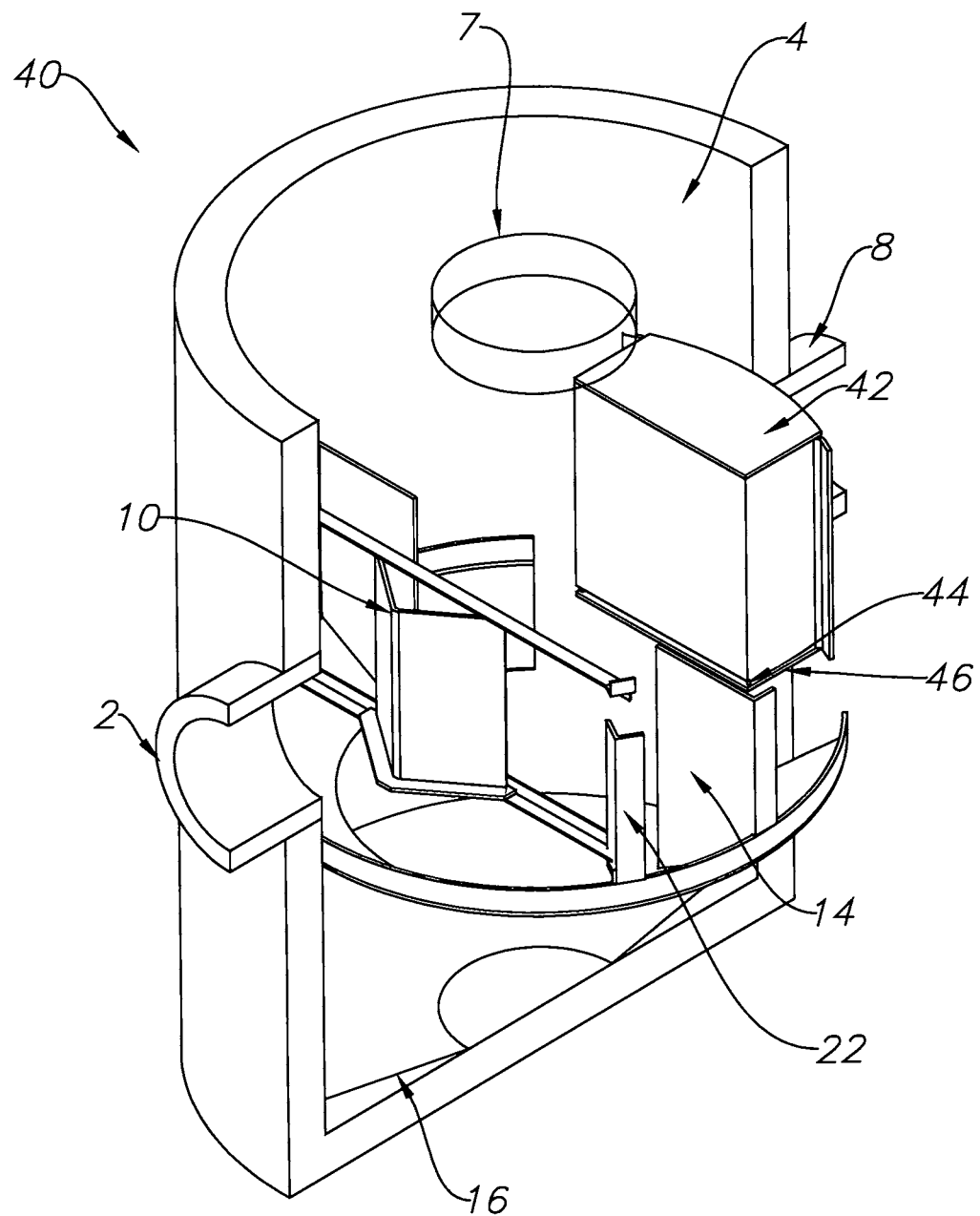
FIG. 4B is partial cut-away perspective view of the cylindrical vault/system of FIG. 4 and FIG. 4A.
Figure 4C:
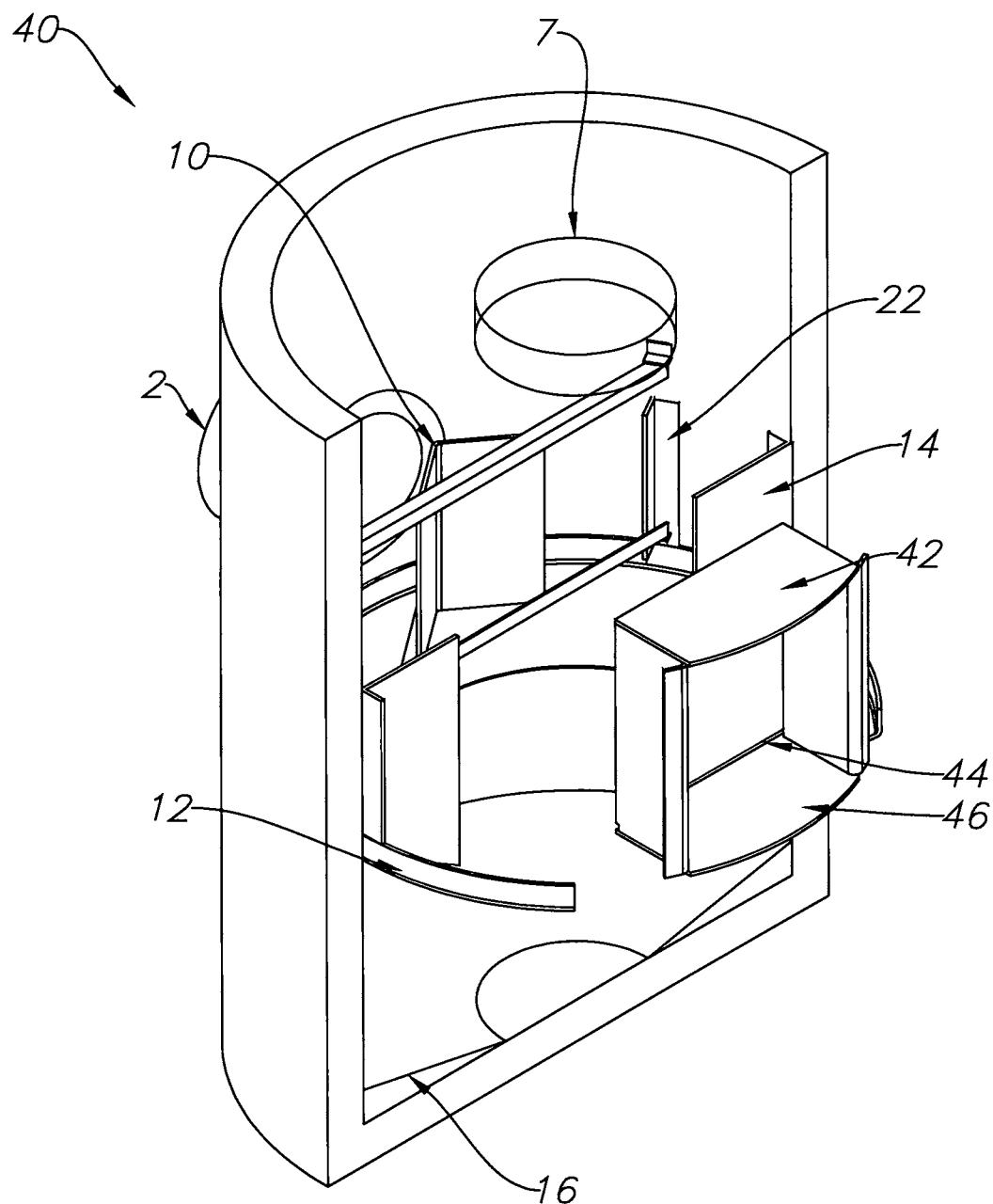
FIG. 4C another partial cut-away perspective view of the cylindrical vault/system of FIG. 4 and FIG. 4A.
Figure 4D:
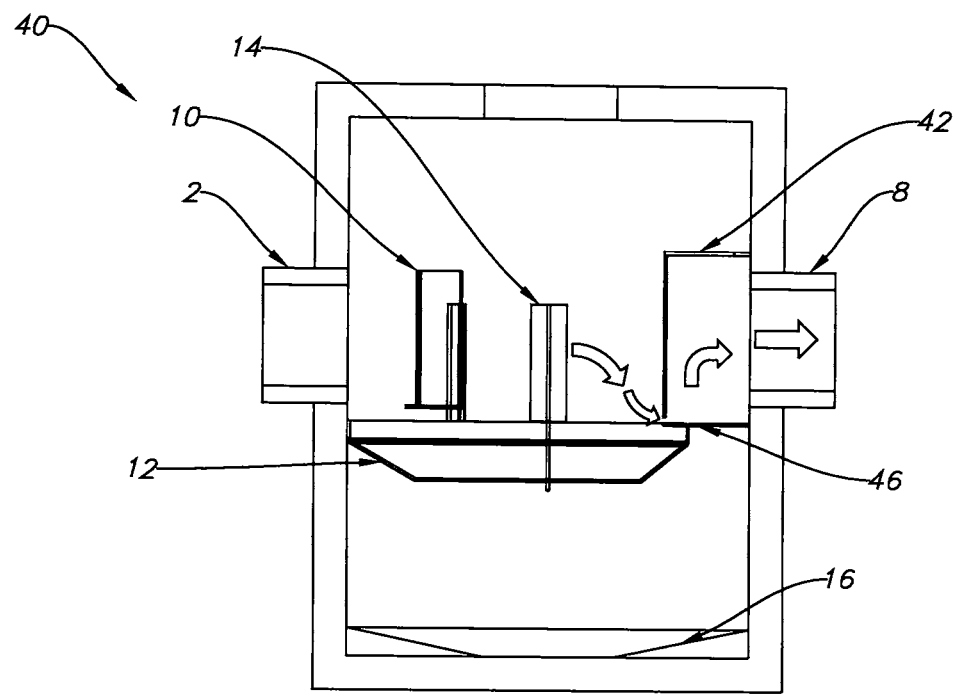
FIG. 4D is another side cross-sectional view of the cylindrical vault/system of FIG. 4A shows flow line arrows of this embodiment inside the vault.
Figure 4E:
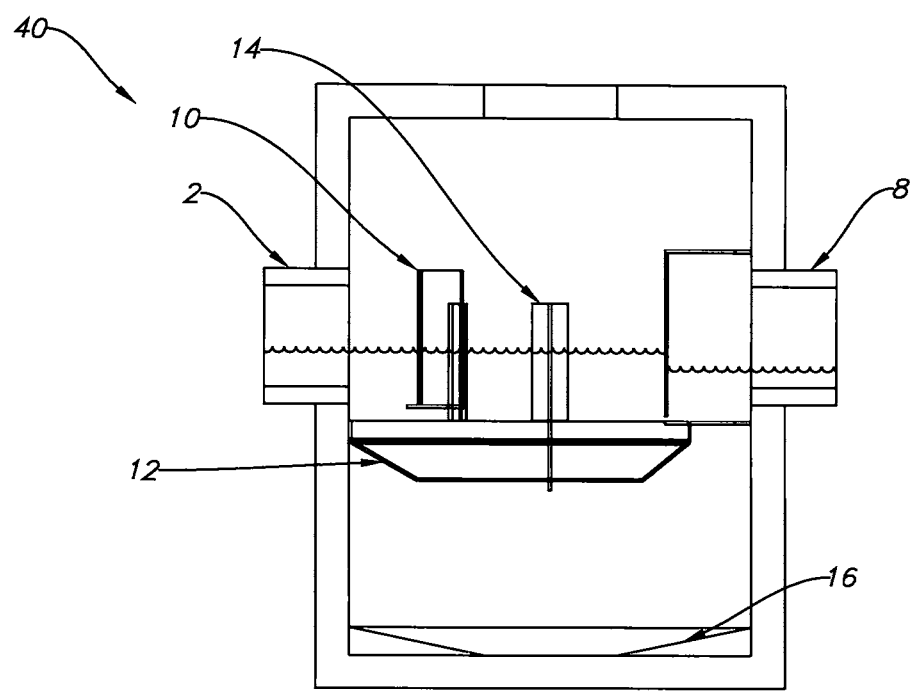
FIG. 4E is another view of the cylindrical vault/system of FIG. 4A showing a low flow water line.
Figure 4F:
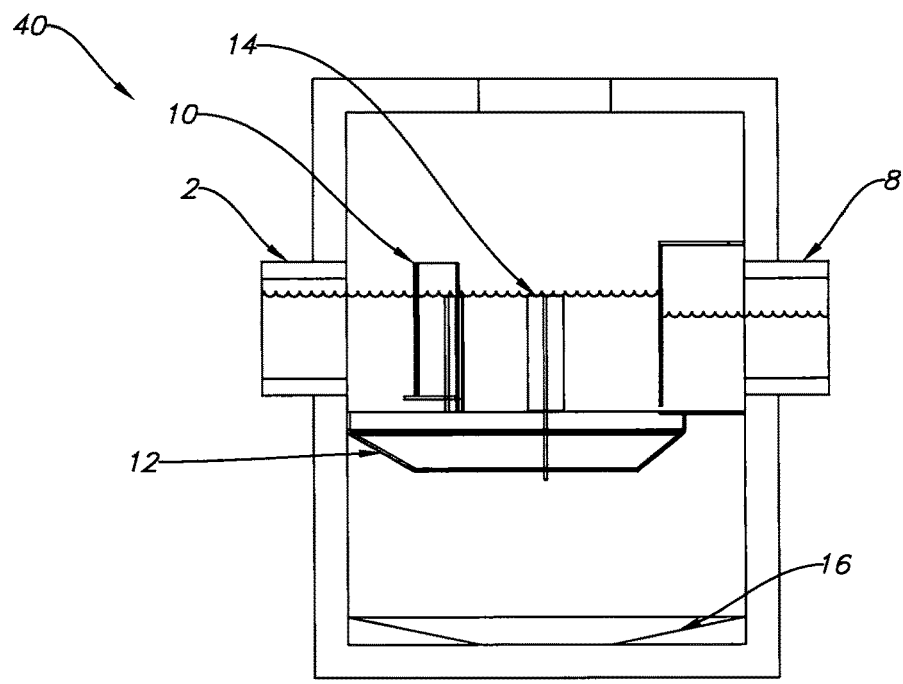
FIG. 4F is another view of the cylindrical vault/system of FIG. 4A showing a low flow water line.
Figure 4G:
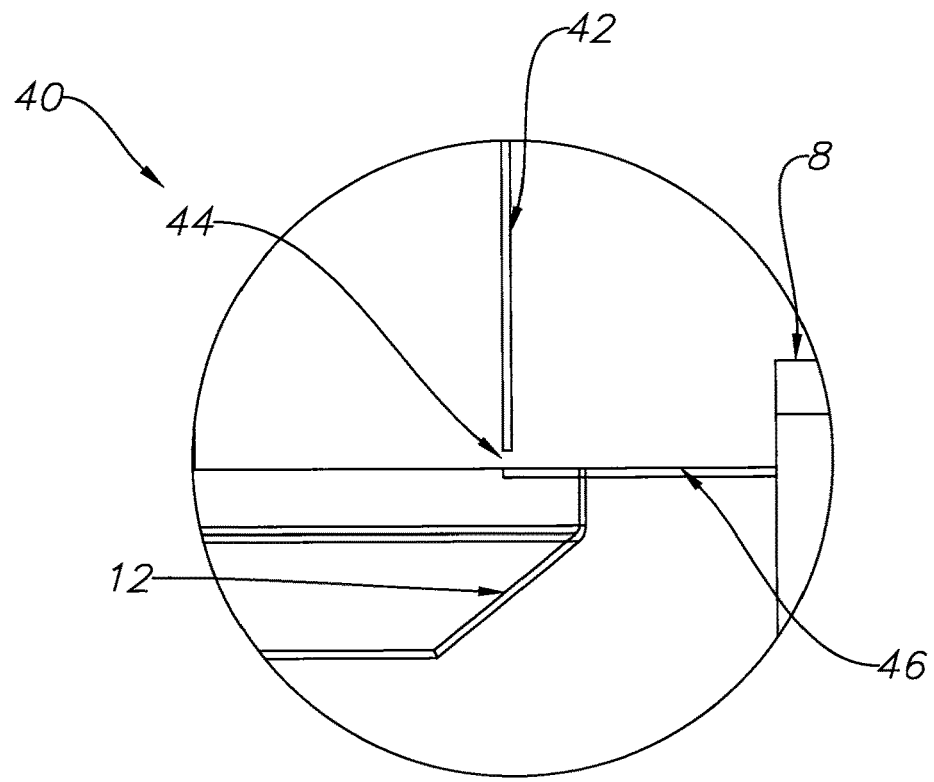
FIG. 4G is an enlarged view of the horizontal deflector, flow restricted skimmer above the shelf with a gap therebetween in front of vault outflow pipe/line.

Fourth Embodiment Cylindrical Vault/System with Inflow Deflector, Horizontal Deflector, High Profile Vertical Baffles, Low Profile Vertical Baffles and Flow Restricted Skimmer FIG. 4 is a top view of a fourth embodiment of a cylindrical vault/system 40 with inflow deflector 10, horizontal deflector 12, high profile vertical baffles 14, low profile vertical baffles 22 and flow restricted skimmer 42. FIG. 4A is a side cross-sectional view of the cylindrical vault/system 40 of FIG. 4 along arrows 4A. FIG. 4B is partial cut-away perspective view of the cylindrical vault/system 40 of FIG. 4 and FIG. 4A. FIG. 4C another partial cut-away perspective view of the cylindrical vault/system 40 of FIG. 4 and FIG. 4A. FIG. 4D is another side cross-sectional view of the cylindrical vault/system 40 of FIG. 4A shows flow line arrows of this embodiment inside the vault 10. FIG. 4E is another view of the cylindrical vault/system 40 of FIG. 4A showing a low flow water line. FIG. 4F is another view of the cylindrical vault/system 40 of FIG. 4A showing a low flow water line. FIG. 4G is an enlarged view of the horizontal deflector 12, flow restricted skimmer 42 above the shelf 46 with a gap 44 therebetween in front of vault outflow pipe/line 8.

Referring to FIGS. 4-4G, the fourth embodiment vault system 40 is similar to the previous embodiment 30 with the substitution of the flow restricted skimmer 42, shelf 46 and gap 44 therebetween instead of the open bottom skimmer 32.

A flow restricted skimmer 42 can function in much the same way as the before mentioned skimmer 32, but with the added capability of being able to restrict the flow volume. The advantage of a skimmer 42 being able to restrict the flow is that the detention time of the water within the vault system 40 will be increased. Increasing the detention time of the water within the vault system 40 will also increase the pollution removal efficiency.

To restrict the water flow, a flat impervious shelf 46 can be positioned under the skimmer 42 so that the shelf 46 extends fully underneath the skimmer 42. A gap 44 of limited size and cross-sectional area can extend between the bottom edge of the skimmer 42 and the top of the shelf 46. The size of this gap 44 can be determined based on the size of the vault 40 and anticipated water flow rates. The sizing of the gap 44 can be such that the HGL within the vault 40 substantially elevated for medium to high water flow rates without impacting low flow rates. The elevated HGL within the treatment system can substantially increase the cross-sectional conveyance within the vault 40 which will cause the turbulence to reduce. Calming the water flow will enhance the pollution removal efficiency in the vault system 40.

Figure 5:
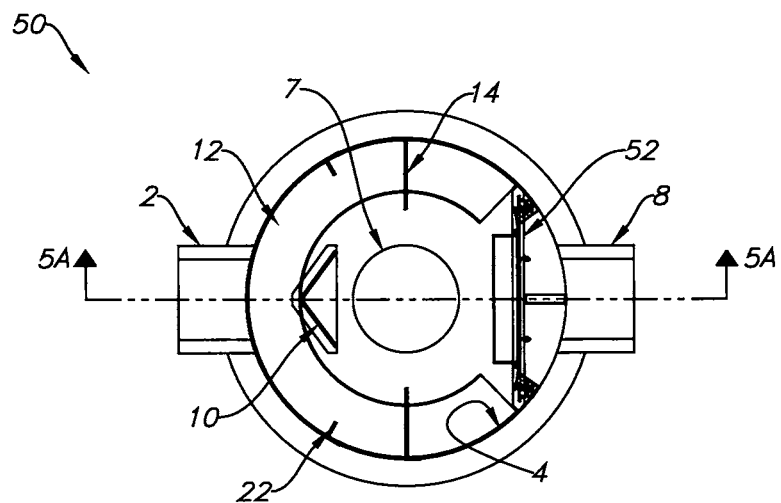
FIG. 5 is a top view of a fifth embodiment of a cylindrical vault/system with inflow deflector, horizontal deflector, high profile vertical baffles, low profile vertical baffles and hydro-variant skimmer.
Figure 5A:
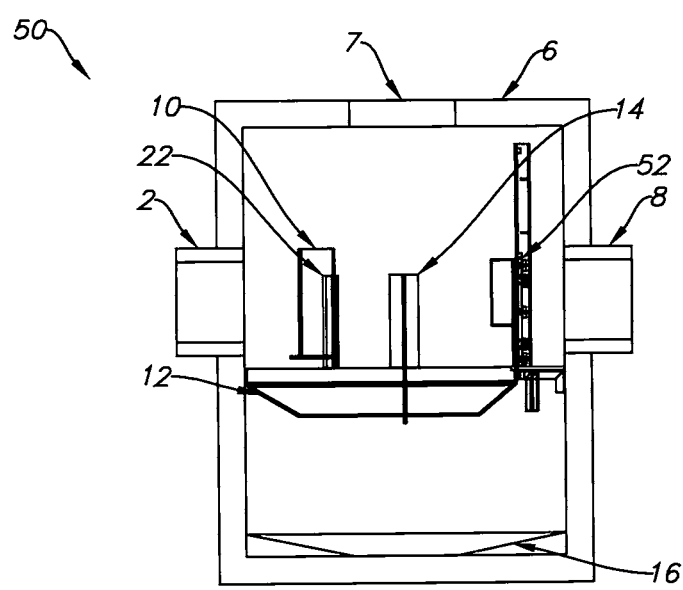
FIG. 5A is a side cross-sectional view of the cylindrical vault/system of FIG. 5 along arrows 5A.
Figure 5B:
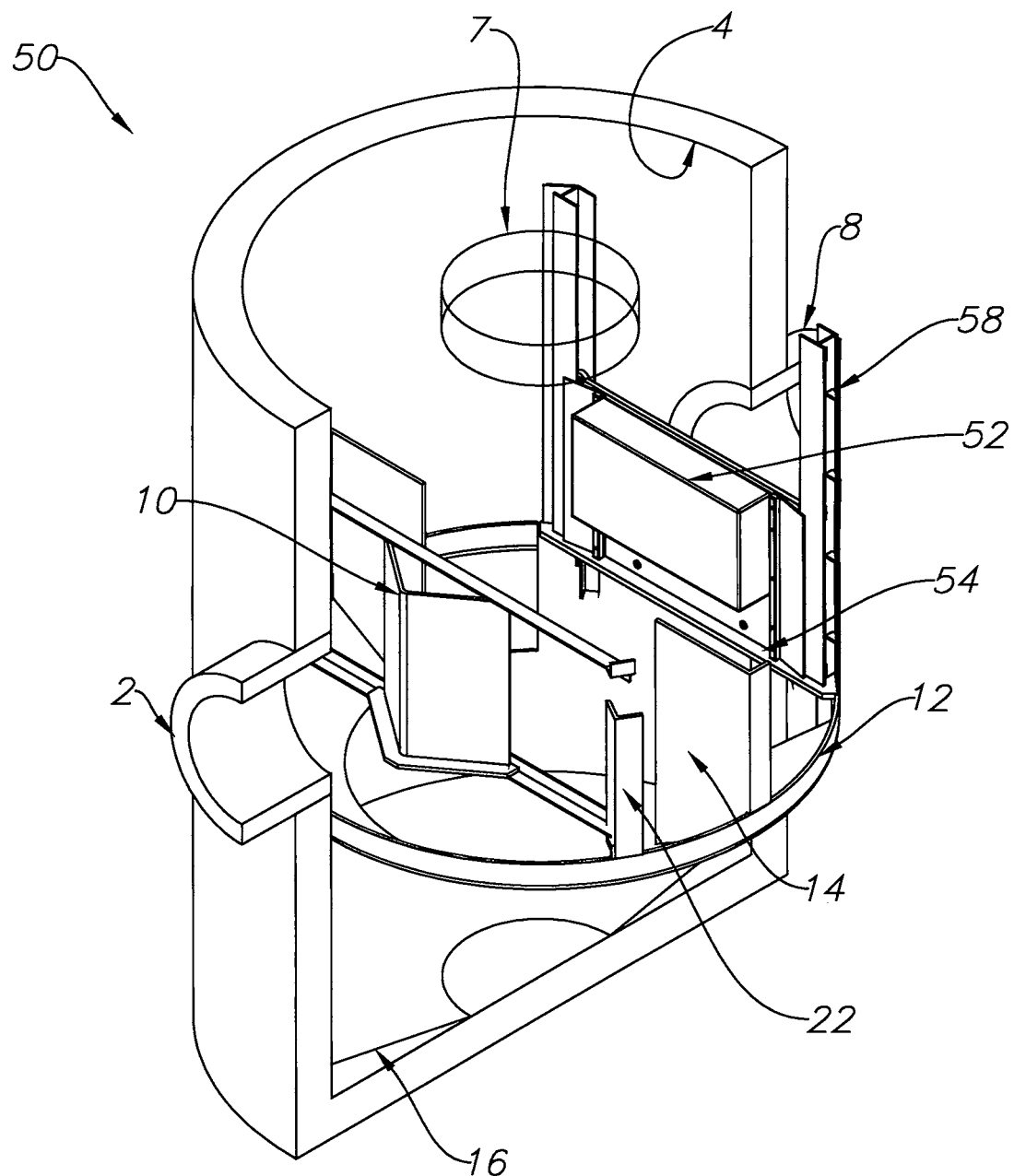
FIG. 5B is partial cut-away perspective view of the cylindrical vault/system of FIG. 5 and FIG. 5A.
Figure 5C:
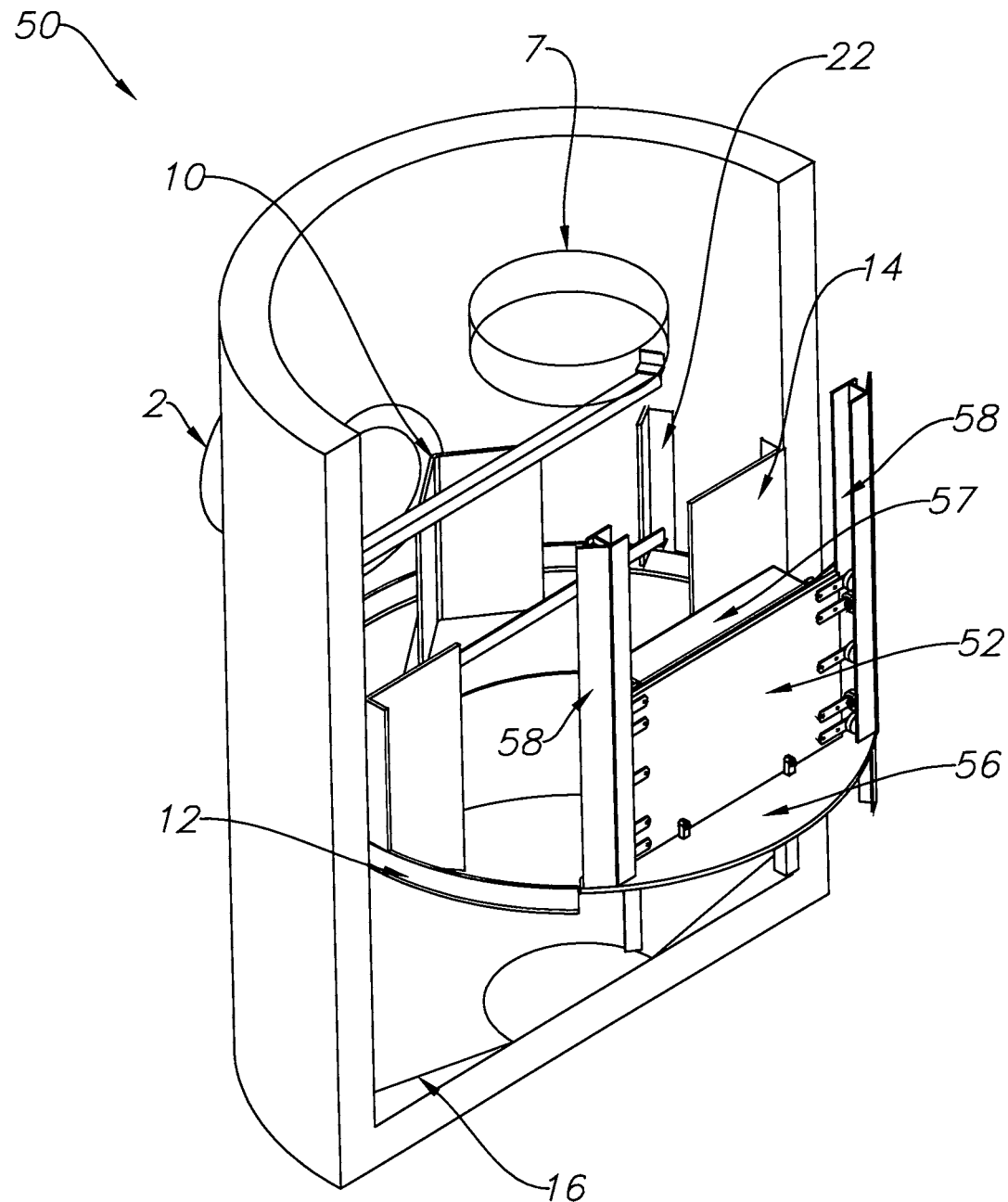
FIG. 5C is another partial cut-away perspective view of the cylindrical vault/system of FIG. 5 and FIG. 5A.
Figure 5D:
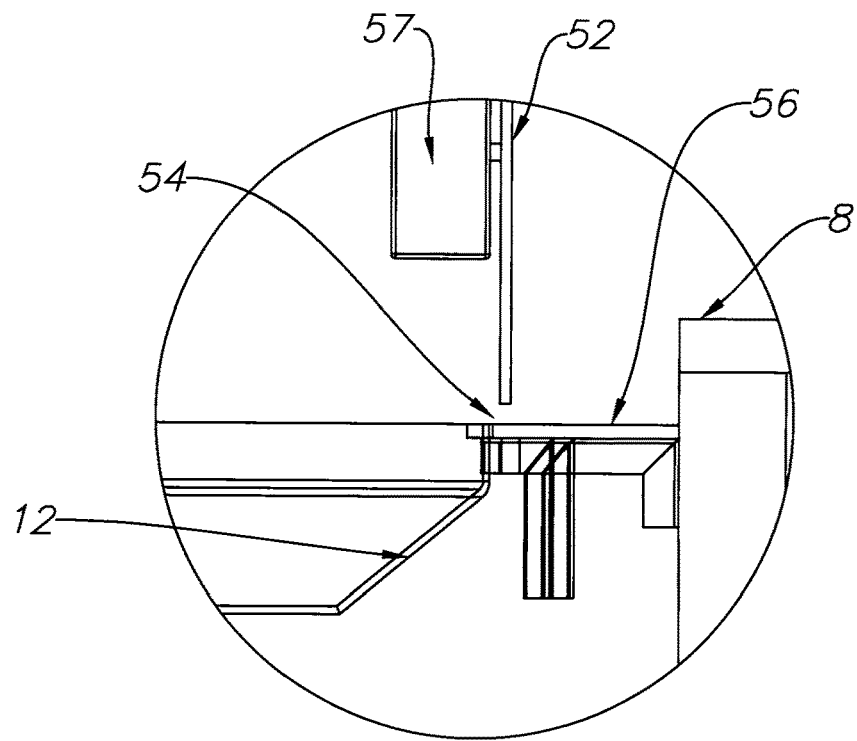
FIG. 5D is an enlarged view of the hydro-variant skimmer with gap above the shelf adjacent to the outflow portal.
Figure 5E:
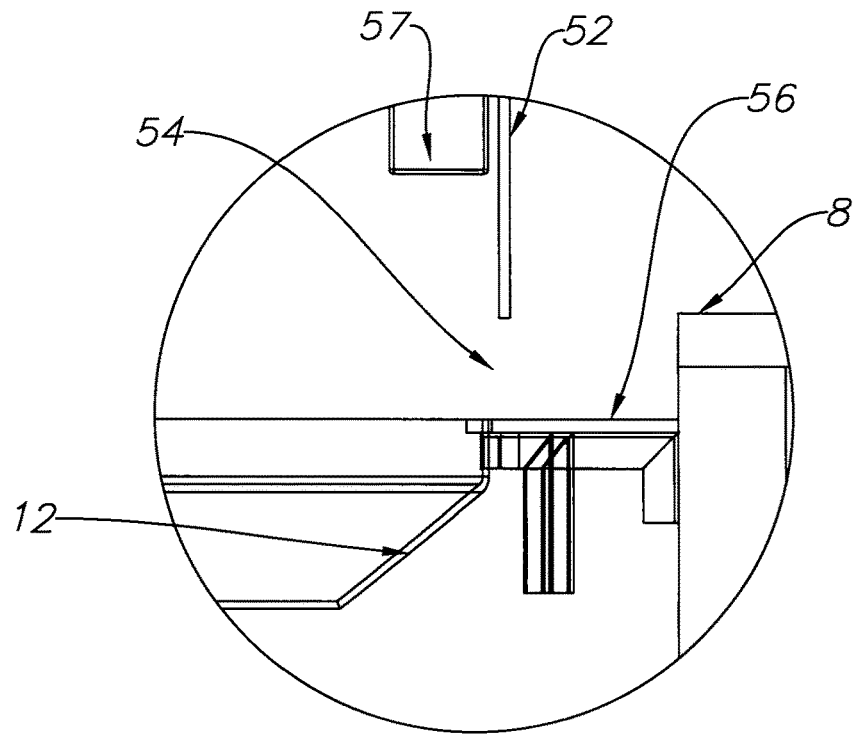
FIG. 5E is another view of the FIG. 5D with the skimmer elevated over the shelf showing a larger gap.

Fifth Embodiment Cylindrical Vault/System with Inflow Deflector, Horizontal Deflector, High Profile Vertical Baffles, Low Profile Vertical Baffles and Hydro-Variant Skimmer FIG. 5 is a top view of a fifth embodiment of a cylindrical vault/system 50 with inflow deflector 10, horizontal deflector 12, high profile vertical baffles 14, low profile vertical baffles 22 and hydro-variant skimmer 52. FIG. 5A is a side cross-sectional view of the cylindrical vault/system 50 of FIG. 5 along arrows 5A. FIG. 5B is partial cut-away perspective view of the cylindrical vault/system 50 of FIG. 5 and FIG. 5A. FIG. 5C is another partial cut-away perspective view of the cylindrical vault/system 50 of FIG. 5 and FIG. 5A. FIG. 5D is an enlarged view of the hydro-variant skimmer 52 with gap 52 above the shelf 56 adjacent to the outflow portal 8. FIG. 5E is another view of the FIG. 5D with the skimmer 52 elevated over the shelf 56 showing a larger gap 54.

Figure 5F:
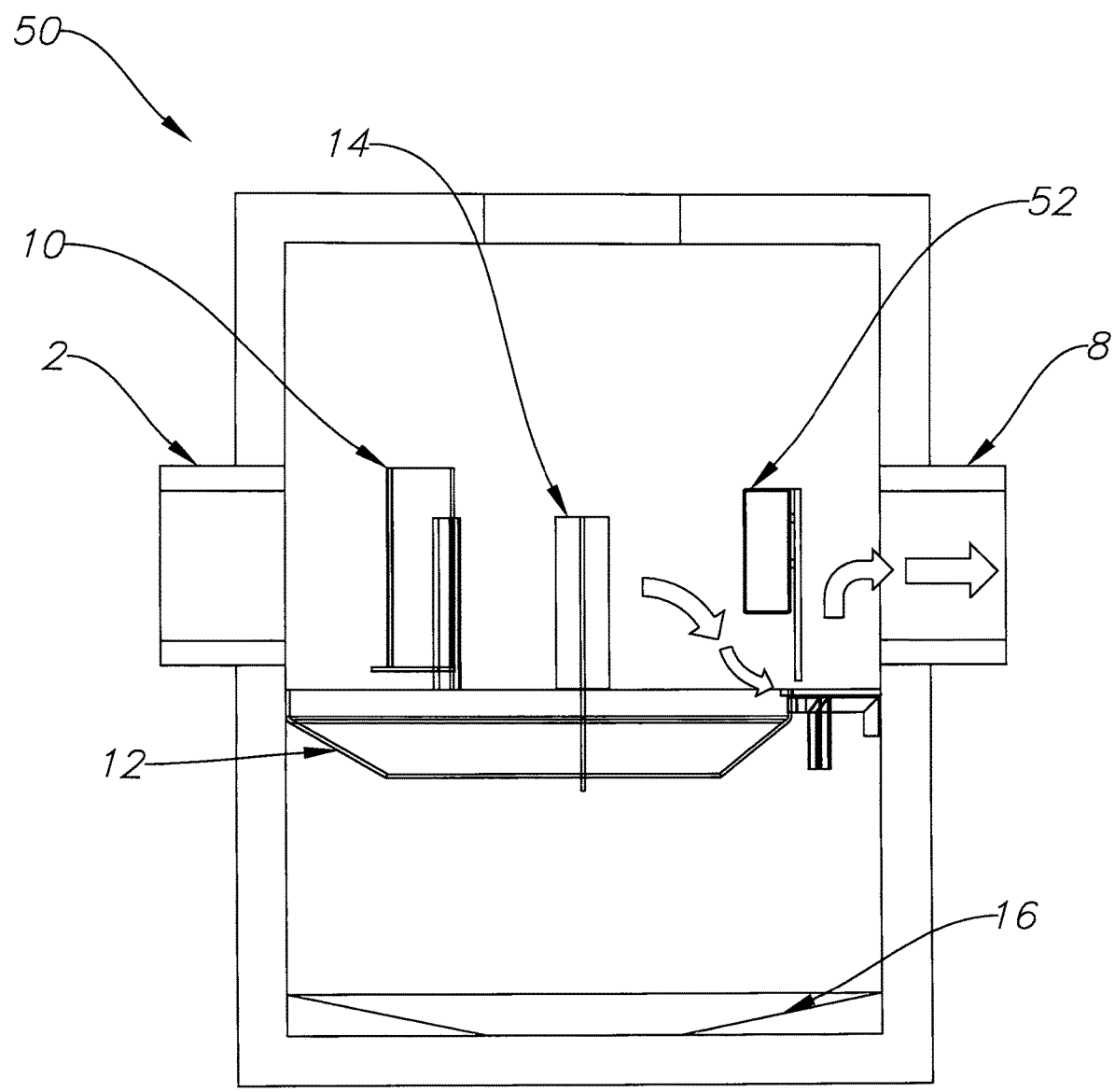
FIG. 5F is another side cross-sectional view of the cylindrical vault of FIG. 5A showing the flow line arrows inside the vault.
Figure 5G:
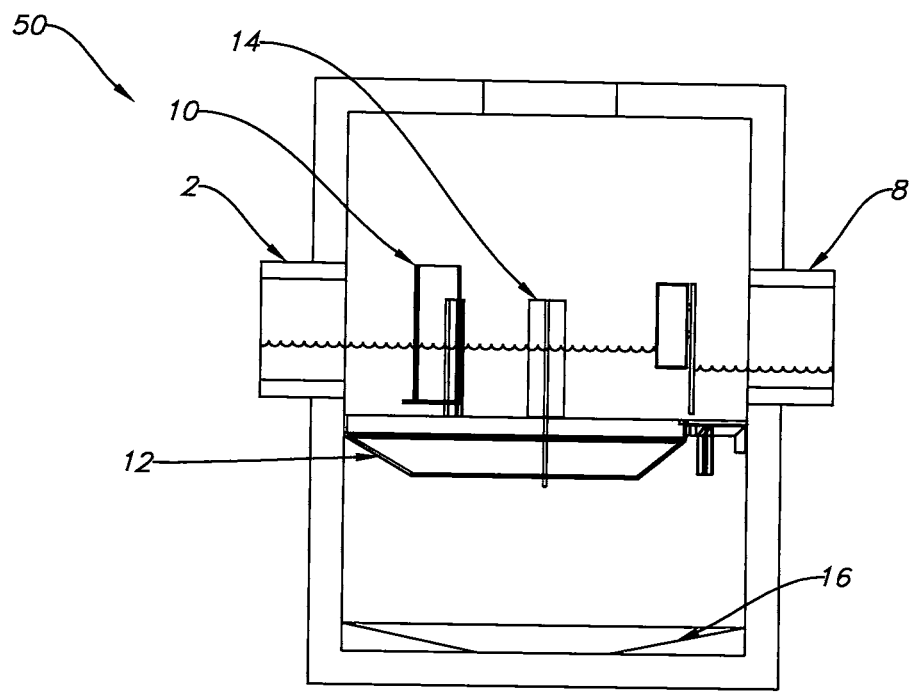
FIG. 5G is another view of the cylindrical vault/system of FIG. 5A showing a low flow water line.
Figure 5H:
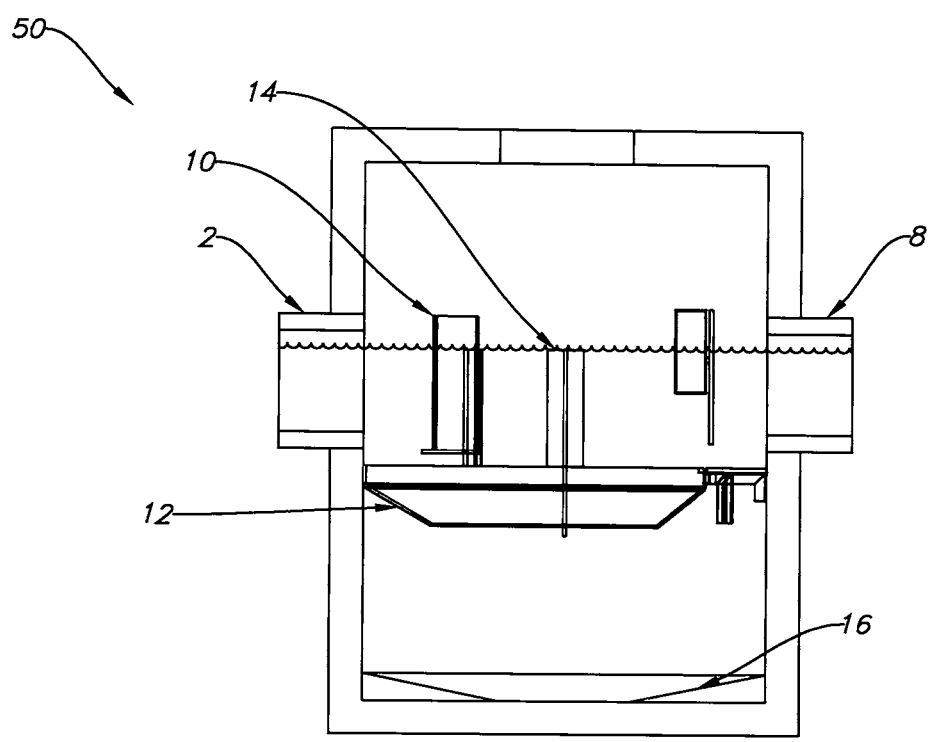
FIG. 5H is another view of the cylindrical vault/system of FIG. 5A showing a low flow water line.

FIG. 5F is another side cross-sectional view of the cylindrical vault 50 of FIG. 5A showing the flow line arrows inside the vault 50. FIG. 5G is another view of the cylindrical vault/system 50 of FIG. 5A showing a low flow water line. FIG. 5H is another view of the cylindrical vault/system 50 of FIG. 5A showing a low flow water line.

Referring to FIGS. 5-5F, the fifth embodiment 50 is similar to the previous embodiment 40 with the exception of using a hydro-variant skimmer 52 instead of a flow restricted skimmer 42.

The hydro-variant skimmer 52 can be mounted to side walls 4 and can slide up and down by a track system/vertical channels 58.

The invention can include a hydro-variant skimmer, such as those shown and described in U.S. Pat. No. 9,534,368 to Happel and in U.S. patent application Ser. No. 15/248,202 filed Aug. 26, 2016 to Happel; Ser. No. 15/658,864 filed Jul. 25, 2017 to Happel; Ser. No. 15/686,931 filed Aug. 25, 2017 to Happel; and Ser. No. 15/948,011 filed Apr. 9, 2018 to Happel, which are each incorporated by reference in their entirety.

The invention can include the enhanced detention the before the skimmer 52 with the added capability of being able to automatically adjust the potential flow in the gap 54 under the lower edge of the skimmer 52. There are several advantages gained by having a skimmer 52 whereby the hydraulics are automatically adjustable.

Many types of water treatment systems make use of a diversion vault that directs water flow away from a primary water pipe toward a treatment system which is positioned out of the line of full flow, commonly referred to as an off-line treatment system. The water that is treated by the treatment system is then conveyed back into the primary water pipe by means of a downstream convergence structure. Typically, a diversion vault has an internal weir (baffle) that is limited in height so that it can be topped by water flow during high flow rain events. A conveyance out the side of the diversion vault on the upstream side of the weir will direct water flow toward the offline treatment system. The height of the diversion weir in the diversion vault is a critical factor for determining the potential flow volume that is directed toward the offline treatment system. \

A primary factor for determining the potential flow volume being directed offline for treatment is the difference in the HGL between HGL on the upstream side of the diversion weir and the downstream side of the diversion weir. This difference in HGL is the hydraulic incentive for water to flow offline. When flow rate of a primary water pipe is adequate for the HGL to top the diversion weir, water flow will begin to take the path of least resistance and begin flowing over the diversion weir. An important fact is that all water that passes over top the diversion weir does not receive treatment. When water flow is passing over top the diversion weir, the HGL difference between the upstream side and downstream side of the weir is quickly reduced and can be reduced to no difference. When there is no difference between the HGL on the upstream and downstream side of the diversion weir, water is no longer ducted offline for treatment, and all water treatment completely ends.

This embodiment 50 can use a hydro-variant skimmer system 52 to significantly enhance the removal efficiency of pollutants by increasing and maximizing detention time in the water treatment system 50. The hydro-variant skimmer system 52 can include a skimmer panel that is able to vertically within a track system/channels 58 to constrict water flow during low to medium size flow events and can gradually rise within the vault 50 floating with the rising HGL.

The skimmer panel 52 can sit at rest above a horizontal shelf with a small gap 54 between the bottom edge of the skimmer panel 52 and the top surface of the shelf 56. A float(s) 57 can be attached to the upstream side of the skimmer panel 52 and can be positioned so that water can surround and encapsulate the float(s) 57 when the HGL is high. There can be a space between the float(s) 57 and the skimmer panel 52 which enables the float(s) 57 to be surrounded by water.

The position of the float(s) 57 on the upstream side of the skimmer panel 52 enables the buoyancy of the skimmer 52 to be dependent on just the HGL along the upstream side of the skimmer 52. Upstream side buoyancy means that an HGL on the downstream side of the skimmer panel 52 does not need to be present to make the skimmer 52 float and move vertically. Seals along both ends of the skimmer panel 52 can seal against the track system 58 to prevent floating debris and liquid pollution from passing the skimmer 52 and entering the outflow pipe 8 of the treatment system 50.

The hydro-variant skimmer system 52 can be able to automatically adjust vertically maximize water detention time within the treatment system 50 during low to medium water flow events. Greater detention time within the treatment system 50 can improve the removal efficiency of pollutants. During higher flowing rain events that are associated with higher HGL levels that can be able to flow over top of an associated diversion weir, the space (gap) 54 between the bottom edge of the skimmer panel 52 and shelf 56 can increase to significantly alter the hydraulics of the invention to prevent the diversion weir from being topped. The hydro-variant skimmer's ability to automatically reduce the headloss associated with the stormwater treatment system 50 enables the invention to remain effective over a much broader range of water flow rates.

Figure 6:
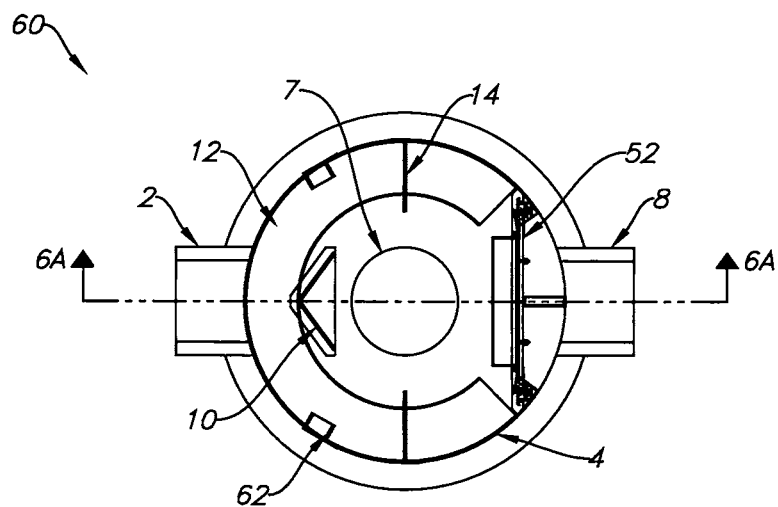
FIG. 6 is a top view of a sixth embodiment of a cylindrical vault/system with inflow deflector, horizontal deflector, high profile vertical baffles, angled low profile vertical baffles and hydro-variant skimmer.
Figure 6A:
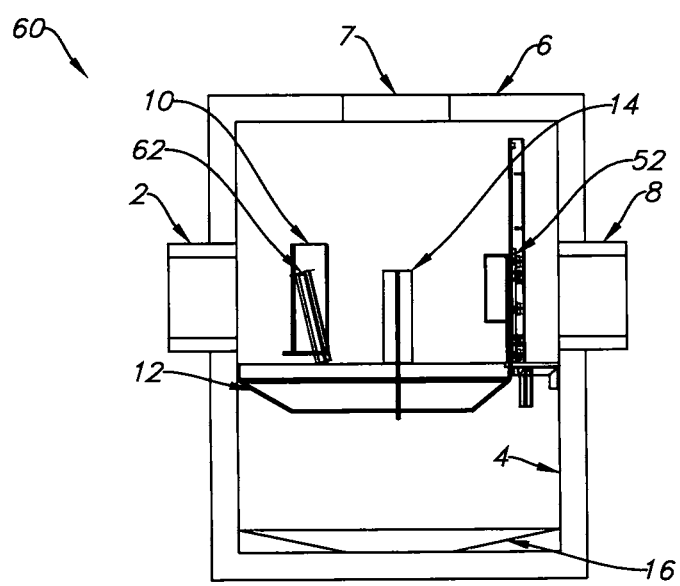
FIG. 6A is a side cross-sectional view of the cylindrical vault/system of FIG. 6 along arrows 6A.
Figure 6B:
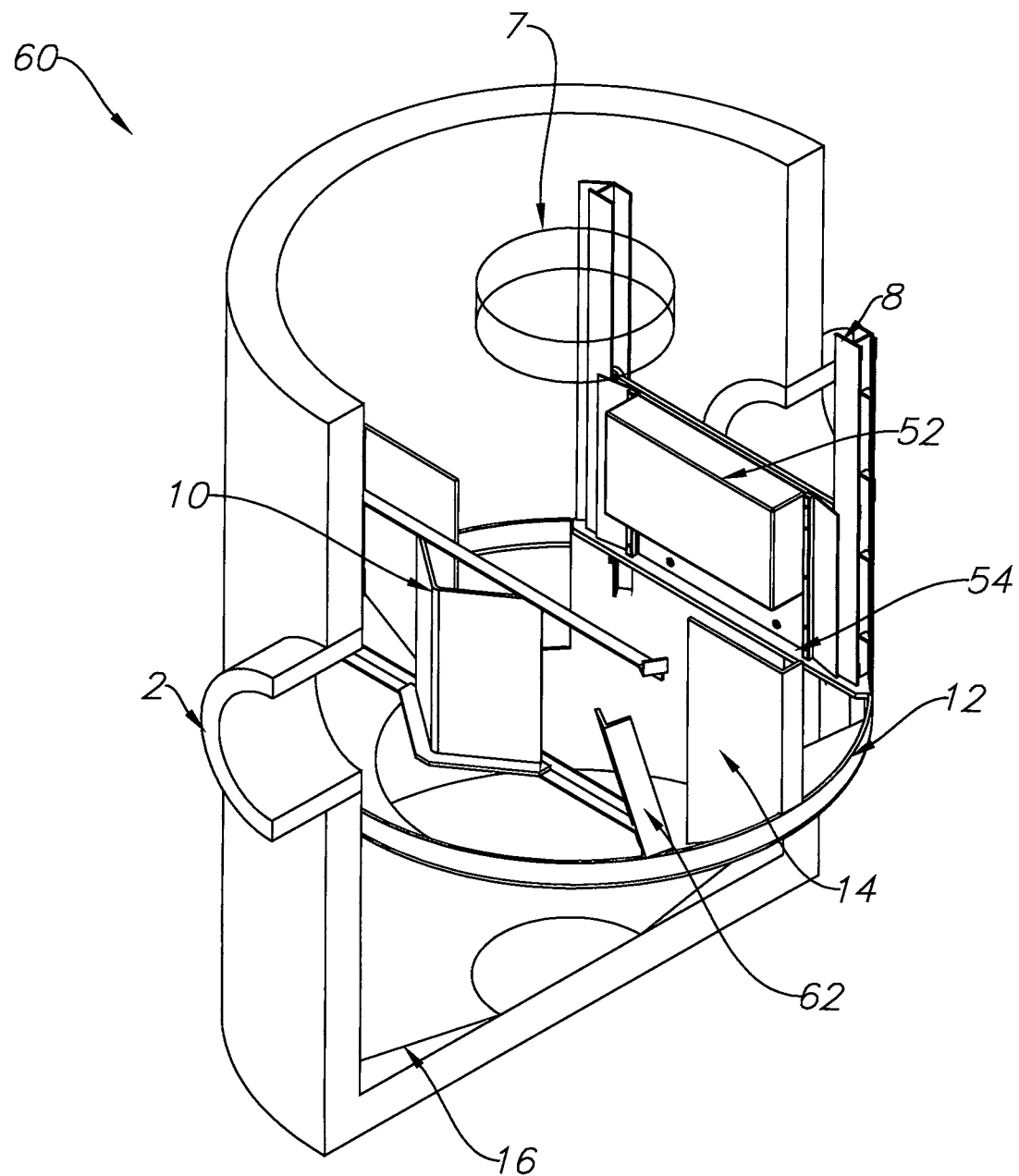
FIG. 6B is partial cut-away perspective view of the cylindrical vault/system of FIG. 6 and FIG. 6A.
Figure 6C:
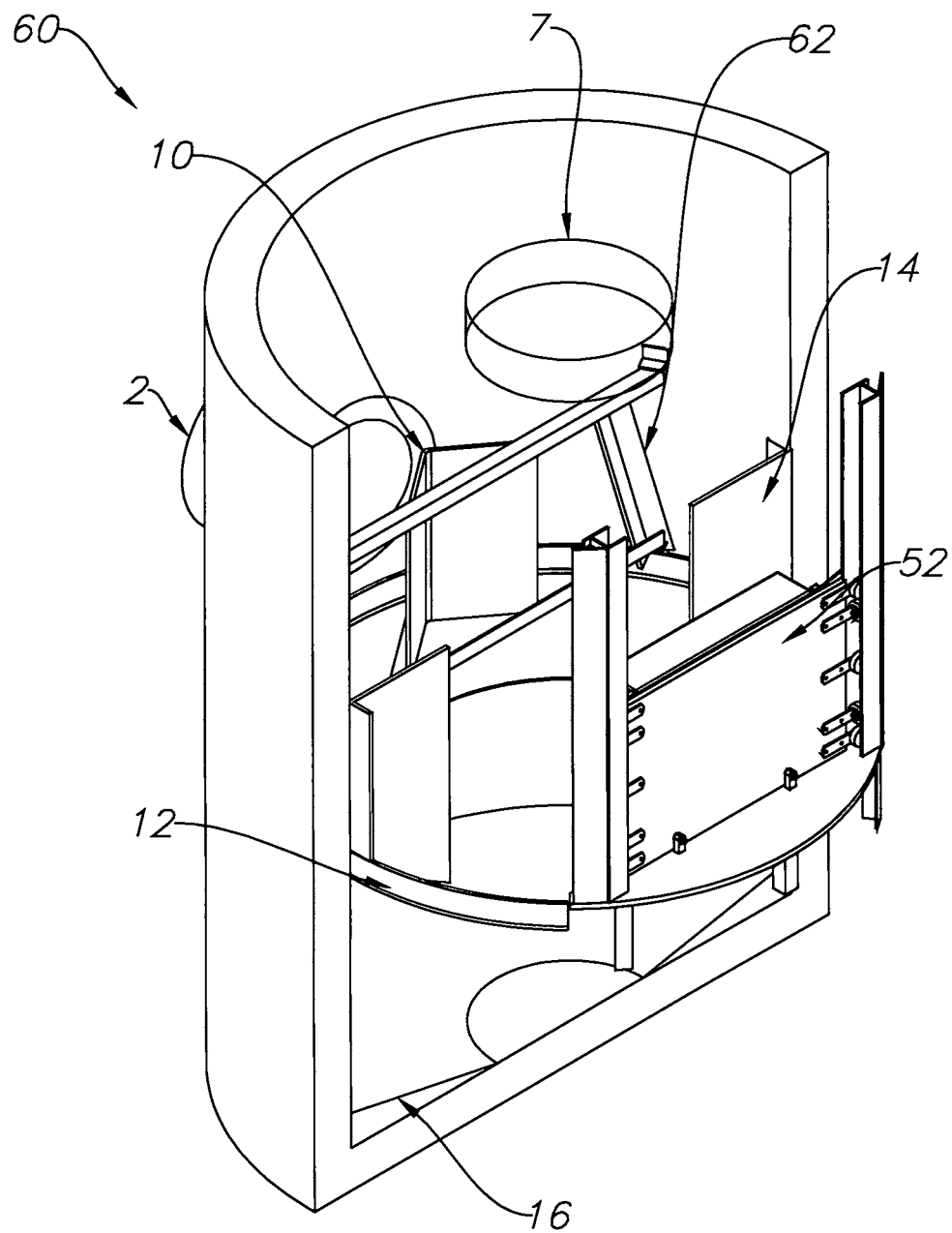
FIG. 6C is another partial cut-away perspective view of the cylindrical vault/system of FIG. 6 and FIG. 6A.
Figure 6D:
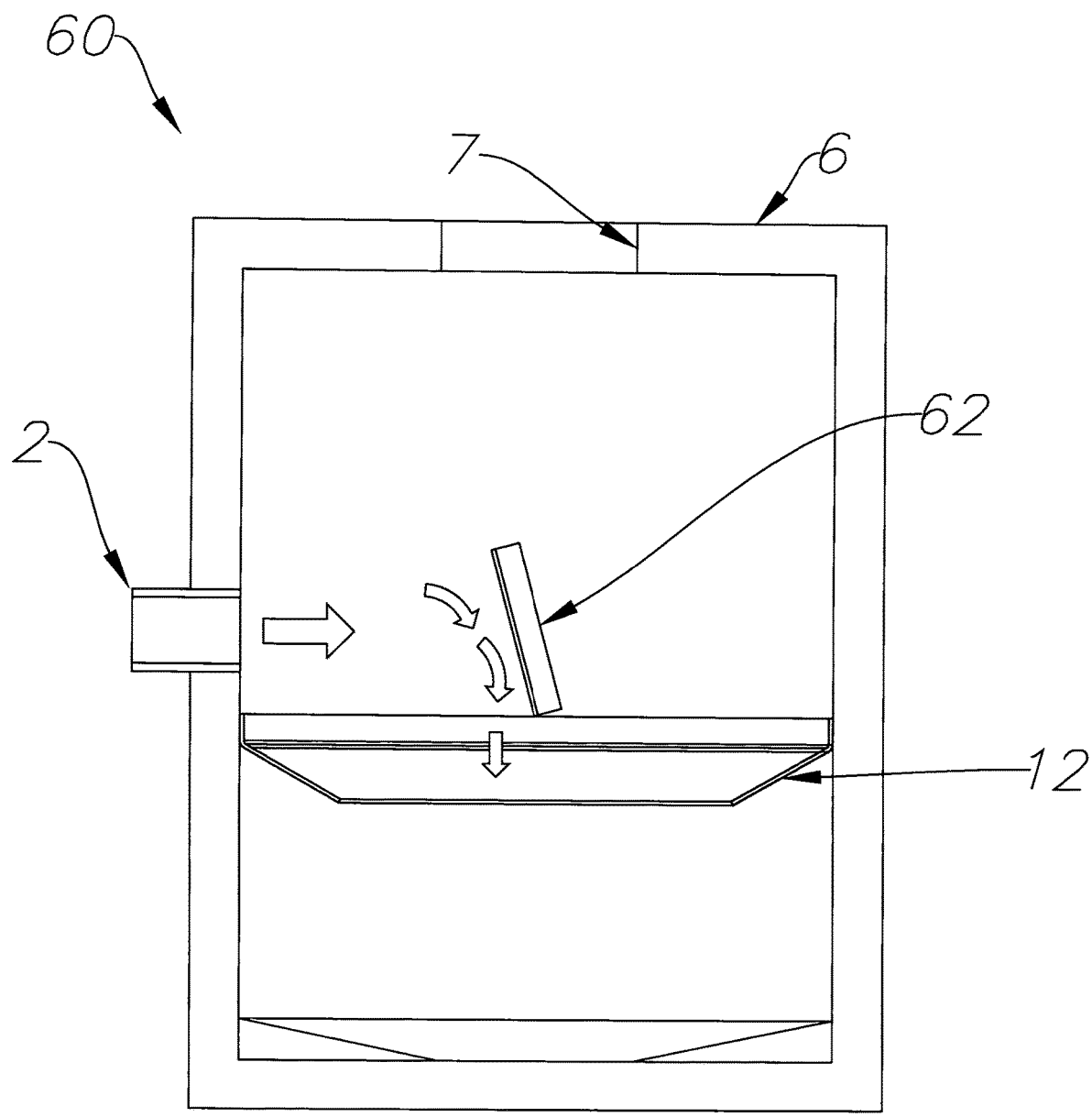
FIG. 6D is another side cross-sectional view of the cylindrical vault of FIG. AA showing the flow line arrows inside the vault.

Sixth Embodiment Cylindrical Vault/System with Inflow Deflector, Horizontal Deflector, High Profile Vertical Baffles, Angled Low Profile Vertical Baffles and Hydro-Variant Skimmer FIG. 6 is a top view of a sixth embodiment of a cylindrical vault/system 60 with inflow deflector 10, horizontal deflector 12, high profile vertical baffles 14, angled low profile vertical baffles 62 and hydro-variant skimmer 52. FIG. 6A is a side cross-sectional view of the cylindrical vault/system 60 of FIG. 6 along arrows 6A. FIG. 6B is partial cut-away perspective view of the cylindrical vault/system 60 of FIG. 6 and FIG. 6A. FIG. 6C is another partial cut-away perspective view of the cylindrical vault/system 60 of FIG. 6 and FIG. 6A. FIG. 6D is another side cross-sectional view of the cylindrical vault/system 60 of FIG. AA showing the flow line arrows inside the vault 60.

Referring to FIGS. 6-6D, the sixth embodiment is similar to the previous embodiment 50 with the addition of using angled low profile vertical baffles 62 instead of low profile vertical baffles 22.

As previously described, the low-profile baffles 22 can be angled (as shown in 62 FIGS. 6-6D) so as to direct the water flow with the debris contained therein downward toward the horizontal deflector 12. After the water flow has passed the angled low-profile baffles 62, the flow engages a high-profile baffle 14. The high-profile baffles 14 extend a greater distance from the side wall of the vault 1 than the angled low-profile baffles 62.

Figure 7:
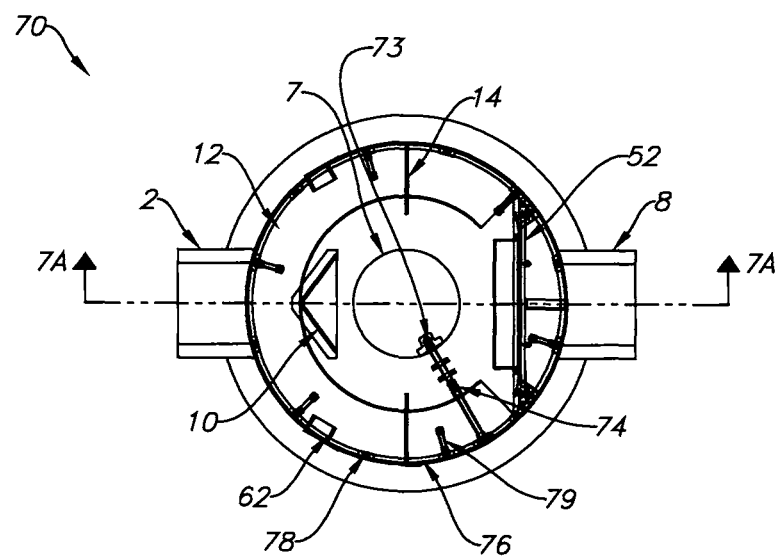
FIG. 7 is a top view of a seventh embodiment of a cylindrical vault/system with inflow deflector, horizontal deflector, high profile vertical baffles, angled low profile baffles. hydro-variant skimmer and hydroslide system.
Figure 7A:
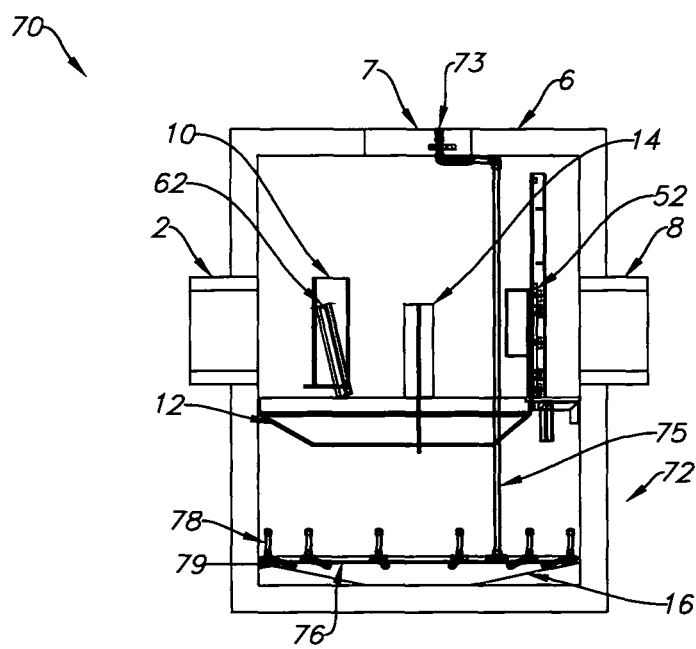
FIG. 7A is a side cross-sectional view of the cylindrical vault/system of FIG. 7 along arrows 7A.
Figure 7B:
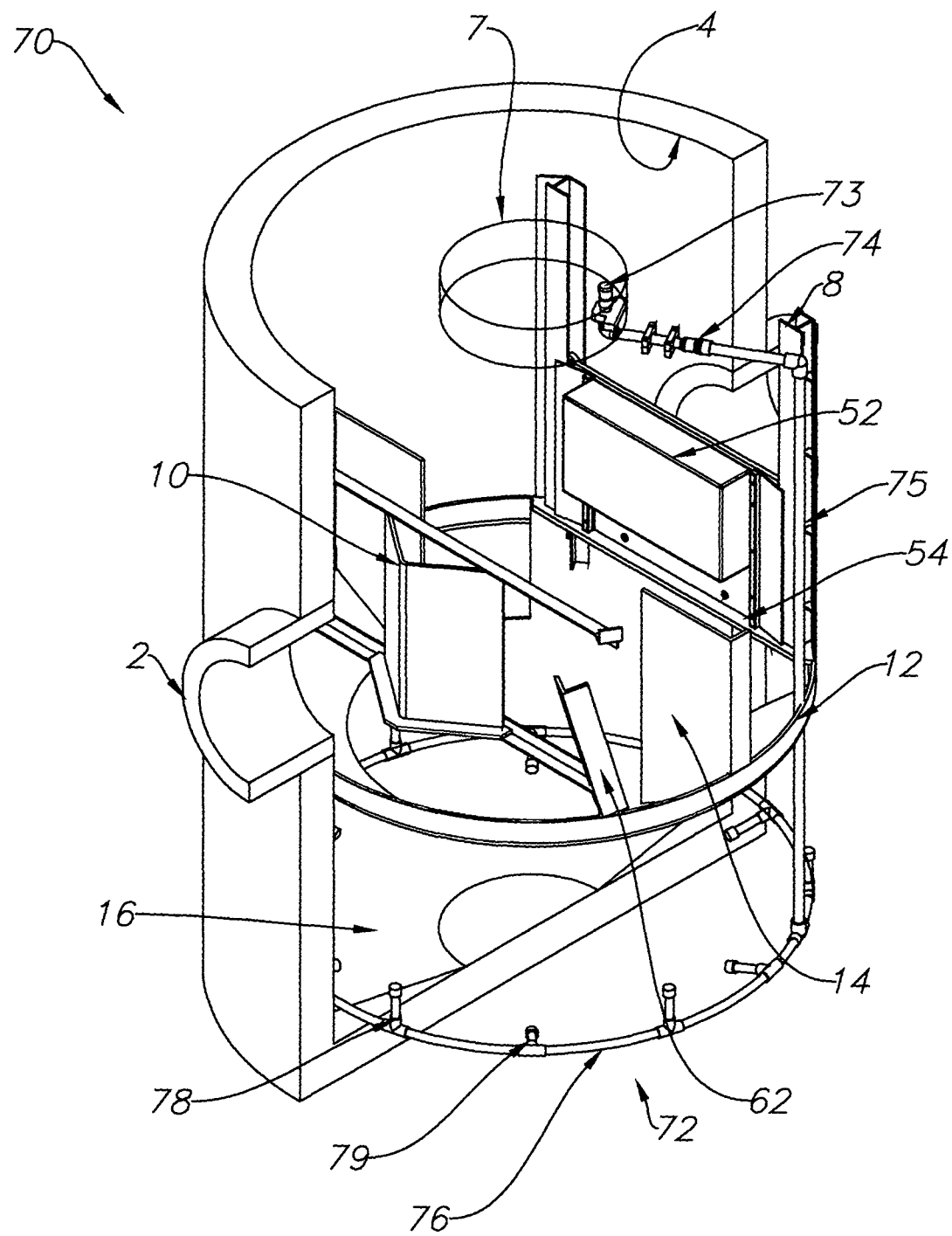
FIG. 7B is partial cut-away perspective view of the cylindrical vault/system of FIG. 7 and FIG. 7A.
Figure 7C:
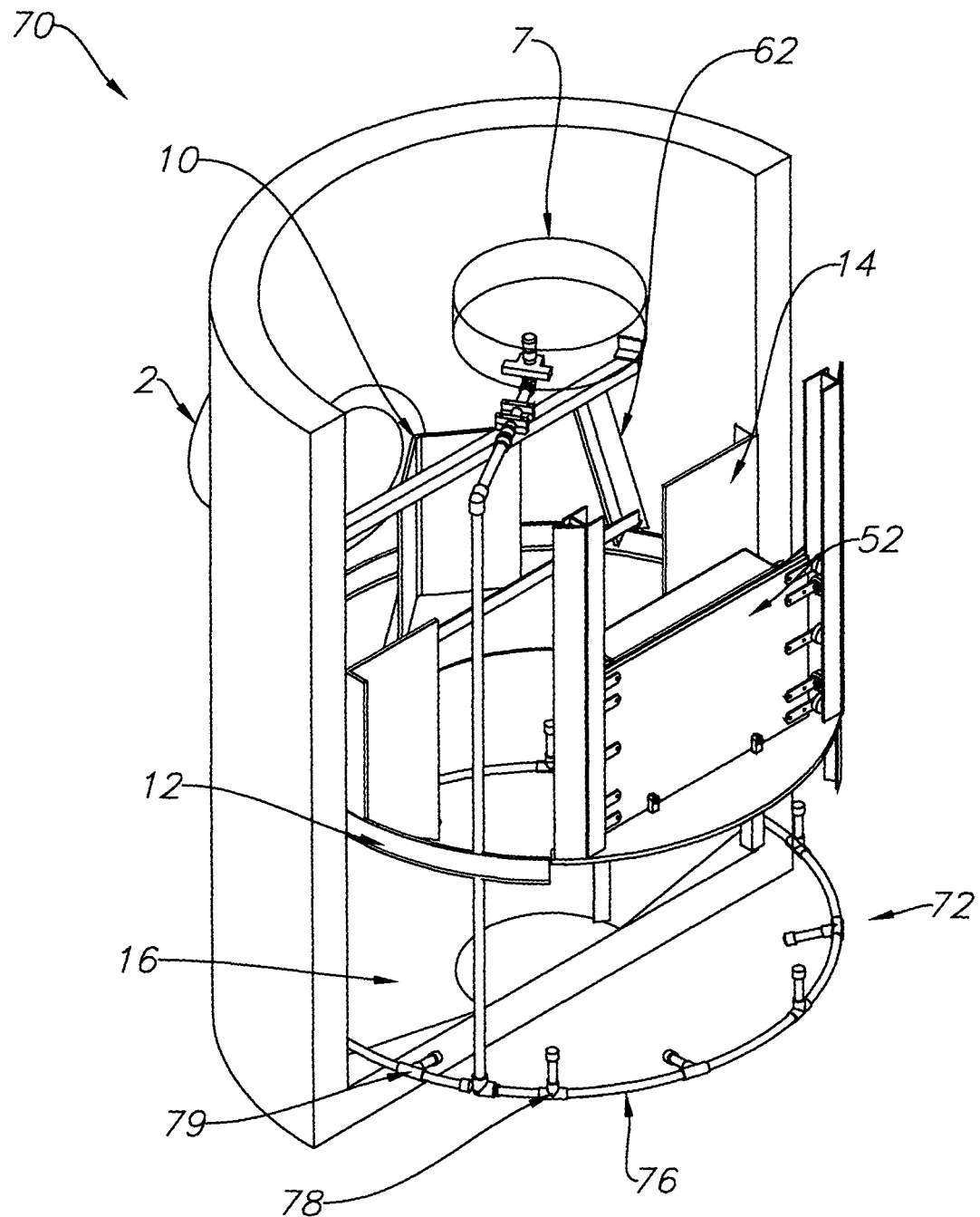
FIG. 7C is another partial cut-away perspective view of the cylindrical vault/system of FIG. 7 and FIG. 7A.

Seventh Embodiment Cylindrical Vault/System with Inflow Deflector, Horizontal Deflector, High Profile Vertical Baffles, Angled Low Profile Vertical Baffles Hydro-Variant Skimmer and Hydroslide System FIG. 7 is a top view of a seventh embodiment of a cylindrical vault/system 70 with inflow deflector 10, horizontal deflector 12, high profile vertical baffles 14, angled low profile baffles 62. hydro-variant skimmer 52 and hydroslide system 72. FIG. 7A is a side cross-sectional view of the cylindrical vault/system 70 of FIG. 7 along arrows 7A. FIG. 7B is partial cut-away perspective view of the cylindrical vault/system 70 of FIG. 7 and FIG. 7A. FIG. 7C is another partial cut-away perspective view of the cylindrical vault/system 70 of FIG. 7 and FIG. 7A.

Referring to FIGS. 7-7C, the seventh embodiment 70 incorporates all the features of the previous embodiment 60 with the addition of a hydro-slide system 72, which can include water connection(s) 73 from an outside water source that is connected to horizontal water line(s) 74, which are connected to vertical water line(s) 75, which connect to spray bar(s) 76 along side corners of the sloped floor 16. The spray bar(s) 76 can include nozzles/spray head(s) 77, spray knive(s) 78, and spray lever(s) 79 attached thereon.

The hydroslide systems 72 shown can operate similar to those described in U.S. patent application Ser. No. 16/124,885 filed Sep. 7, 2018, and U.S. patent application Ser. No. 16/104,737 filed Aug. 17, 2018, and U.S. patent application Ser. No. 15/948,011 filed Apr. 9, 2018, and U.S. patent application Ser. No. 15/686,931 filed Aug. 25, 2017, and U.S. patent application Ser. No. 15/639,685 filed Jun. 30, 2017, which claims the benefit of priority to U.S. Provisional Patent Application Ser. No. 62/506,188 filed May 15, 2017; and U.S. patent application Ser. No. 14/288,455 filed May 28, 2014, which claims the benefit of priority to U.S. Provisional Application Ser. No. 61/828,958 filed May 30, 2013, and U.S. patent application Ser. No. The entire disclosure of each of these listed applications are incorporated herein by specific reference thereto.

The ability to service a stormwater treatment system quickly, easily, and safely is an important consideration. A stormwater treatment system's primary function is to capture and retain pollutants of concern over a period of time. Periodically a treatment system must be serviced which involves removing and properly disposing the captured pollutants. Typically, this involves a vacuum service truck and associated service crew. The equipment and service crew costs are significant.

A stormwater treatment system that can be serviced quickly and easily is an important factor for reducing servicing costs. There is a direct linear cost associated with the time that it takes for a service crew and vacuum truck to service a treatment system, the longer it takes to perform the service work the more the cost per servicing. In addition, if the service work is difficult to perform the technicians performing the servicing may not do a good job. It is important for the servicing to be easy to ensure that optimal servicing was performed. A treatment system that is difficult to service will likely not be correctly serviced.

Another issue with regard to servicing a water treatment vault is safety concerns and having to deal with the confined space within a vault. It is ideal to not require service personnel to enter the confined space of a vault. The protocols set OSHA for personnel to enter into the confined space of a vault is cumbersome, time consuming, and expensive.

The invention has an access opening at the top of the vault for the inspection and servicing of the treatment system.

The 14, 22 baffles and deflectors 10, 12 within the invention are generally along the perimeter side walls 4 of the vault. There is a clear passage from the access opening (access opening 7, opening 13 in horizontal deflector 12), down through the center of the vaults, and all the way to the bottom floor 16 of the vault.

A vacuum service line can easily reach the floor of the vault with ample room to articulate the vacuum line. There is no need for service personnel to enter the confined space of the invention.

To enhance the speed whereby the vault system 70 can be serviced, a high pressure water spray servicing system 72 can be adapted to the treatment system. This high-pressure spray system can significantly reduce the required servicing time of the vault system 70, all the collected pollutants will be removed, and service technicians do not need to enter the vault 70 to do the service work. High-pressure pipe can be used to convey water at high pressure from a water source outside the vault into the lower settling zone of the vault system 70.

A spray bar 76 can be arranged around the perimeter of the settling zone where the floor 16 meets the side wall 4. The spray bar(s) 76 can have a series of nozzles/spray heads 77 aimed toward the center of the vault and the water jets from the nozzles/spray heads 77 will be parallel with the floor 16 of the vault 70. When the water spray servicing system 72 is activated the spray heads/nozzles 77 can jet water at high pressure toward the center of the vault 70 and drive the debris within the vault 70 toward the center. The debris can be liquefied into a slurry and the kinetic energy of the high-pressure water jets from the spray heads/nozzles 77 can push the debris toward the center.

A vacuum service line in the center of the vault will remove the debris as it is pushed to the center of the vault 70. In addition to the water jets influencing the movement of the debris toward the center, the floor 16 of the vault can be sloped downward from the side wall 4 to the center of the vault 70. The sloping of the floor 16 can be accomplished by either shaping the floor 16 so that it has a slope toward the center, or sloped floor panel sections can be added to a flat floor.

The water spray servicing system 72 can be enhanced by adding vertical spray bars to aid with slicing through the debris that settles in the settling zone. Debris that typically settles into a lower settling zone of a water treatment system 72 can become compacted with significant structural strength. Because the debris can become structural while being braced against the side wall 4, potentially, the water jets directed from the side wall 4 toward the center of the vault can undermine the collected debris without the debris collapsing downward. To aid with collapsing the debris downward by compromising the structure of the debris, vertical spray bars can be added to make vertical slices through the debris.

To aid with speeding up the installation of the high-pressure spray service system 72 and ensure that the spray heads/nozzles 77 can be aimed parallel with the floor 16. Aiming levers 79 can be a part of the spray bars 76. These aiming levers 79 can be a part of the spray bar along the perimeter of the vault 70 such that they extend from the spray bar 76 in the direction in which the spray heads/nozzles 77 can be aimed.

During the installation of the spray bars 76, the aiming levers 79 can be pressed flat to the floor 16 of the vault 70. Because the aiming levers 79 are manufactured parallel with the aim of the spray heads/nozzles 77, and then positioned so that the levers 79 are flat onto the floor 16, the spray heads/nozzles 77 can always be aimed parallel with the floor 16. Being able to install the high-pressure spray system 72 quickly and accurately will save time, money, and ensure an accurate installation.

The before described method of using a high-pressure spray system 72 to aid with the removal of solids that have settled into the settling zone of a treatment system can achieve the following results:
1. Much less servicing water will be required to perform the servicing of the treatment system.
2. The time spent removing debris from the settling zone of the treatment system will be dramatically reduced. Saving time will save money.
3. Because the servicing time of the treatment system is reduced, the vacuum truck and crew can service more treatment systems in a day. Each vacuum truck can accomplish more tasks which reduce the need to capitalize more equipment which save money.
4. The servicing spray system is especially effective with quickly removing all the debris in the settling zone. There is no need to send a person inside the confined space of the treatment vault to do service work. This avoids a service crew having to deal with OSHA confined space protocols which will slow the servicing process and require additional personnel to do the service work.

Figure 8:
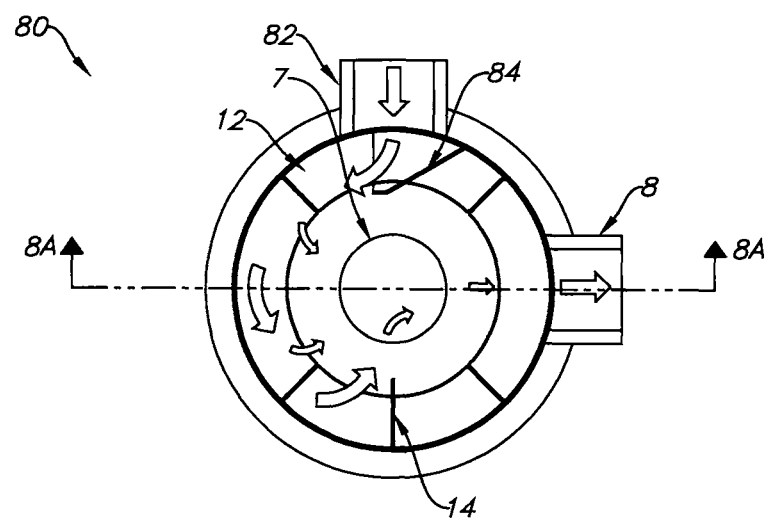
FIG. 8 is a top view of an eighth embodiment of a cylindrical vault/system with side in flow port, single direction inflow deflector, horizontal deflector, and high profile vertical baffles, and flow line arrows.
Figure 8A:
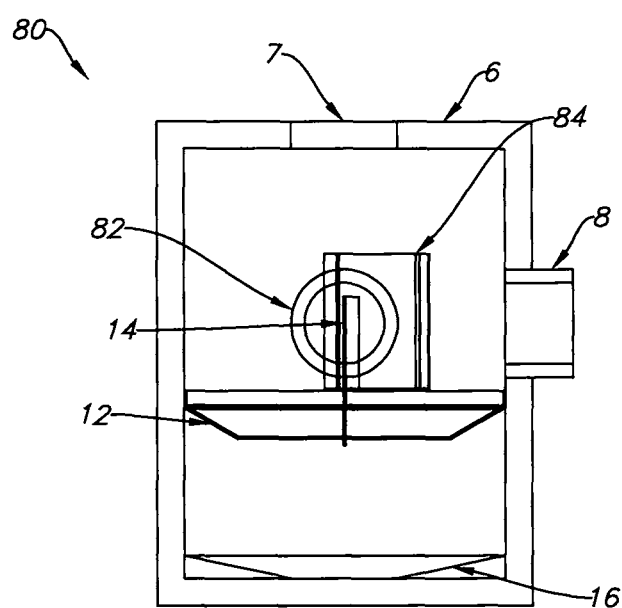
FIG. 8A is a side cross-sectional view of the cylindrical vault/system of FIG. 8 along arrows 8A.
Figure 8B:
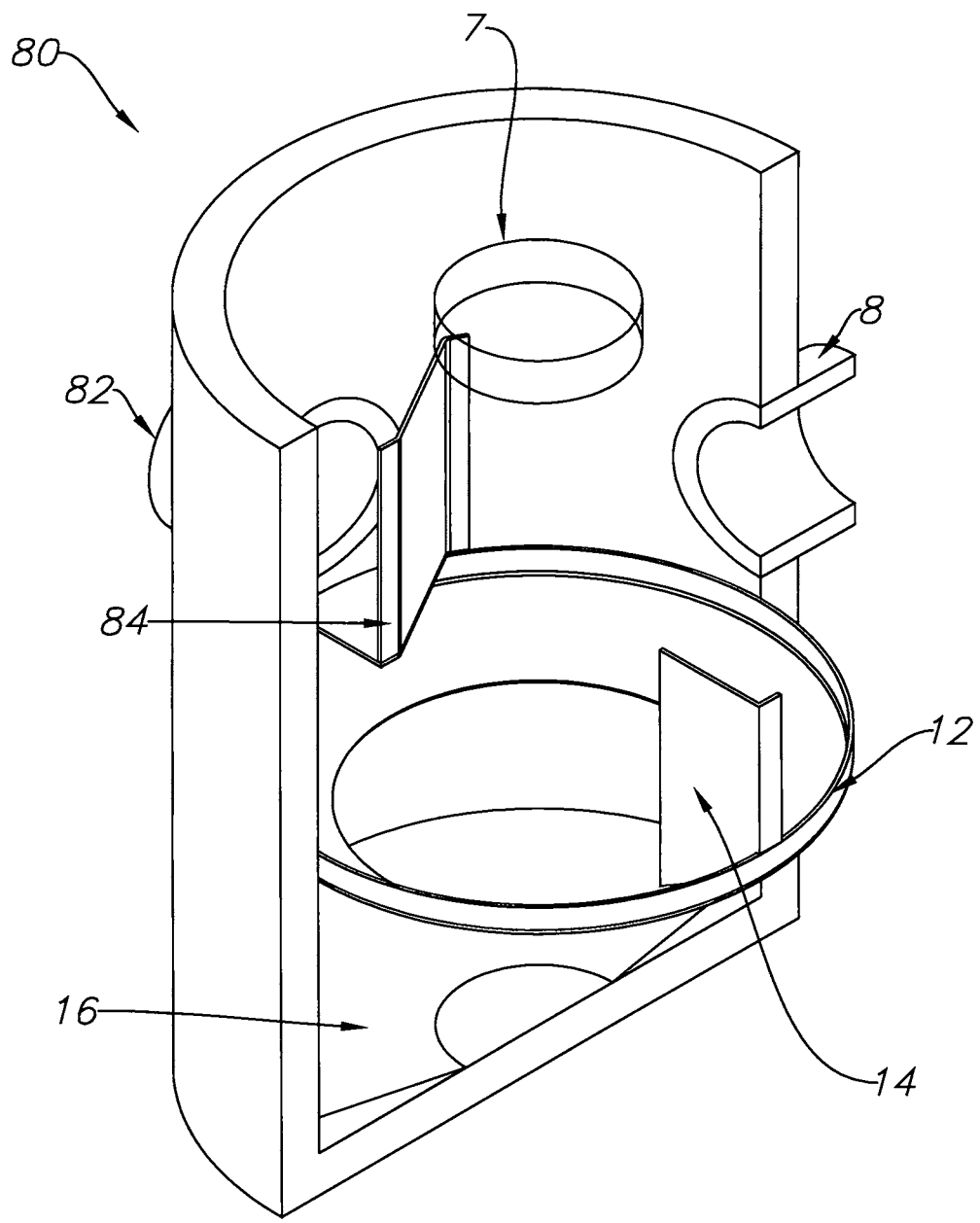
FIG. 8B is partial cut-away perspective view of the cylindrical vault/system of FIG. 8 and FIG. 8A.
Figure 8C:
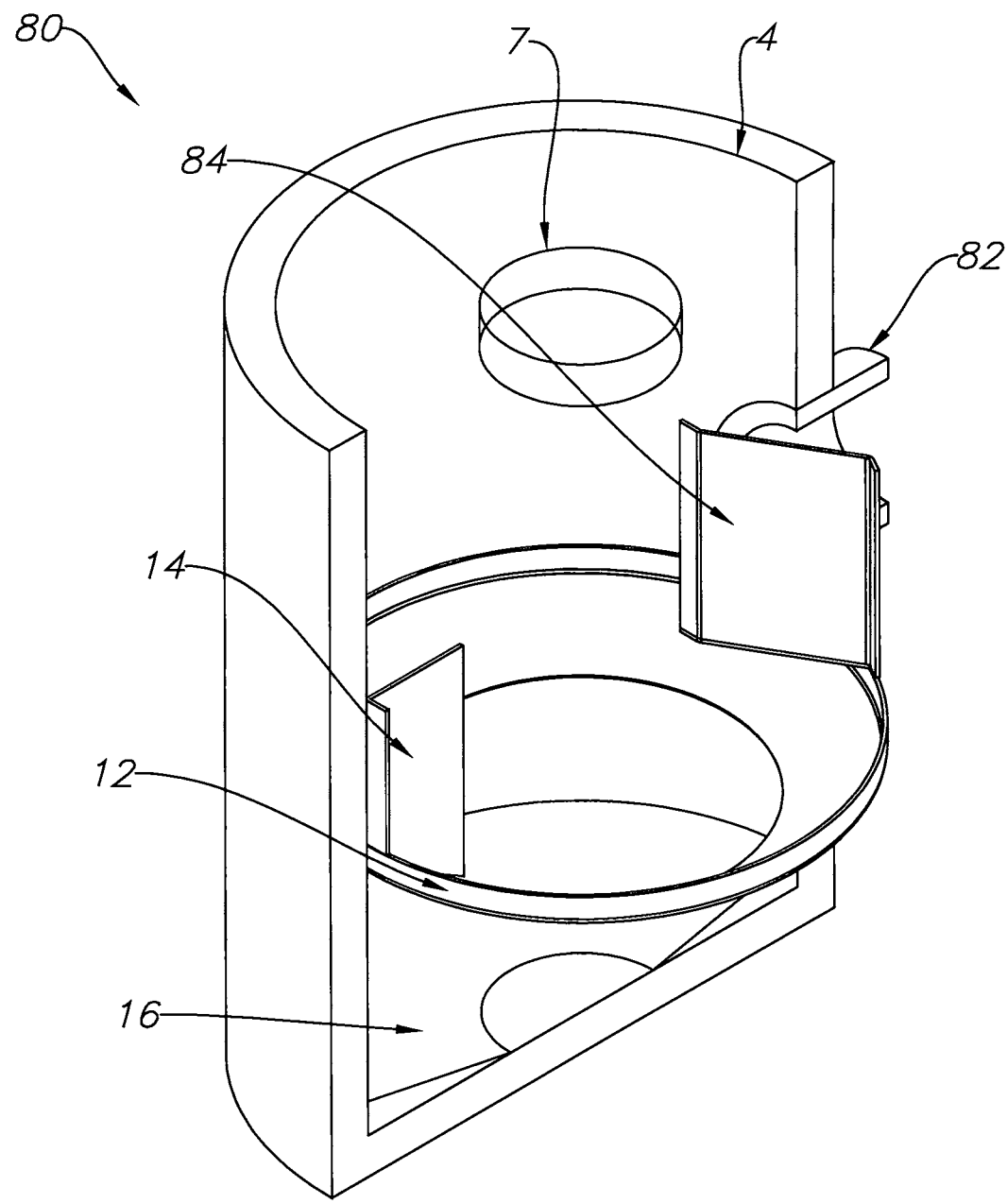
FIG. 8C is another partial cut-away perspective view of the cylindrical vault/system of FIG. 8 and FIG. 8A.

Eighth Embodiment Cylindrical Vault/System with Side Inflow Port, Single Direction Inflow Deflector, Horizontal Deflector, and High Profile Vertical Baffles FIG. 8 is a top view of an eighth embodiment of a cylindrical vault/system 80 with side in flow port 82, single direction inflow deflector 84, horizontal deflector 12, and high profile vertical baffles 14, and flow line arrows. FIG. 8A is a side cross-sectional view of the cylindrical vault/system 80 of FIG. 8 along arrows 8A. FIG. 8B is partial cut-away perspective view of the cylindrical vault/system 80 of FIG. 8 and FIG. 8A. FIG. 8C is another partial cut-away perspective view of the cylindrical vault/system 80 of FIG. 8 and FIG. 8A.

Referring to FIGS. 8-8C, the eighth embodiment 80 is similar to the first embodiment 1 of FIGS. 1-1G, the difference of having a side inflow port 82 and a single direction inflow deflector 84, which can direct the water flow path about one side of the interior rounded walls of the cylindrical vault 80 into high profile vertical baffles 14 and to the exit port 8 out of the vault system 80.

If the outflow pipe 8 is located at an approximately 90 degrees angle from the side inflow pipe 82, most of the horizontal deflector 12 is located along the side wall on the opposite side of the vault 80 from the outflow pipe 8, extending from the inflow pipe 82 (and stopping short of the skimmer and shelf system shown in FIGS. 10-14C. A small segment of horizontal deflector 12 can be located between shorter distance between the side inflow pipe 82 and the outflow pipe 8.

If the outflow pipe 8 is located at approximately 90 degrees angle from the inflow pipe 82, then the inflow deflector 84 can be shaped such that the entire flow is directed along the side wall opposite that of the outflow opening 8.

Figure 9:
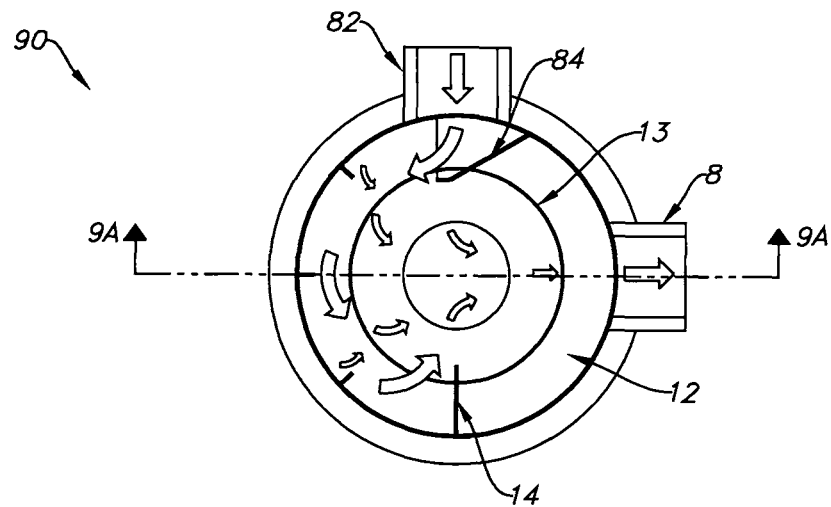
FIG. 9 is a top view of a ninth embodiment of a cylindrical vault/system with side in flow port, single direction inflow deflector, horizontal deflector, high profile vertical baffles, low profile vertical baffles and flow line arrows.
Figure 9A:
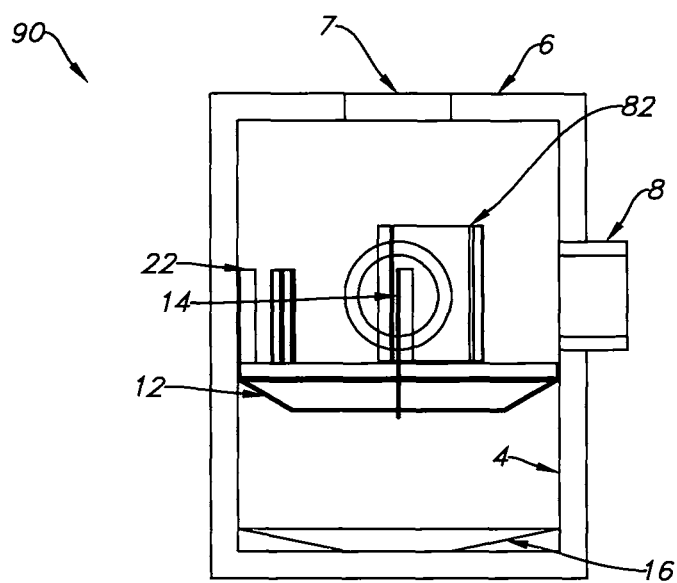
FIG. 9A is a side cross-sectional view of the cylindrical vault/system of FIG. 9 along arrows 9A.
Figure 9B:
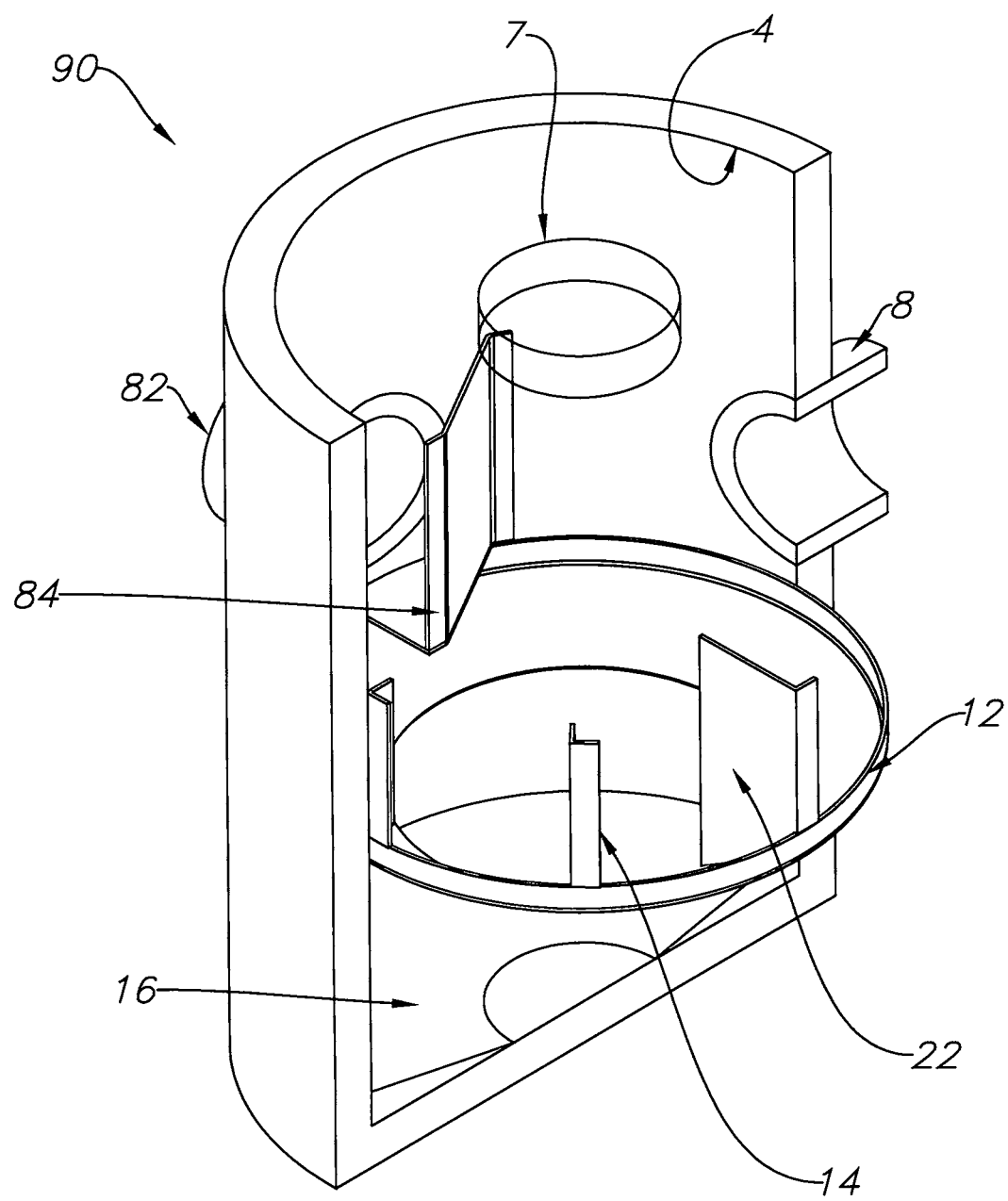
FIG. 9B is partial cut-away perspective view of the cylindrical vault/system of FIG. 9 and FIG. 9A.
Figure 9C:
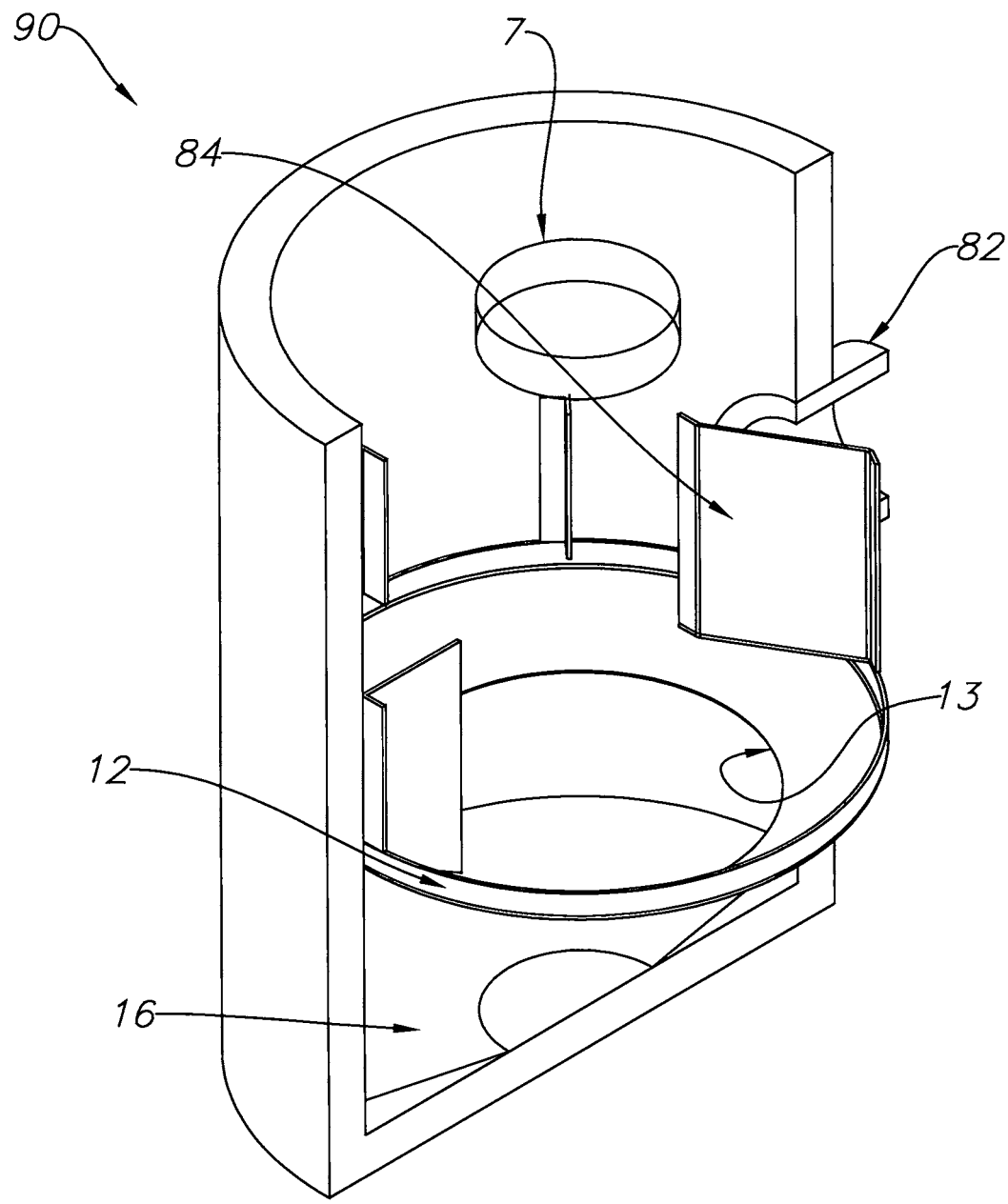
FIG. 9C is another partial cut-away perspective view of the cylindrical vault/system of FIG. 9 and FIG. 9A.

Ninth Embodiment Cylindrical Vault/System with Side Inflow Port, Single Direction Inflow Deflector, Horizontal Deflector, High Profile Vertical Baffles and Low Profile Vertical Baffles FIG. 9 is a top view of a ninth embodiment of a cylindrical vault/system 90 with side in flow port 82, single direction inflow deflector 84, horizontal deflector 12, high profile vertical baffles 14, low profile vertical baffles 22 and flow line arrows. FIG. 9A is a side cross-sectional view of the cylindrical vault/system 90 of FIG. 9 along arrows 9A. FIG. 9B is partial cut-away perspective view of the cylindrical vault/system 90 of FIG. 9 and FIG. 9A. FIG. 9C is another partial cut-away perspective view of the cylindrical vault/system 90 of FIG. 9 and FIG. 9A.

Referring to FIGS. 9-9C, the ninth embodiment 90 is similar to the eighth embodiment 80 with the addition of low profile baffles 22 the function of which was previously described.

Figure 10:
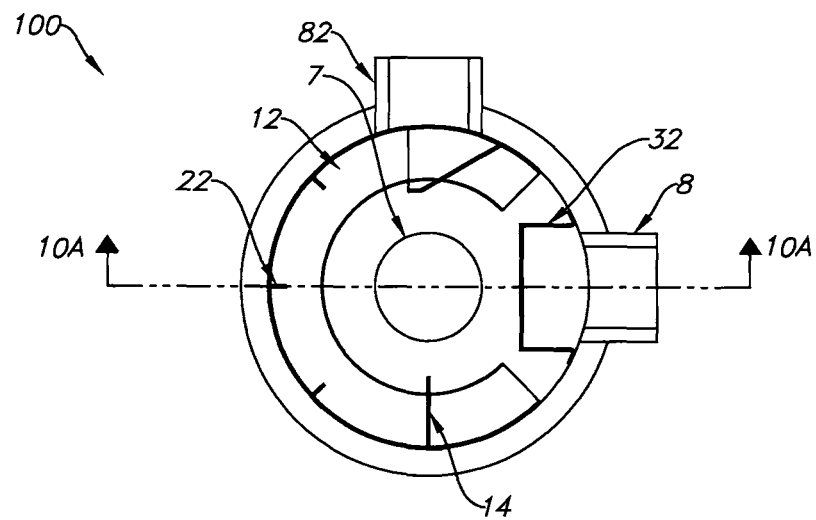
FIG. 10 is a top view of a tenth embodiment of a cylindrical vault/system with side in flow port, single direction inflow deflector, horizontal deflector, high profile vertical baffles, low profile vertical baffles and open bottom skimmer.
Figure 10A:
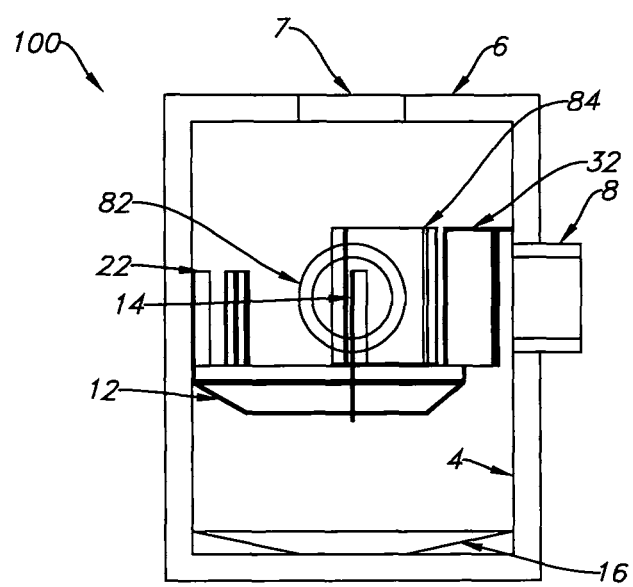
FIG. 10A is a side cross-sectional view of the cylindrical vault/system of FIG. 10 along arrows 10A.
Figure 10B:
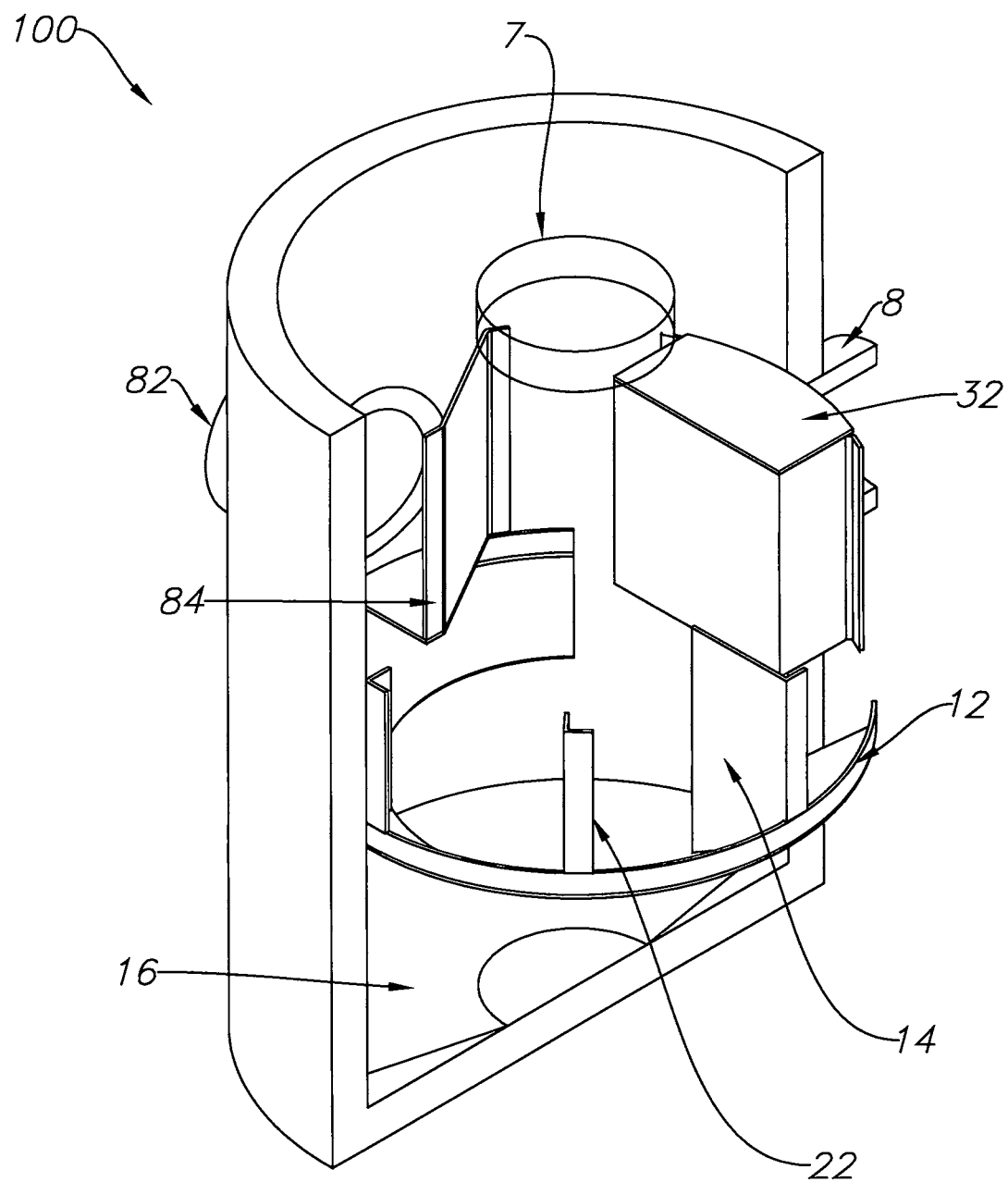
FIG. 10B is partial cut-away perspective view of the cylindrical vault/system of FIG. 10 and FIG. 10A.
Figure 10C:
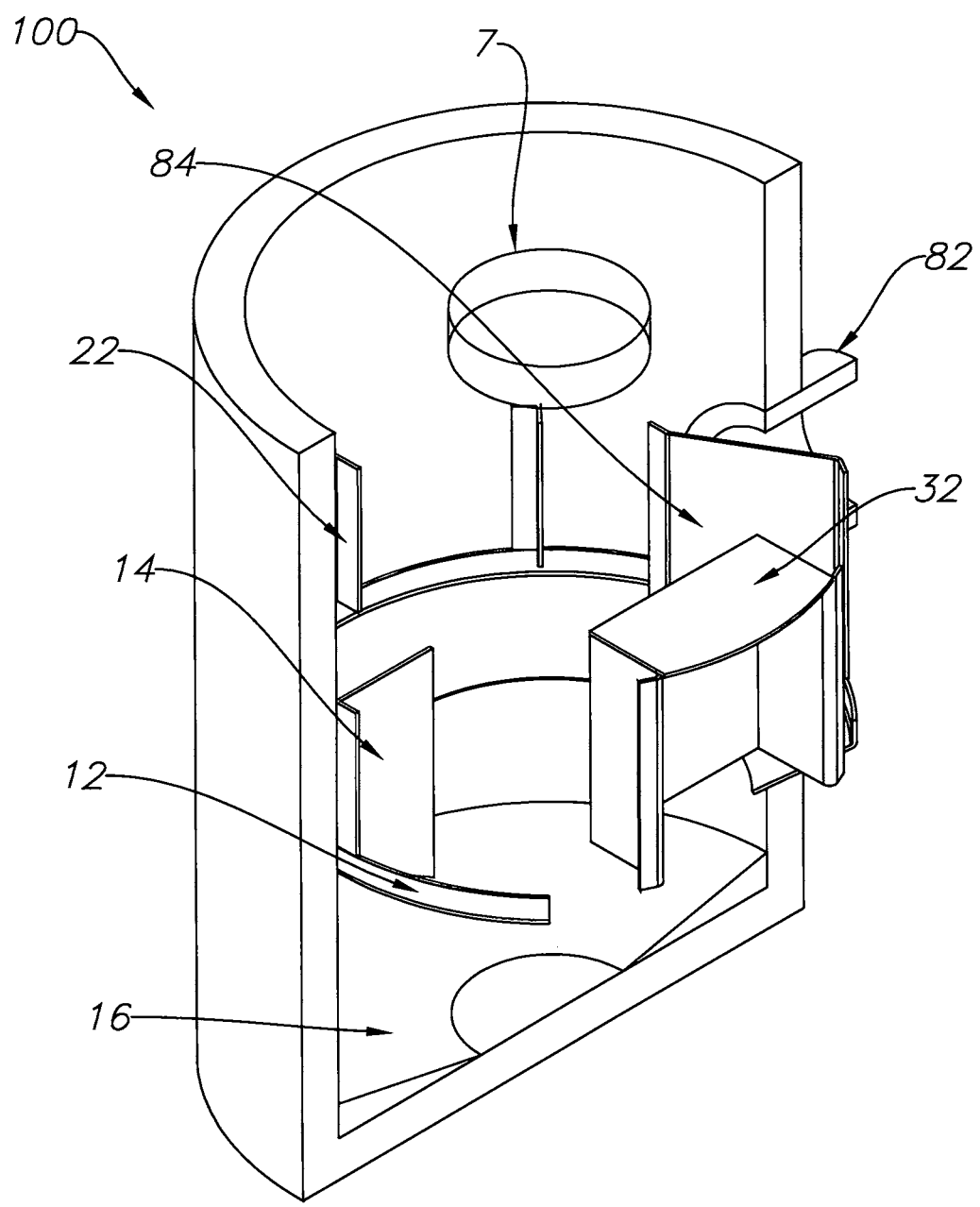
FIG. 10C is another partial cut-away perspective view of the cylindrical vault/system of FIG. 10 and FIG. 10A.

Tenth Embodiment Cylindrical Vault/System with Side Inflow Port, Single Direction Inflow Deflector, Horizontal Deflector, High Profile Vertical Baffles, Low Profile Vertical Baffles and Open Bottom Skimmer FIG. 10 is a top view of a tenth embodiment of a cylindrical vault/system 100 with side in flow port 82, single direction inflow deflector 84, horizontal deflector 12, high profile vertical baffles 14, low profile vertical baffles 22 and open bottom skimmer 32. FIG. 10A is a side cross-sectional view of the cylindrical vault/system 100 of FIG. 10 along arrows 10A. FIG. 10B is partial cut-away perspective view of the cylindrical vault/system 100 of FIG. 10 and FIG. 10A. FIG. 10C is another partial cut-away perspective view of the cylindrical vault/system 100 of FIG. 10 and FIG. 10A.

Referring to FIGS. 10-10C the tenth embodiment 100 is similar to the ninth embodiment 90 with the addition of an open bottom skimmer 32, that that can function and operate similar to the open bottom skimmer 32 as previously described in reference to FIGS. 3-3D.

Figure 11:
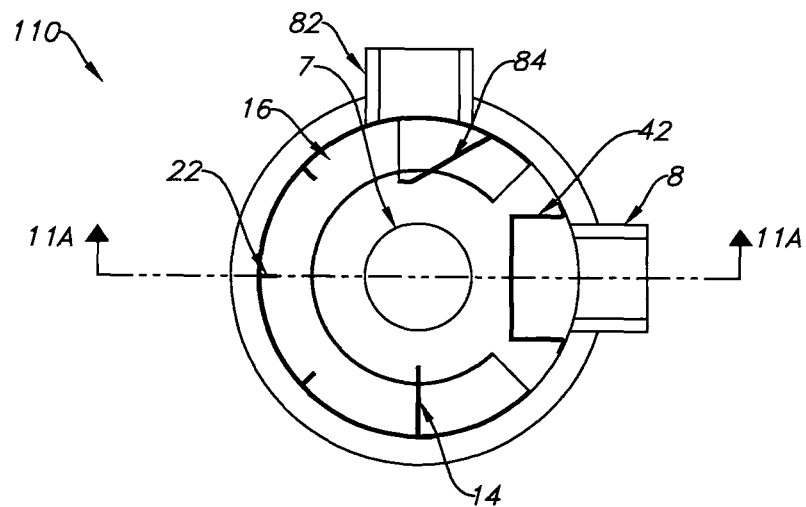
FIG. 11 is a top view of a tenth embodiment of a cylindrical vault/system with side in flow port, single direction inflow deflector, horizontal deflector, high profile baffles, low profile vertical baffles and flow restricted skimmer.
Figure 11A:
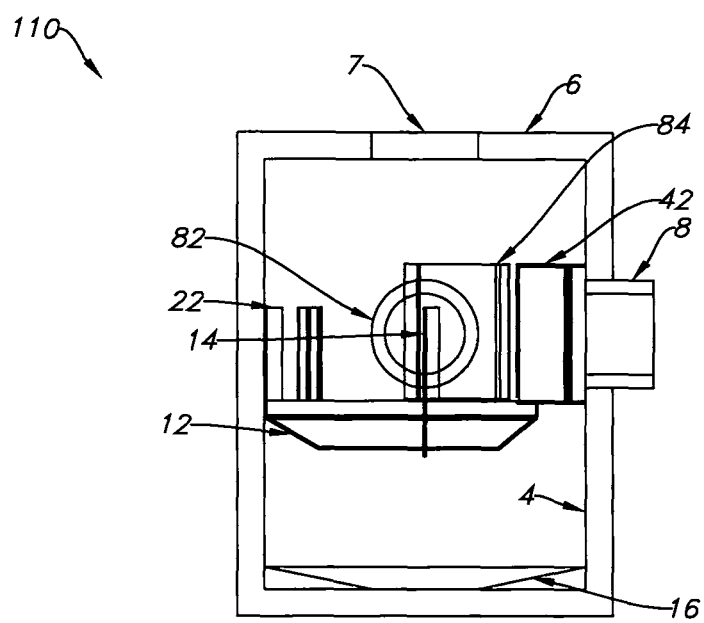
FIG. 11A is a side cross-sectional view of the cylindrical vault/system of FIG. 11 along arrows 11A.
Figure 11B:
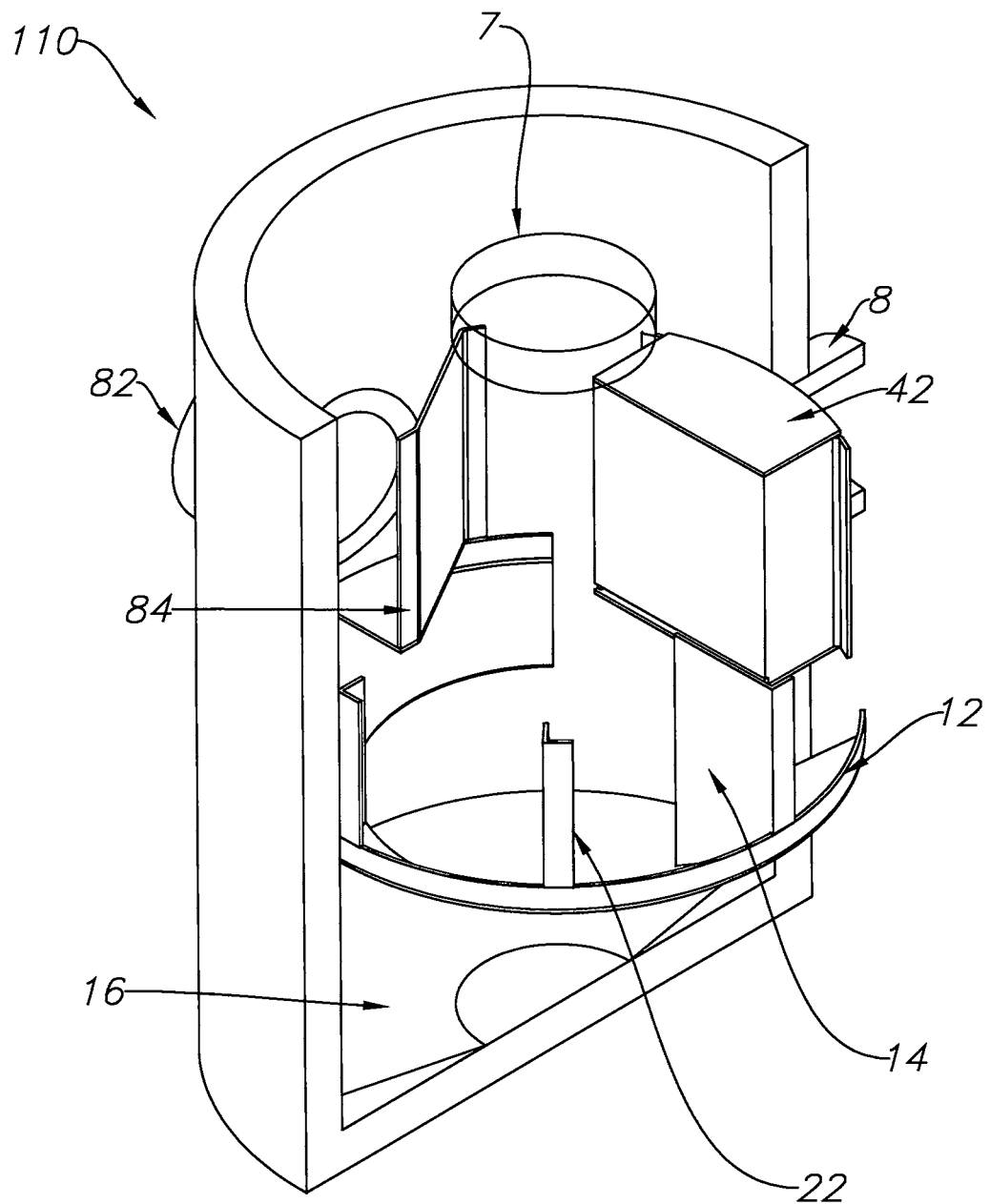
FIG. 11B is partial cut-away perspective view of the cylindrical vault/system of FIG. 11 and FIG. 11A.
Figure 11C:
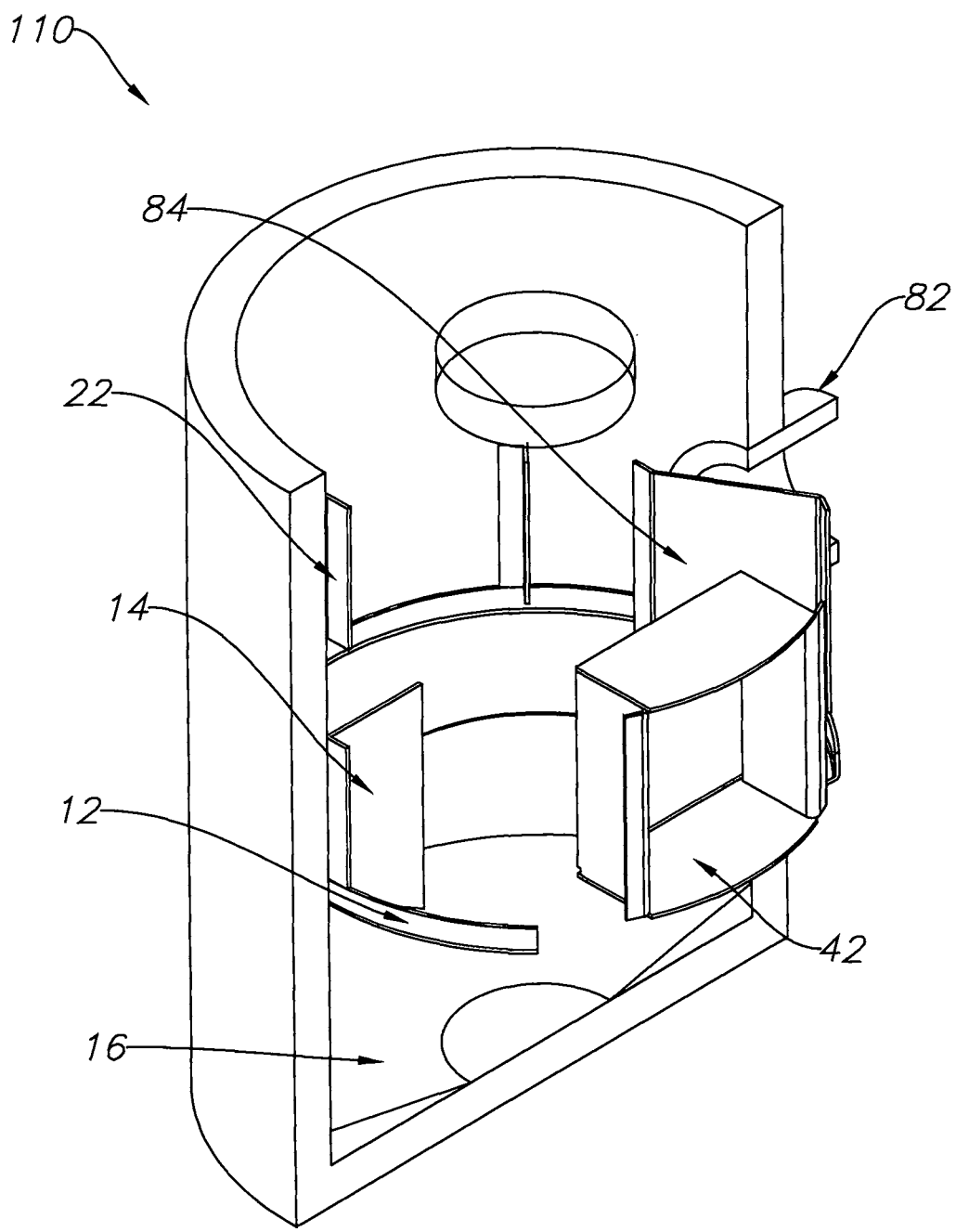
FIG. 11C is another partial cut-away perspective view of the cylindrical vault/system of FIG. 11 and FIG. 11A.

Eleventh Embodiment Cylindrical Vault/System with Side Inflow Port, Single Direction Inflow Deflector, Horizontal Deflector, High Profile Vertical Baffles, Low Profile Vertical Baffles and Flow Restricted Skimmer FIG. 11 is a top view of an eleventh embodiment of a cylindrical vault/system 110 with side in flow port 82, single direction inflow deflector 84, horizontal deflector 12, high profile baffles 14, low profile vertical baffles 22 and flow restricted skimmer 42. FIG. 11A is a side cross-sectional view of the cylindrical vault/system 110 of FIG. 11 along arrows 11A. FIG. 11B is partial cut-away perspective view of the cylindrical vault/system 110 of FIG. 11 and FIG. 11A. FIG. 11C is another partial cut-away perspective view of the cylindrical vault/system 110 of FIG. 11 and FIG. 11A.

Referring to FIGS. 11-11C, the eleventh embodiment 110 is similar to the tenth embodiment 100 with the substitution of the flow restricted skimmer 42 instead of the open bottom skimmer 32 of the tenth embodiment 100. The flow restricted skimmer 42 can function and operate similar to the flow restricted skimmer 42 used and described in FIGS. 4-4G.

Figure 12:
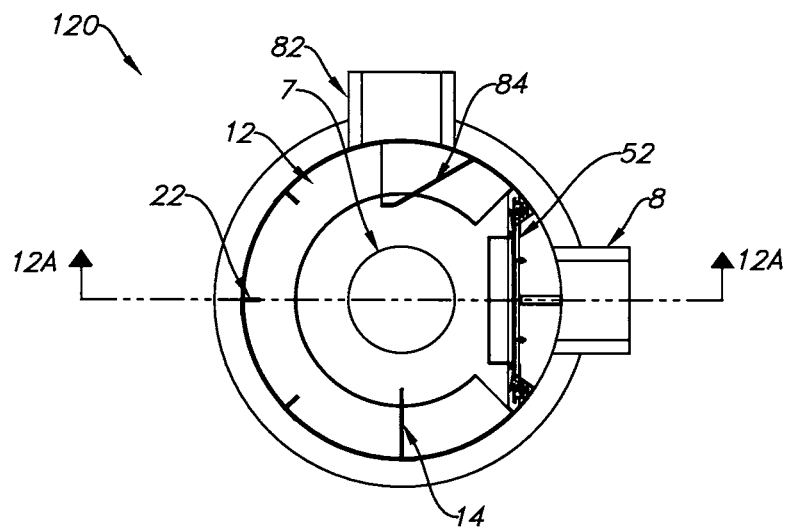
FIG. 12 is a top view of a tenth embodiment of a cylindrical vault/system with side in flow port, single direction inflow deflector, horizontal deflector, high profile baffles, low profile vertical baffles and hydro-variant skimmer.
Figure 12A:
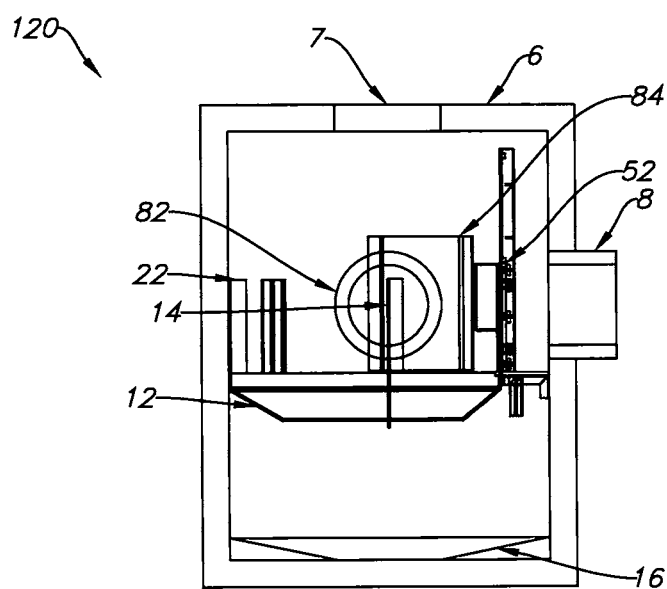
FIG. 12A is a side cross-sectional view of the cylindrical vault/system of FIG. 12 along arrows 12A.
Figure 12B:
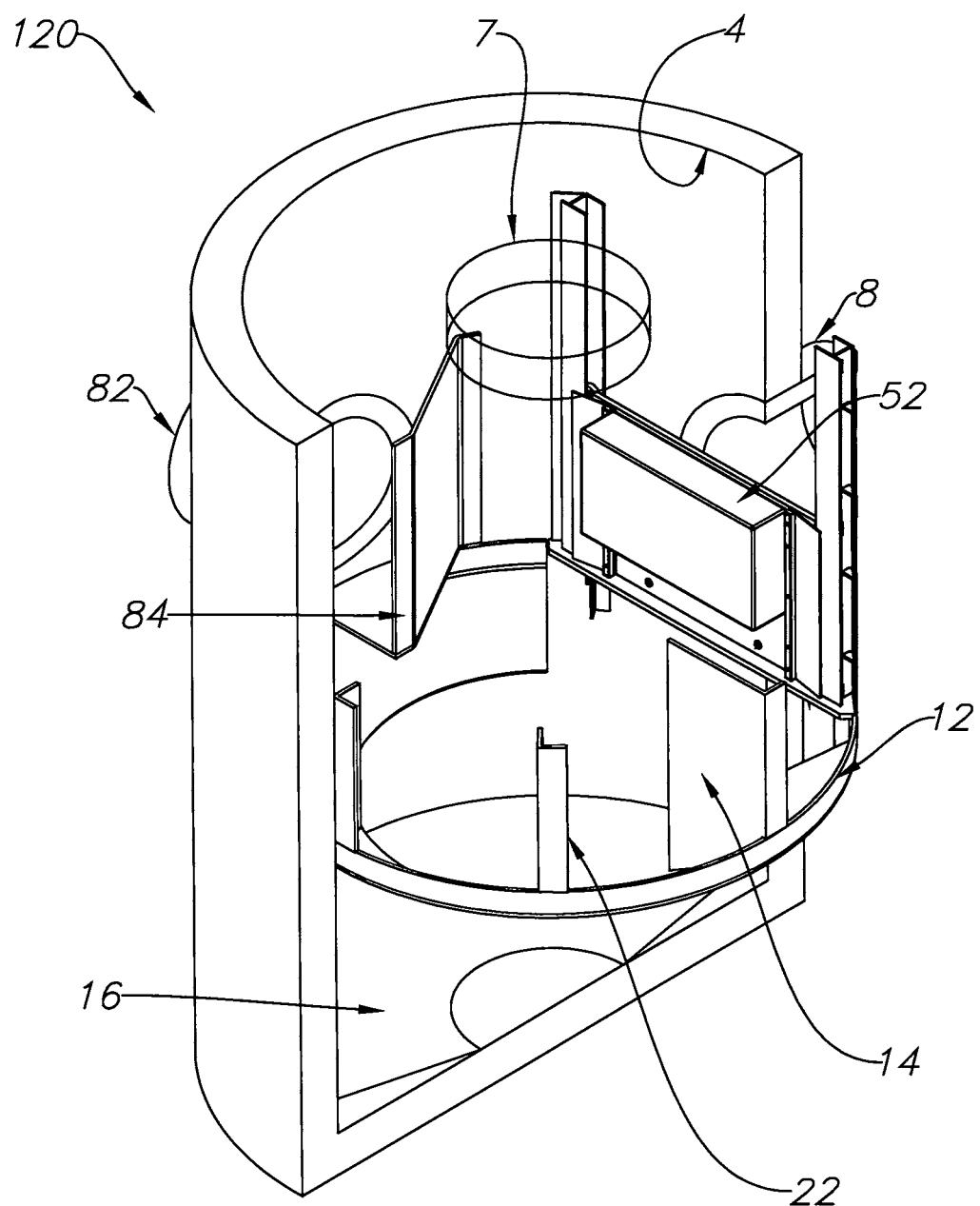
FIG. 12B is partial cut-away perspective view of the cylindrical vault/system of FIG. 12 and FIG. 12A.
Figure 12C:
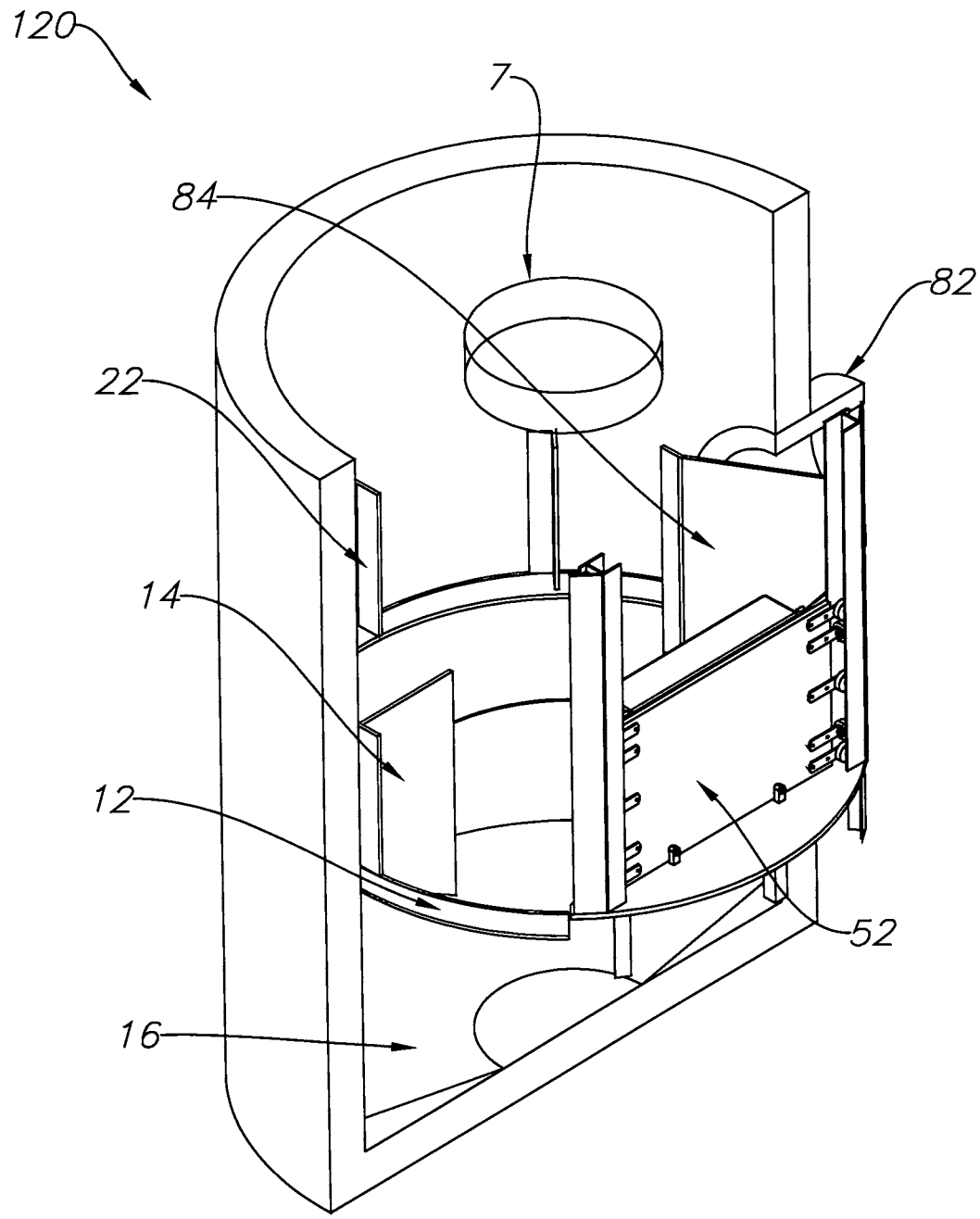
FIG. 12C is another partial cut-away perspective view of the cylindrical vault/system of FIG. 12 and FIG. 12A.

Twelfth Embodiment Cylindrical Vault/System with Side Inflow Port, Single Direction Inflow Deflector, Horizontal Deflector, High Profile Vertical Baffles, Low Profile Vertical Baffles and Hydro-Variant Skimmer FIG. 12 is a top view of a tenth embodiment of a cylindrical vault/system 120 with side in flow port 82, single direction inflow deflector 84, horizontal deflector 12, high profile baffles 14, low profile vertical baffles 22 and hydro-variant skimmer 52. FIG. 12A is a side cross-sectional view of the cylindrical vault/system 120 of FIG. 12 along arrows 12A. FIG. 12B is partial cut-away perspective view of the cylindrical vault/system 120 of FIG. 12 and FIG. 12A. FIG. 12C is another partial cut-away perspective view of the cylindrical vault/system 120 of FIG. 12 and FIG. 12A.

Referring to FIGS. 12-12C, the twelfth embodiment 120 is similar to the eleventh embodiment 110 with the substitution of the hydro-variant skimmer 52 instead of the flow restricted skimmer 42. The hydro-variant skimmer 52 can operate and function similar to the flow restricted skimmer shown and described in reference to FIGS. 5-5H referenced above.

Figure 13:
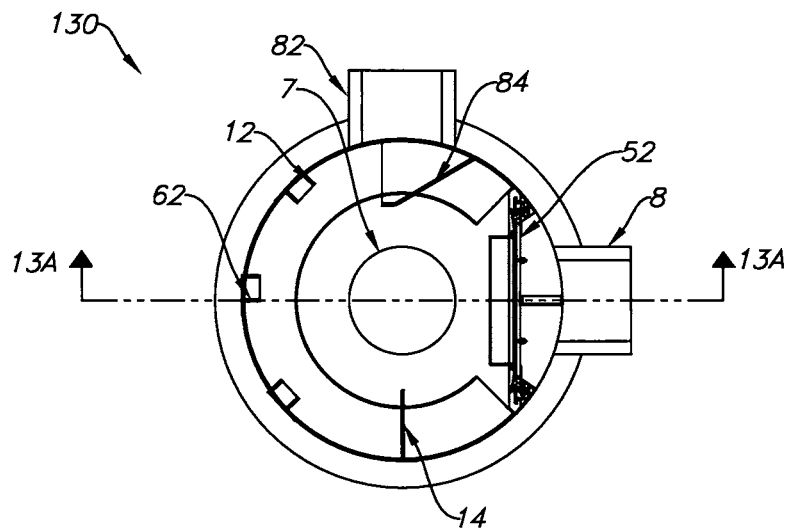
FIG. 13 is a top view of a tenth embodiment of a cylindrical vault/system with side in flow port, single direction inflow deflector, horizontal deflector, high profile vertical baffles, angled low profile vertical baffles and hydro-variant skimmer.
Figure 13A:
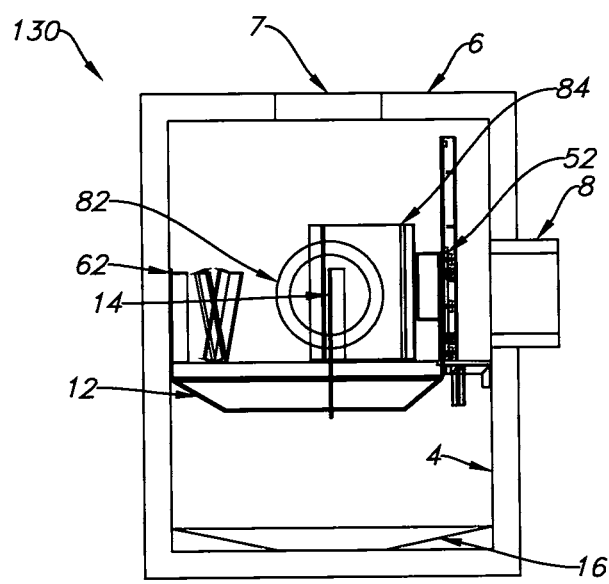
FIG. 13A is a side cross-sectional view of the cylindrical vault/system of FIG. 13 along arrows 13A.
Figure 13B:
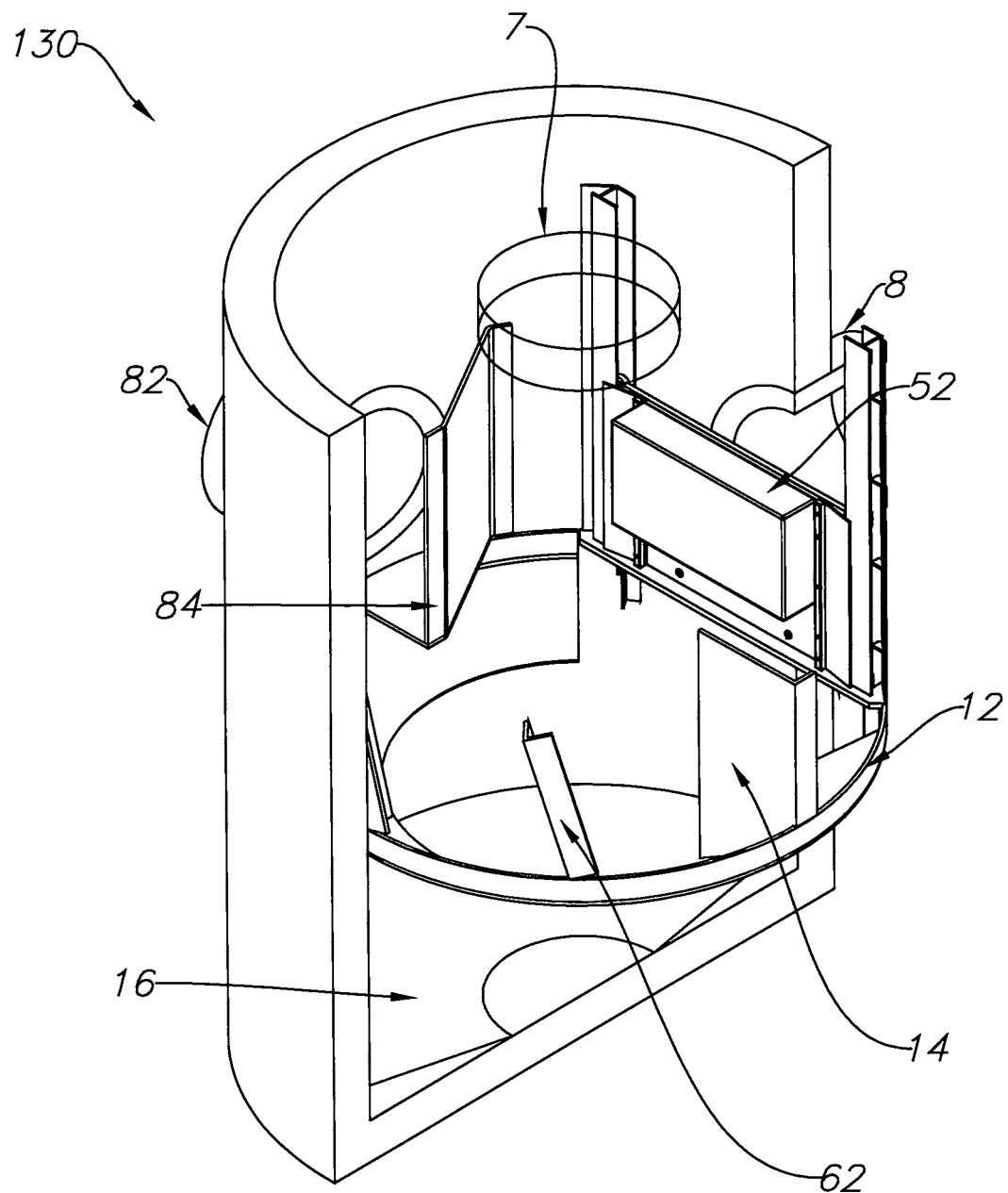
FIG. 13B is partial cut-away perspective view of the cylindrical vault/system of FIG. 13 and FIG. 13A.
Figure 13C:
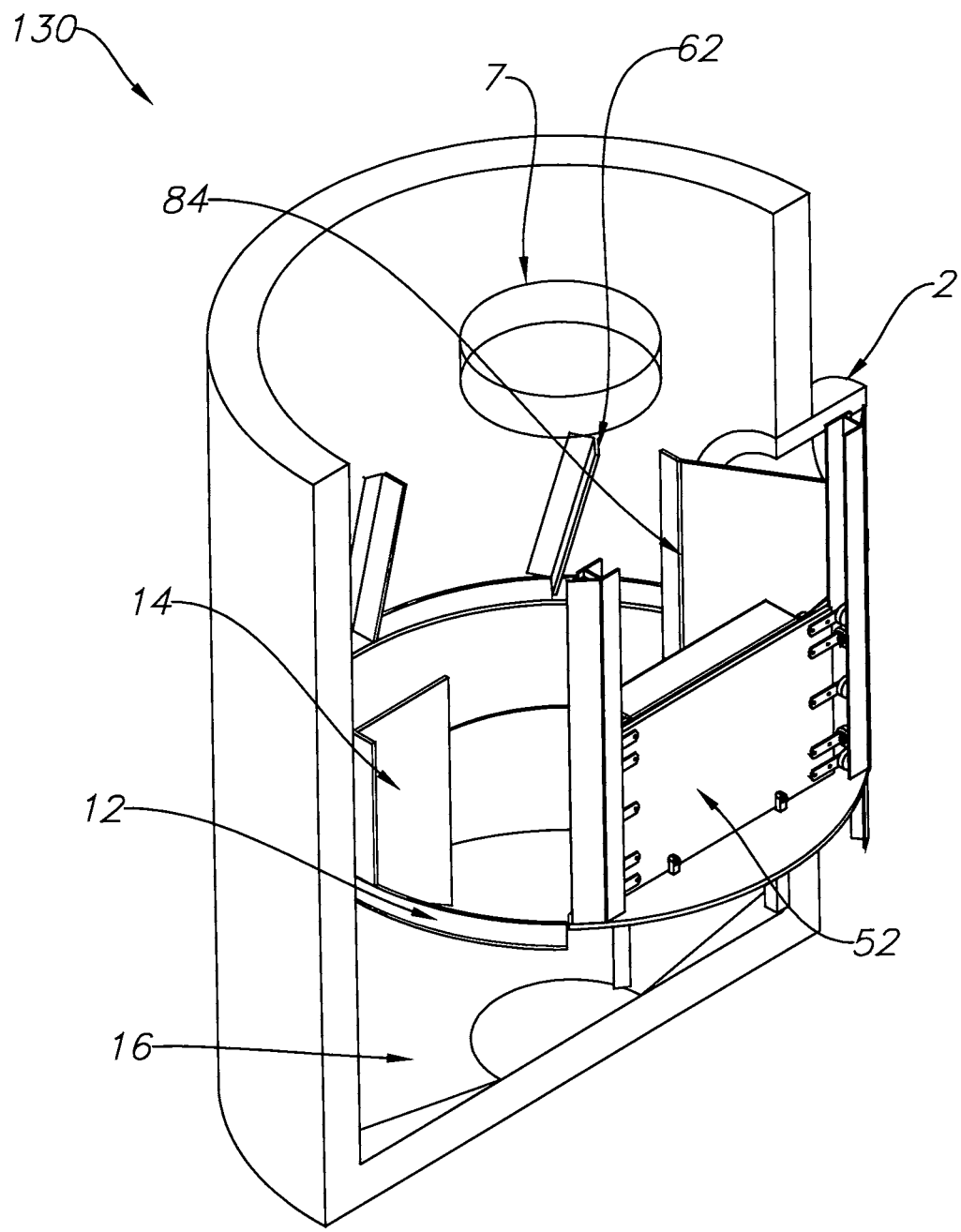
FIG. 13C is another partial cut-away perspective view of the cylindrical vault/system of FIG. 13 and FIG. 13A.

Thirteenth Embodiment Cylindrical Vault/System with Side Inflow Port, Single Direction Inflow Deflector, Horizontal Deflector, High Profile Vertical Baffles, Angled Low Profile Vertical Baffles and Hydro-Variant Skimmer FIG. 13 is a top view of a tenth embodiment of a cylindrical vault/system 130 with side in flow port 82, single direction inflow deflector 84, horizontal deflector 12, high profile vertical baffles 14, angled low profile vertical baffles 62 and hydro-variant skimmer 52. FIG. 13A is a side cross-sectional view of the cylindrical vault/system 130 of FIG. 13 along arrows 13A. FIG. 13B is partial cut-away perspective view of the cylindrical vault/system 130 of FIG. 13 and FIG. 13A. FIG. 13C is another partial cut-away perspective view of the cylindrical vault/system 130 of FIG. 13 and FIG. 13A.

Referring to FIGS. 13-13C, the thirteenth embodiment 130 can be similar to the twelfth embodiment 120 with the substitution of using angled low profile baffles 62 instead of the low profile vertical baffles 22. The angled low profile baffles 62 can operate and function similar to the angled low profile baffles 62 shown and described in reference to FIGS. 6-6D.

Figure 14:
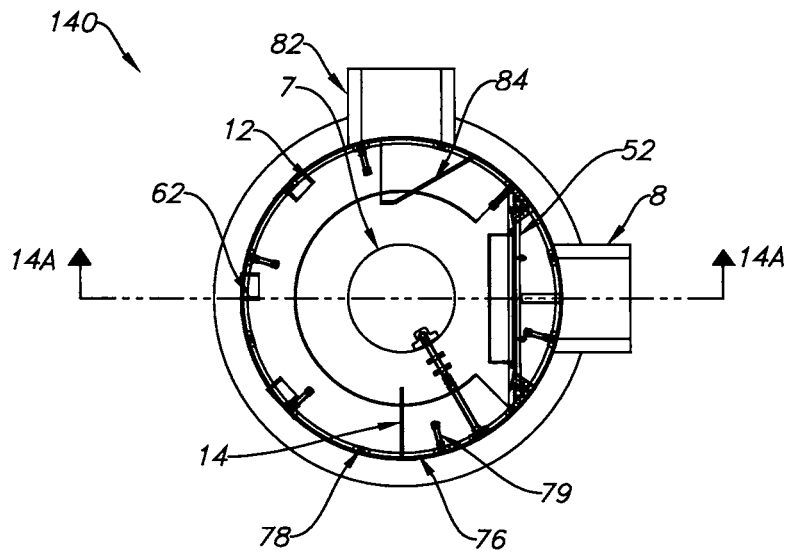
FIG. 14 is a top view of a tenth embodiment of a cylindrical vault/system with side in flow port, single direction inflow deflector, horizontal deflector, high profile baffles, angled low profile vertical baffles, hydro-variant skimmer and hydroslide system.
Figure 14A:
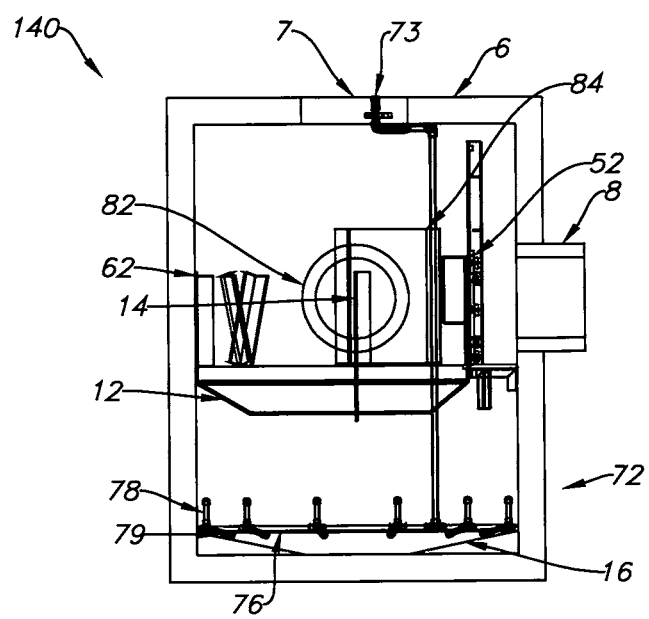
FIG. 14A is a side cross-sectional view of the cylindrical vault/system of FIG. 14 along arrows 43A.
Figure 14B:
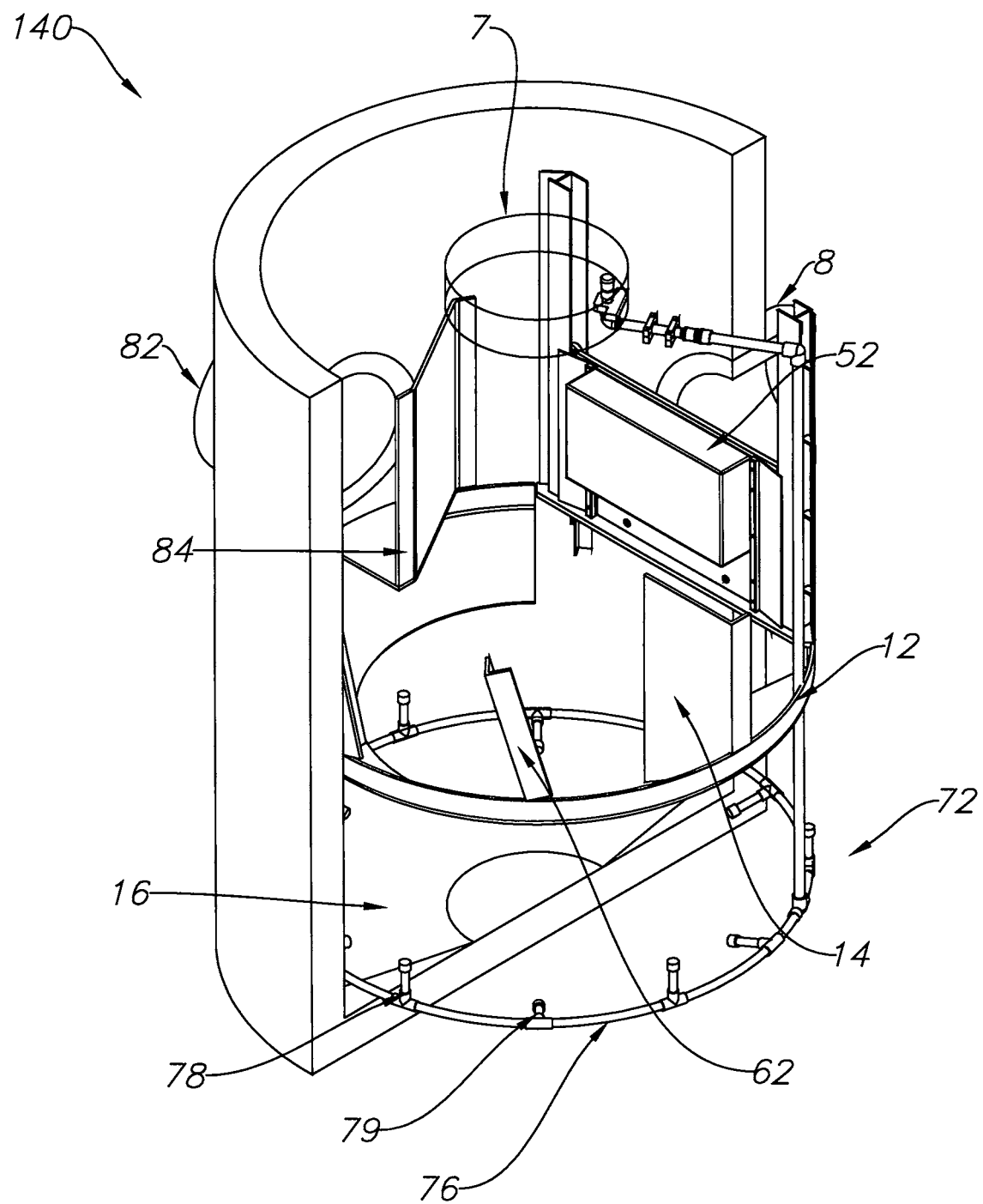
FIG. 14B is partial cut-away perspective view of the cylindrical vault/system of FIG. 14 and FIG. 14A.
Figure 14C:
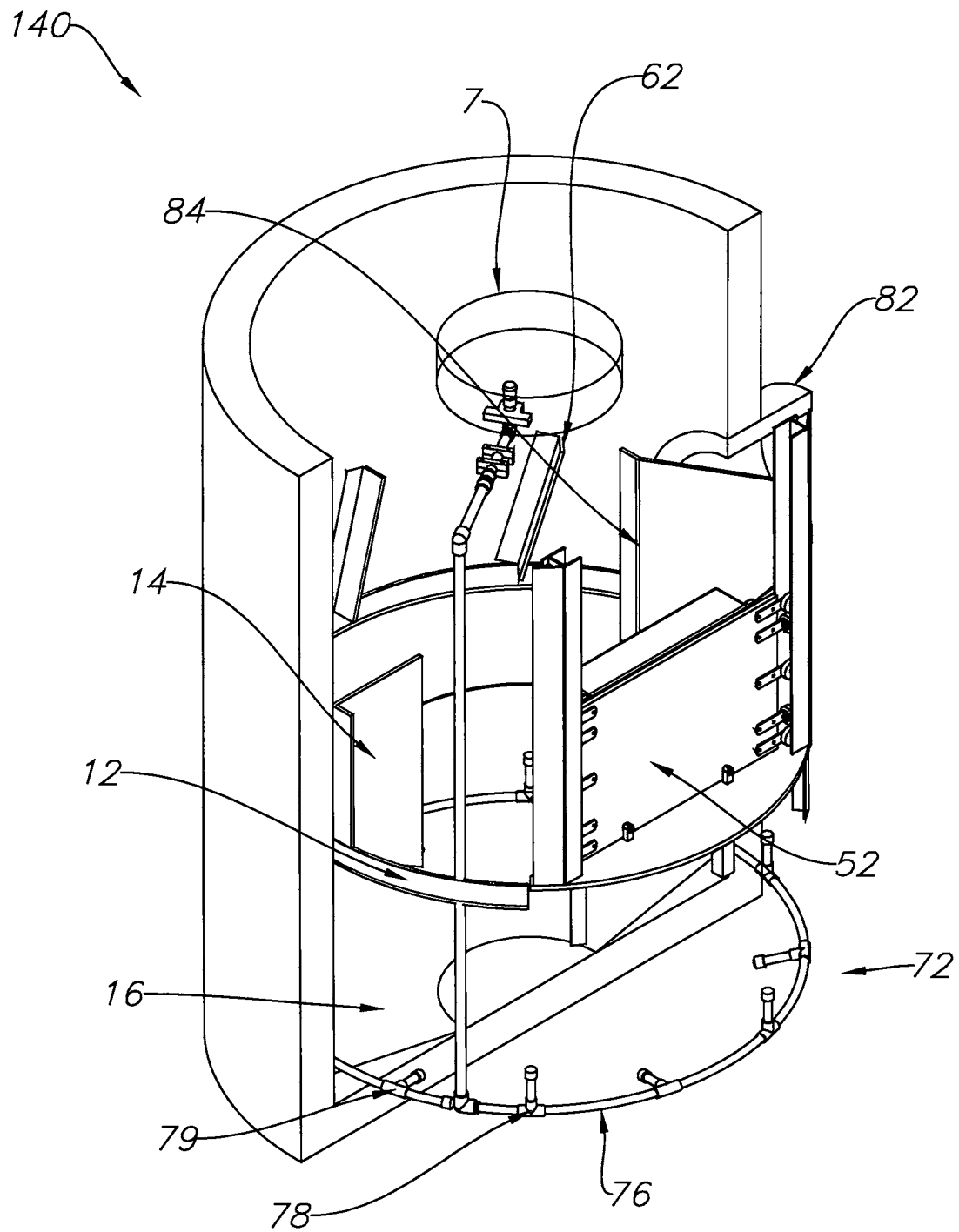
FIG. 14C is another partial cut-away perspective view of the cylindrical vault/system of FIG. 14 and FIG. 14A.

Fourteenth Embodiment Cylindrical Vault/System with Side Inflow Port, Single Direction Inflow Deflector, Horizontal Deflector, High Profile Vertical Baffles, Angled Low Profile Vertical Baffles, Hydro-Variant Skimmer and Hydroslide System FIG. 14 is a top view of a tenth embodiment of a cylindrical vault/system 140 with side in flow port 82, single direction inflow deflector 84, horizontal deflector 12, high profile vertical baffles 14, angled low profile vertical baffles 62, hydro-variant skimmer 52 and hydroslide system 72. FIG. 14A is a side cross-sectional view of the cylindrical vault/system 140 of FIG. 14 along arrows 43A. FIG. 14B is partial cut-away perspective view of the cylindrical vault/ system 140 of FIG. 14 and FIG. 14A. FIG. 14C is another partial cut-away perspective view of the cylindrical vault/ system 140 of FIG. 14 and FIG. 14A.

Referring to FIGS. 14-14C, the fourteenth embodiment 140 is similar to the thirteenth embodiment with the addition of a hydro-slide system 72. The hydro-slide system 72 can operate and function similarly to the hydro-slide system shown and described in reference to FIGS. 7-7C referenced above.

Figure 15:
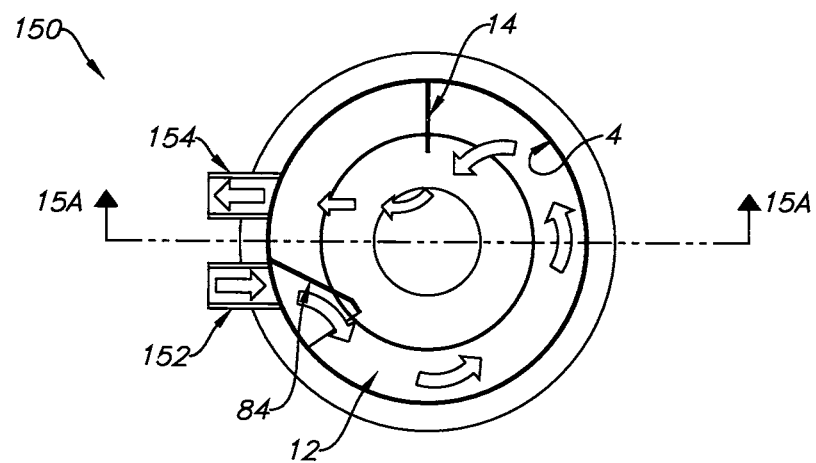
FIG. 15 is a top view of a fifteenth embodiment of a cylindrical vault/system with inflow and outflow ports on same side, single direction inflow deflector, horizontal deflector, and high profile vertical baffle, and flow line arrows.
Figure 15A:
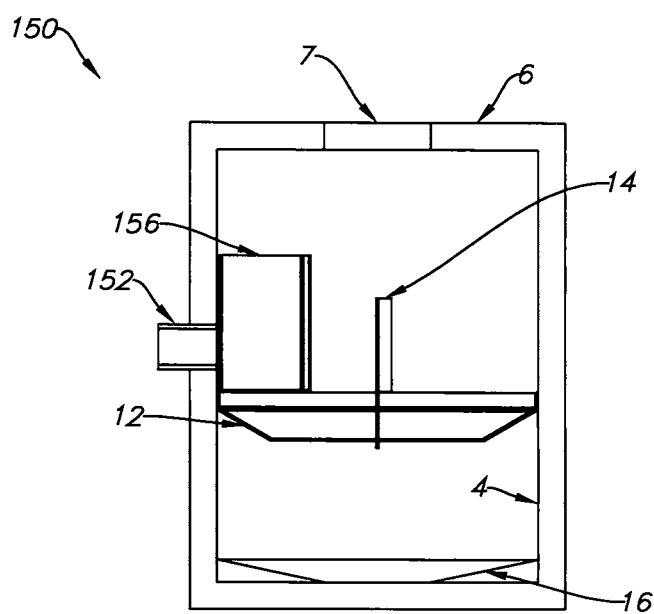
FIG. 15A is a side cross-sectional view of the cylindrical vault/system of FIG. 15 along arrows 15A.
Figure 15B:
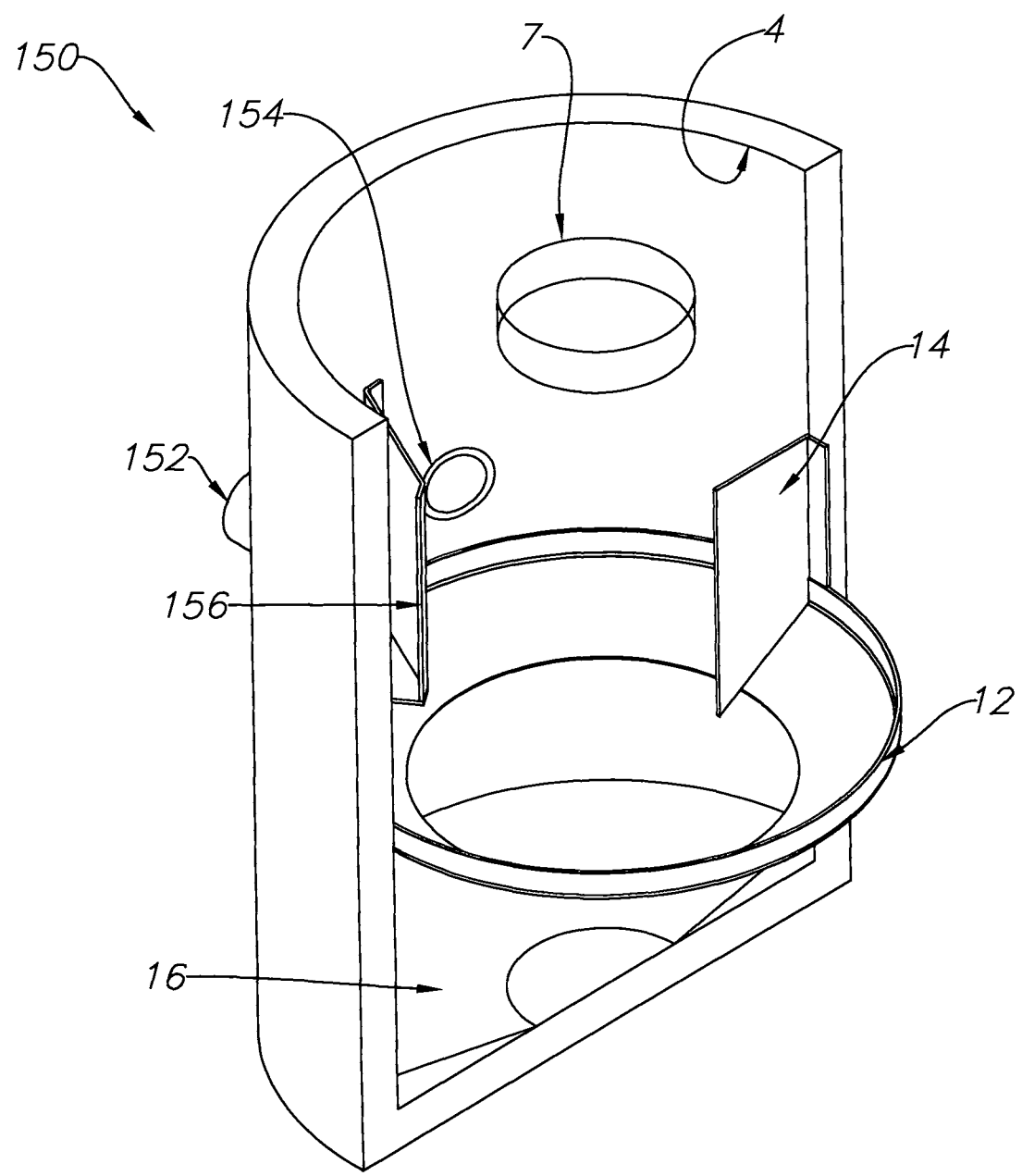
FIG. 15B is partial cut-away perspective view of the cylindrical vault/system of FIG. 15 and FIG. 15A.
Figure 15C:
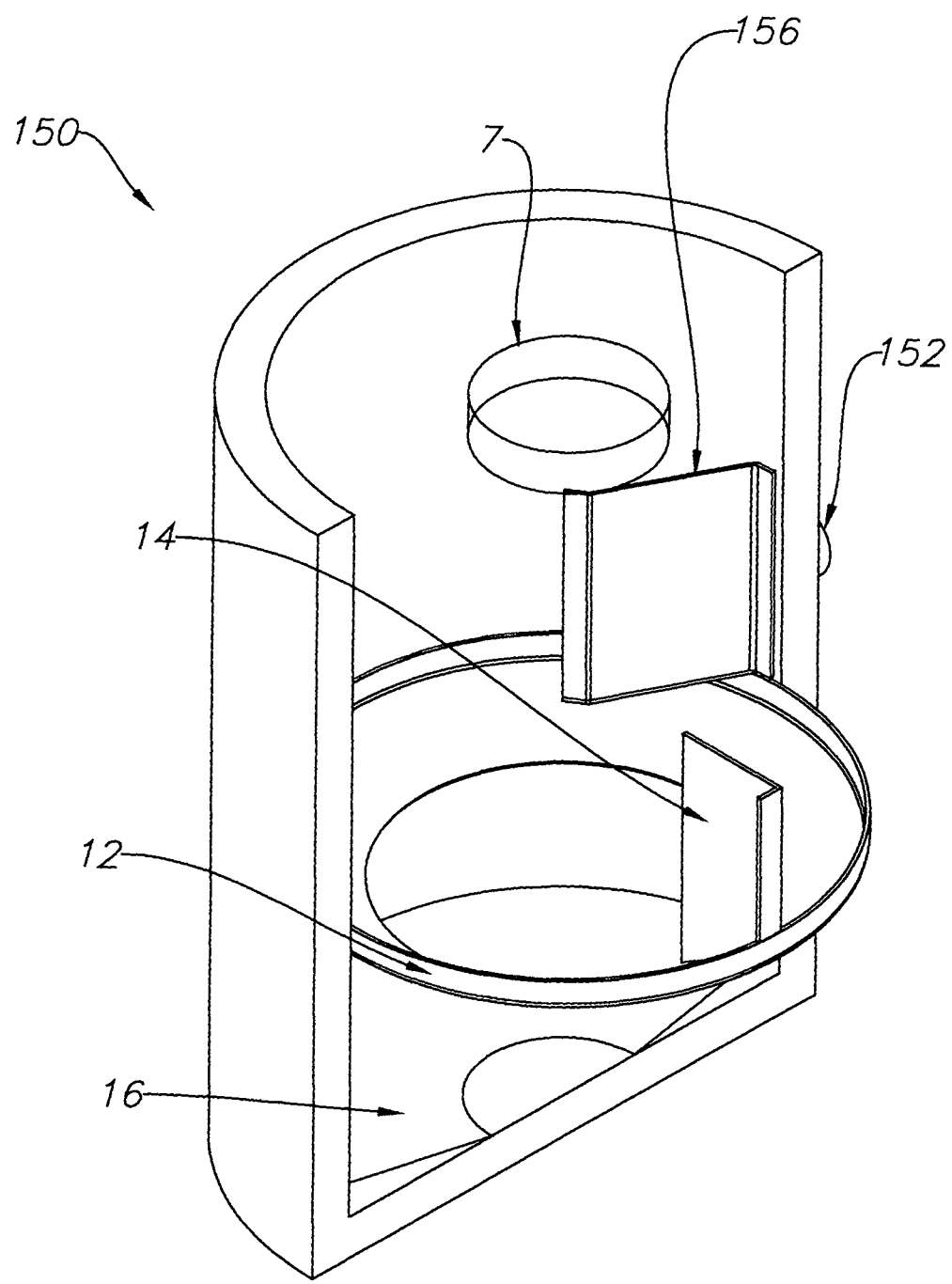
FIG. 15C is another partial cut-away perspective view of the cylindrical vault/system of FIG. 15 and FIG. 15A.

Fifteenth Embodiment Cylindrical Vault/System with Inflow and Outflow Ports on Same Side, Single Direction Inflow Deflector, Horizontal Deflector, and High Profile Vertical Baffle FIG. 15 is a top view of a fifteenth embodiment of a cylindrical vault/system 150 with inflow port 152 and outflow port 154 on same side, single direction inflow deflector 156, horizontal deflector 12, and high profile vertical baffle, and flow line arrows. FIG. 15A is a side cross-sectional view of the cylindrical vault/system 150 of FIG. 15 along arrows 15A. FIG. 15B is partial cut-away perspective view of the cylindrical vault/system 150 of FIG. 15 and FIG. 15A. FIG. 15C is another partial cut-away perspective view of the cylindrical vault/system 150 of FIG. 15 and FIG. 15A.

Referring to FIGS. 15-15C, the fifteenth embodiment 150 can be similar to the first embodiment 1 in FIGS. 1-1G, and eight embodiment 80 in FIGS. 8-8C, with the difference of having the inflow pipe/line 152 and outflow pipe/line 154 on the same side of the cylindrical vault/system 150.

If the inflow pipe 152 and outflow pipe 154 are adjacent to each other, inflow deflector 156 can be shaped such that the entire flow is directed along the side wall away from the outflow opening 154.

If the inflow pipe 152 and outflow pipe 154 are adjacent to each other, the entire horizontal deflector 12 can extend from under the inflow opening 152 away from the outflow opening 154, wrapping around the vault 150 and stopping short of the output 154 (and short of the skimmer(s) 32, 42, 52 and shelf system, shown in FIGS. 3-3F, 4-G, and 5-H).

Figure 16:
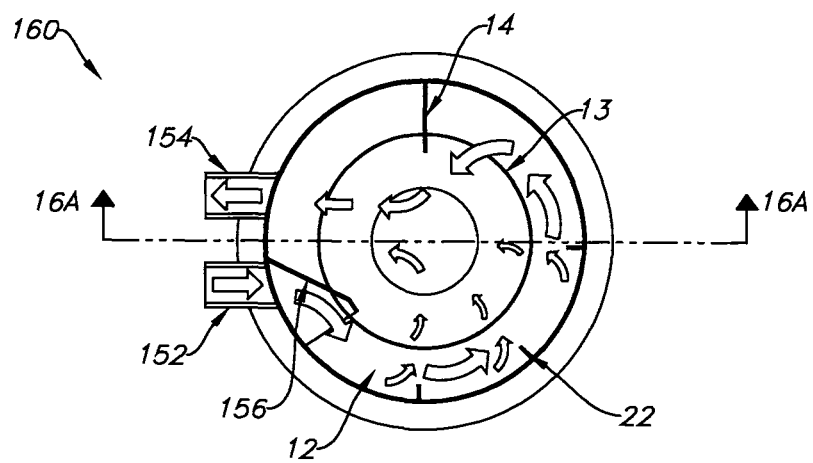
FIG. 16 is a top view of a sixteenth embodiment of a cylindrical vault/system with inflow and outflow ports on same side, single direction inflow deflector, horizontal deflector, high profile vertical baffles, low profile vertical baffles and flow line arrows.
Figure 16A:
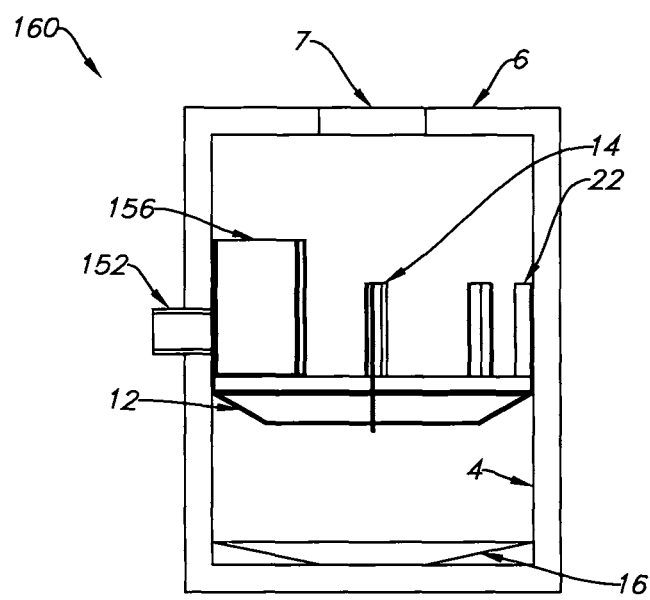
FIG. 16A is a side cross-sectional view of the cylindrical vault/system of FIG. 16 along arrows 16A.
Figure 16B:
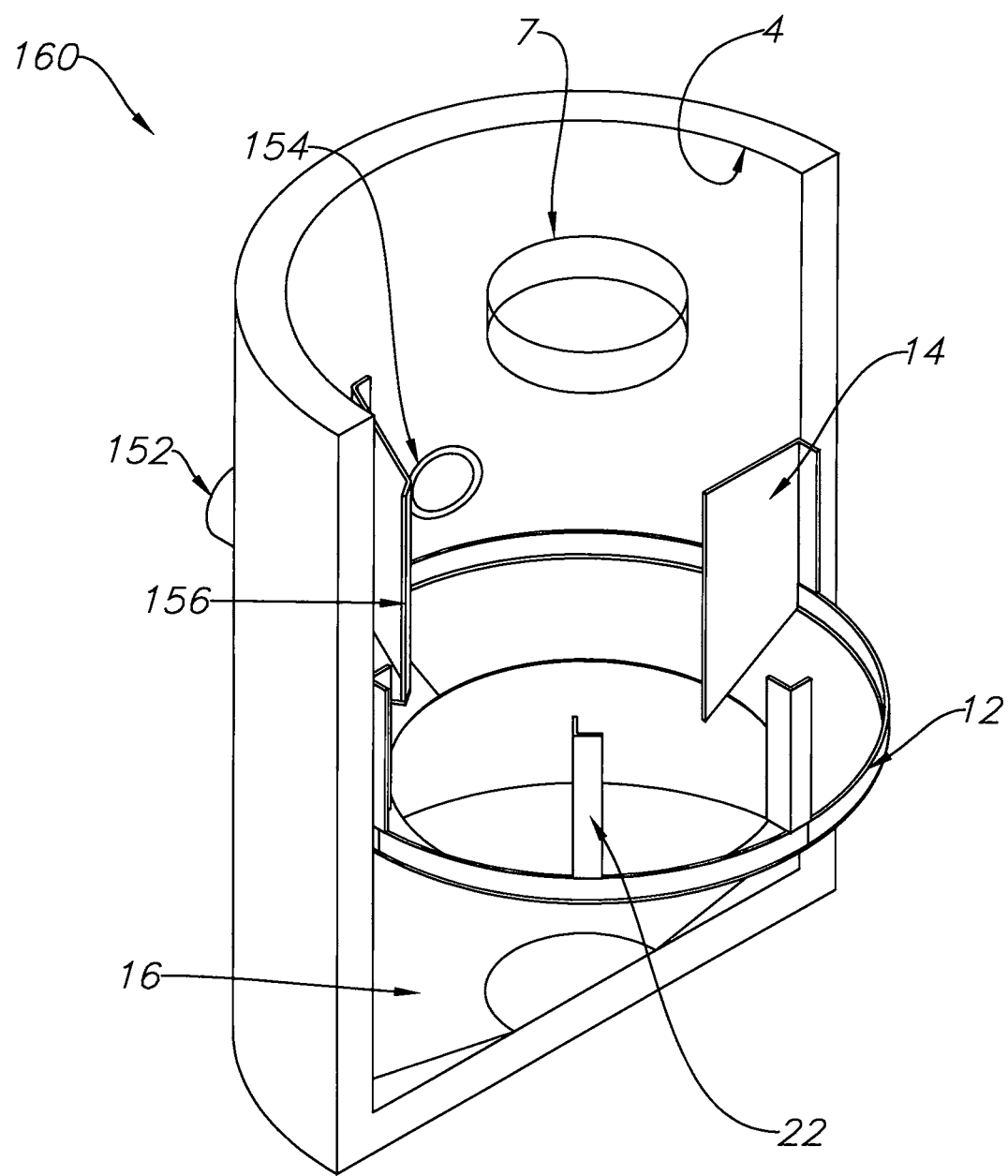
FIG. 16B is partial cut-away perspective view of the cylindrical vault/system of FIG. 16 and FIG. 16A.
Figure 16C:
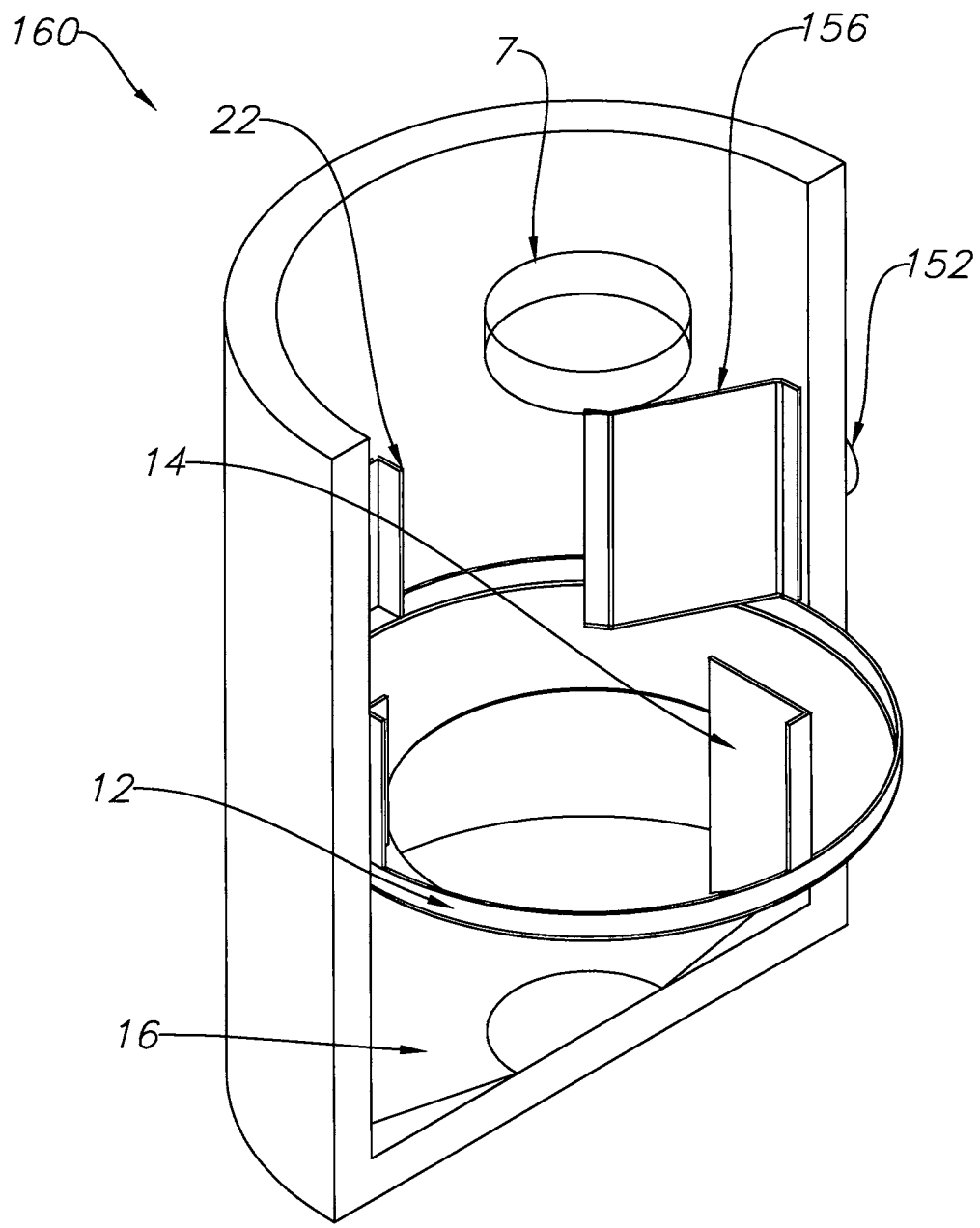
FIG. 16C is another partial cut-away perspective view of the cylindrical vault/system of FIG. 16 and FIG. 16A.

Sixteenth Embodiment Cylindrical Vault/System with Inflow and Outflow Ports on Same Side, Single Direction Inflow Deflector, Horizontal Deflector, High Profile Vertical Baffle and Low Profile Vertical Baffles FIG. 16 is a top view of a sixteenth embodiment of a cylindrical vault/system 160 with inflow port 152 and outflow port 154 on same side, single direction inflow deflector 156, horizontal deflector 12, high profile vertical baffle 14, low profile vertical baffles 22 and flow line arrows. FIG. 16A is a side cross-sectional view of the cylindrical vault/system 160 of FIG. 16 along arrows 16A. FIG. 16B is partial cut-away perspective view of the cylindrical vault/system 160 of FIG. 16 and FIG. 16A. FIG. 16C is another partial cut-away perspective view of the cylindrical vault/system 160 of FIG. 16 and FIG. 16A.

Referring to FIGS. 16-16C, the sixteenth embodiment 160 is similar to the fifteenth embodiment 150 with the addition of low profile vertical baffles 22. The low profile vertical baffles 22 can function and operate similar to the low profile vertical baffles 22 in FIGS. 2-2D and 9-9C.

Figure 17:
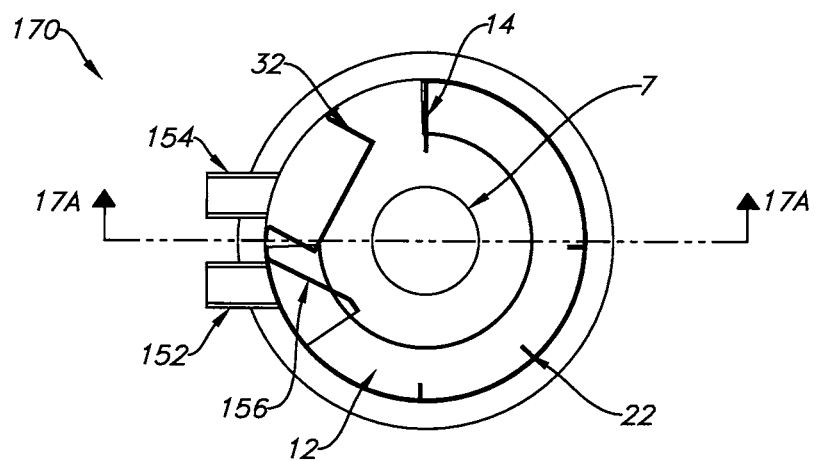
FIG. 17 is a top view of a seventeenth embodiment of a cylindrical vault/system with inflow and outflow ports on same side, single direction inflow deflector, horizontal deflector, high profile vertical baffle, low profile vertical baffles and open bottom skimmer.
Figure 17A:
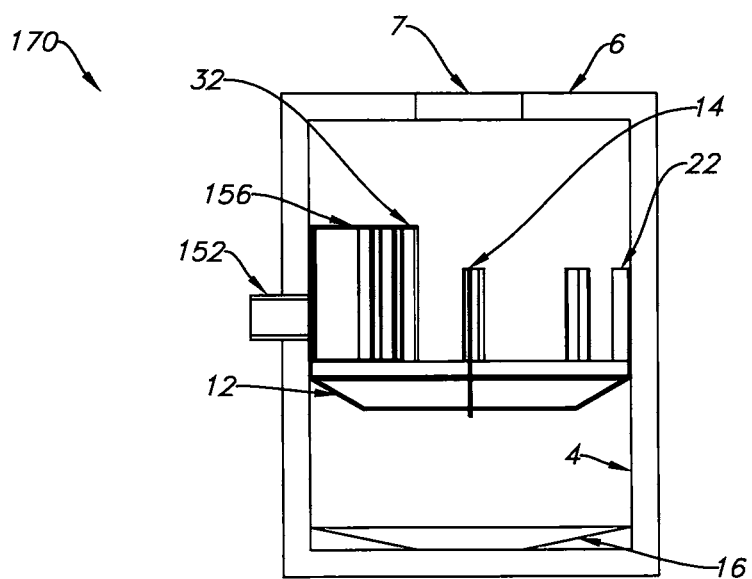
FIG. 17A is a side cross-sectional view of the cylindrical vault/system of FIG. 17 along arrows 17A.
Figure 17B:
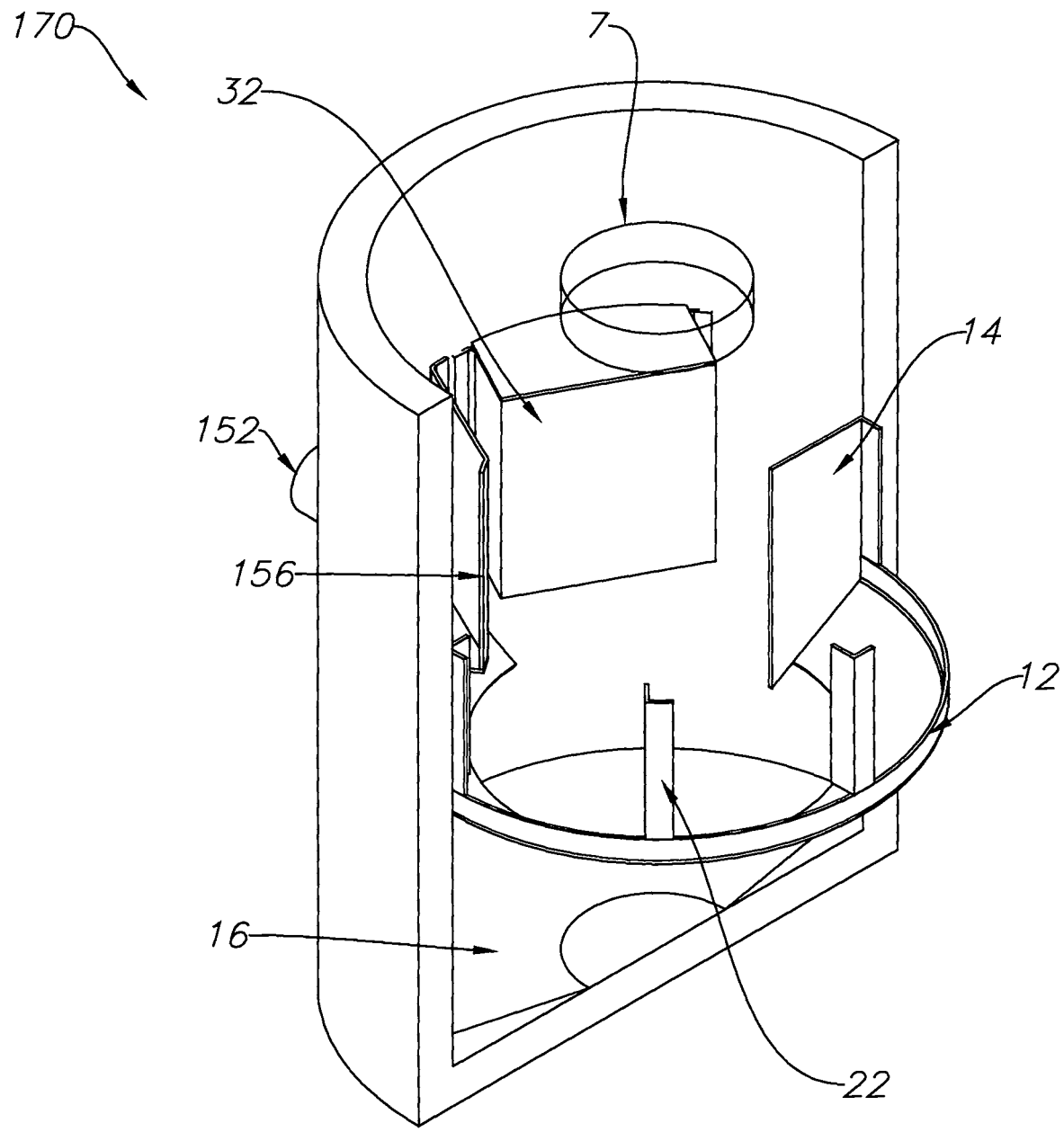
FIG. 17B is partial cut-away perspective view of the cylindrical vault/system of FIG. 17 and FIG. 17A.
Figure 17C:
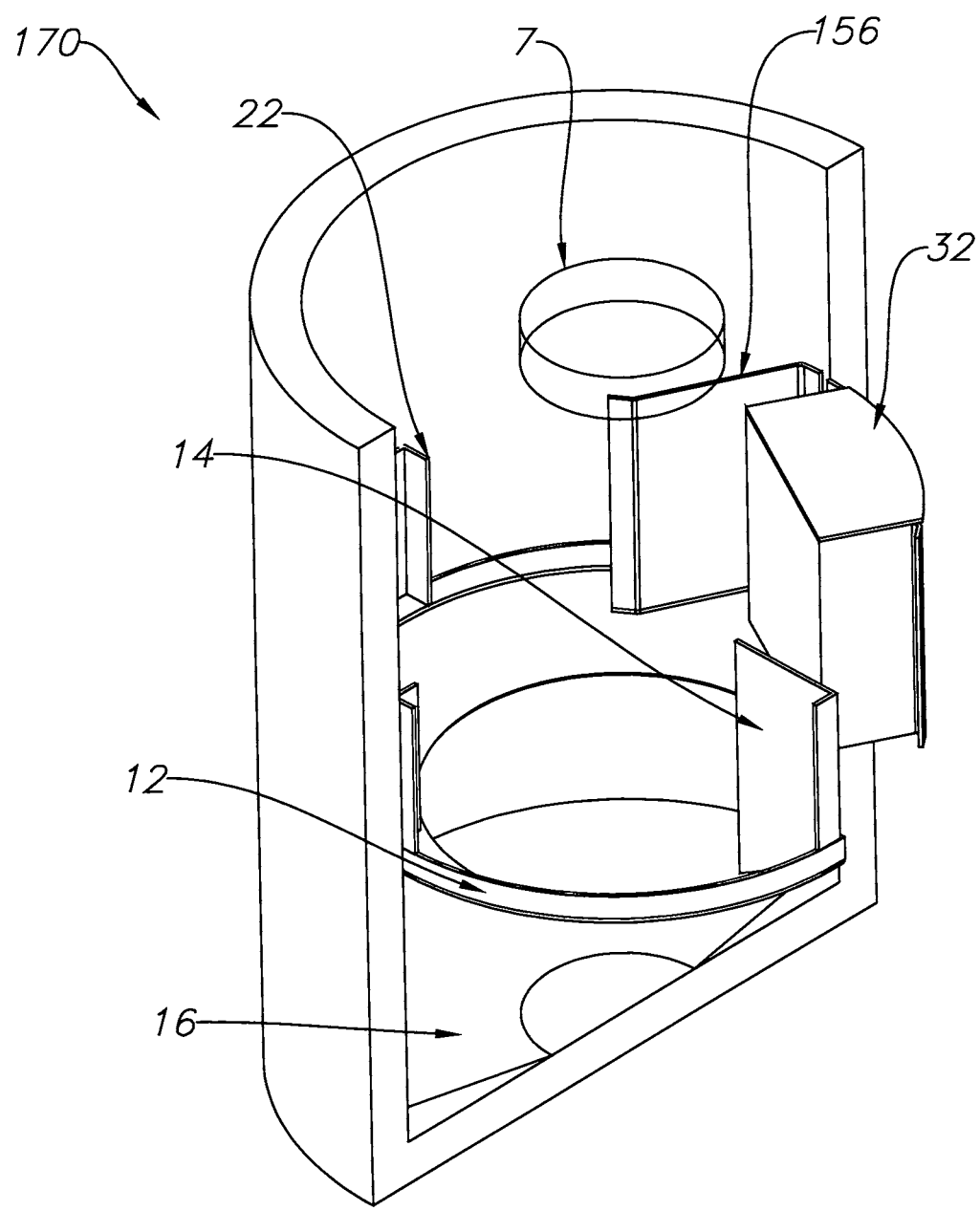
FIG. 17C is another partial cut-away perspective view of the cylindrical vault/system of FIG. 17 and FIG. 17A.

Seventeenth Embodiment Cylindrical Vault/System with Inflow and Outflow Ports on Same Side, Single Direction Inflow Deflector, Horizontal Deflector, High Profile Vertical Baffle, Low Profile Vertical Baffles and Open Bottom Skimmer FIG. 17 is a top view of a seventeenth embodiment of a cylindrical vault/system 170 with inflow port 152 and outflow port 154 on same side, single direction inflow deflector 156, horizontal deflector 12, high profile vertical baffle 14, low profile vertical baffles 22 and open bottom skimmer 32. FIG. 17A is a side cross-sectional view of the cylindrical vault/system 170 of FIG. 17 along arrows 17A. FIG. 17B is partial cut-away perspective view of the cylindrical vault/ system 170 of FIG. 17 and FIG. 17A. FIG. 17C is another partial cut-away perspective view of the cylindrical vault/ system 170 of FIG. 17 and FIG. 17A.

Referring to FIGS. 17-17C, the seventeenth embodiment 170 can be similar to the sixteenth embodiment 160 with the addition of an open bottom skimmer 32, which can function and operate similar to the skimmer 32 shown and described in reference to FIGS. 3-3F and 10-10C.

Figure 18:
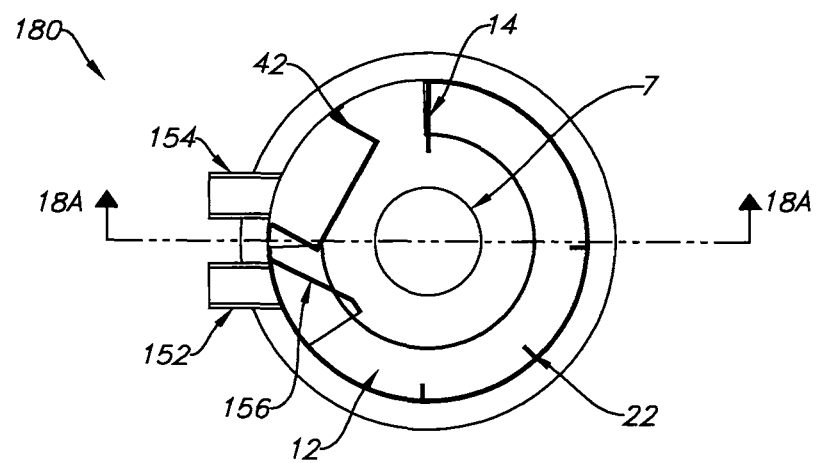
FIG. 18 is a top view of an eighteenth embodiment of a cylindrical vault/system with inflow and outflow ports on same side, single direction inflow deflector, horizontal deflector, high profile vertical baffle, low profile vertical baffles and flow restricted skimmer.
Figure 18A:
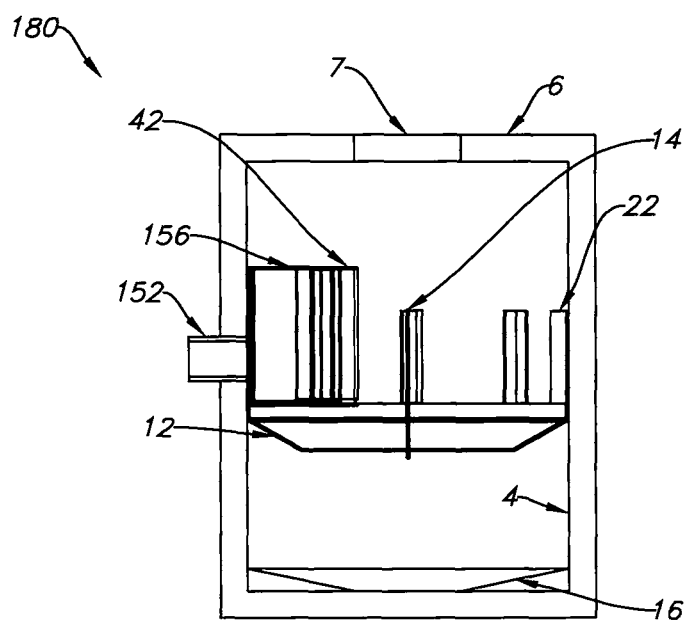
FIG. 18A is a side cross-sectional view of the cylindrical vault/system of FIG. 18 along arrows 18A.
Figure 18B:
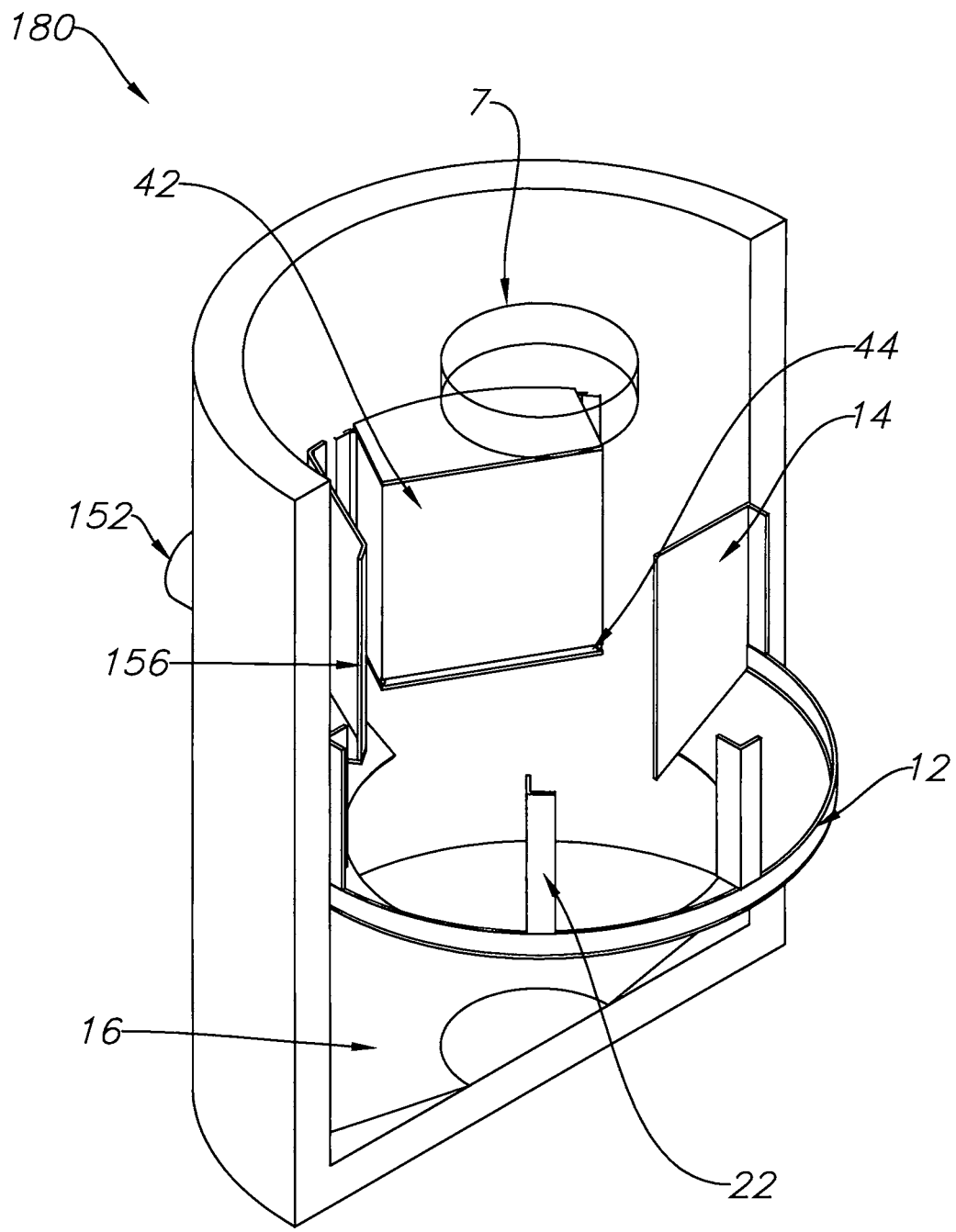
FIG. 18B is partial cut-away perspective view of the cylindrical vault/system of FIG. 18 and FIG. 18A.
Figure 18C:
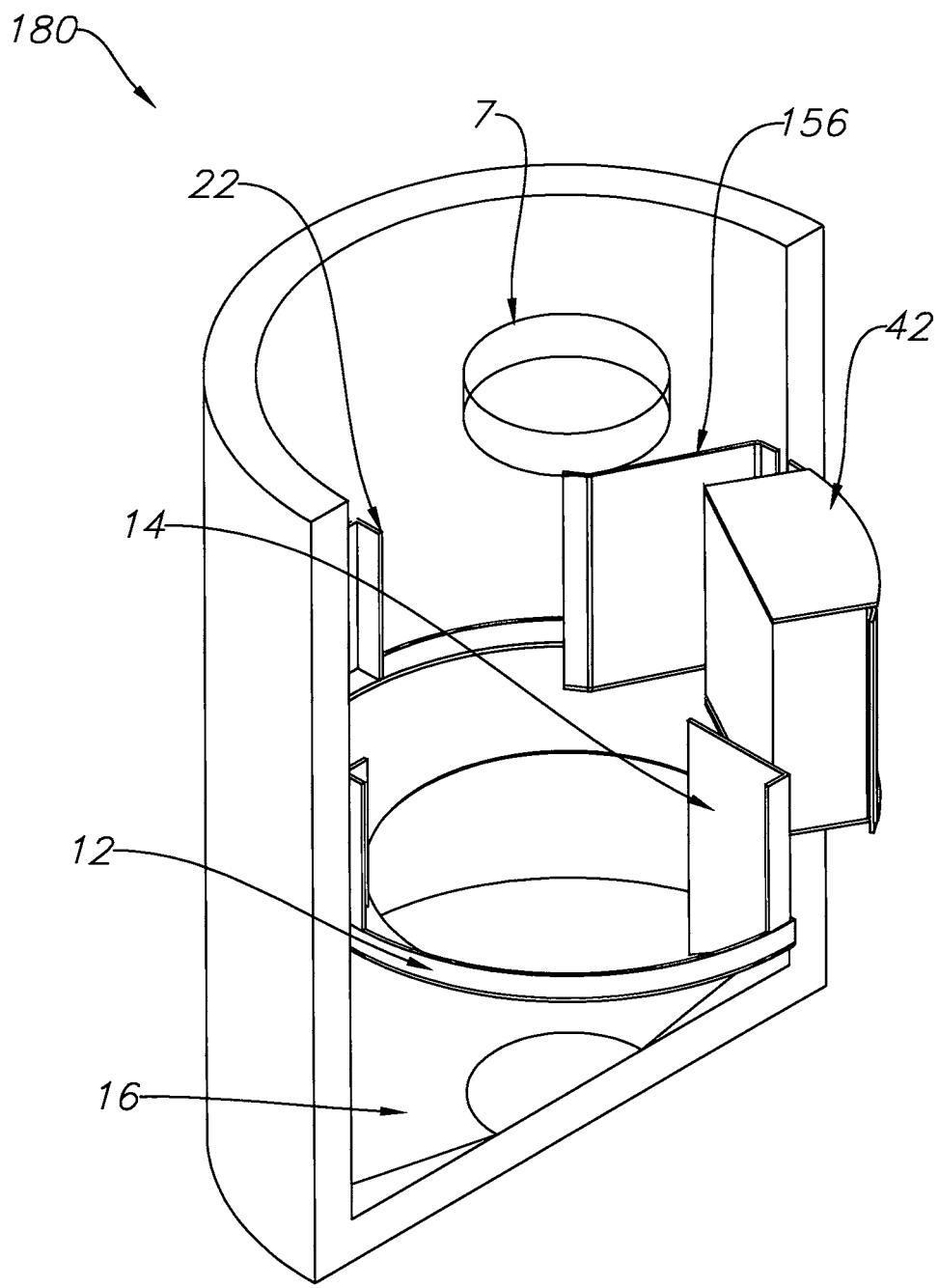
FIG. 18C is another partial cut-away perspective view of the cylindrical vault/system of FIG. 18 and FIG. 18A.

Eighteenth Embodiment Cylindrical Vault/System with Inflow and Outflow Ports on Same Side, Single Direction Inflow Deflector, Horizontal Deflector, High Profile Vertical Baffle, Low Profile Vertical Baffle and Flow Restricted Skimmer FIG. 18 is a top view of an eighteenth embodiment of a cylindrical vault/system 180 with inflow port 152 and outflow port 154 on same side, single direction inflow deflector 156, horizontal deflector 12, high profile vertical baffle 14, low profile vertical baffle 22 and flow restricted skimmer 42. FIG. 18A is a side cross-sectional view of the cylindrical vault/system 180 of FIG. 18 along arrows 18A. FIG. 18B is partial cut-away perspective view of the cylindrical vault/system 180 of FIG. 18 and FIG. 18A. FIG. 18C is another partial cut-away perspective view of the cylindrical vault/system 180 of FIG. 18 and FIG. 18A.

Referring to FIGS. 18-18C, the eighteenth embodiment 180 is similar to the seventeenth embodiment 170 with the exception of substituting a flow restricted skimmer 42 for the open bottom skim 32. The flow restricted skimmer 42 can operate and function similar to the flow restricted skimmer 42 shown and described in reference to FIGS. 4-4G and 11-11C described above.

Figure 19:
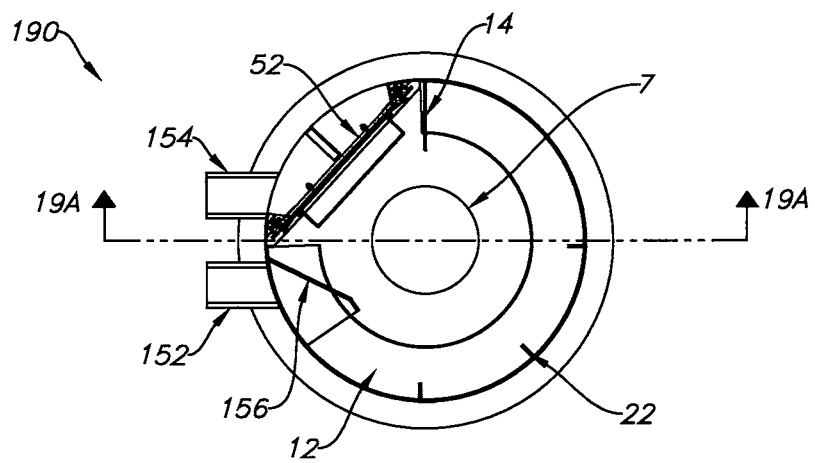
FIG. 19 is a top view of a nineteenth embodiment of a cylindrical vault/system with inflow and outflow ports on same side, single direction inflow deflector, horizontal deflector, high profile vertical baffle, low profile vertical baffles and hydro-variant skimmer.
Figure 19A:
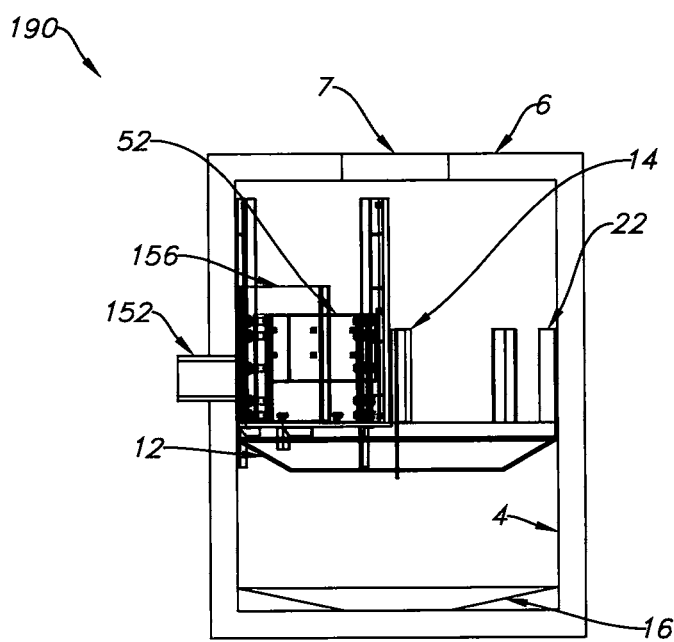
FIG. 19A is a side cross-sectional view of the cylindrical vault/system of FIG. 19 along arrows 19A.
Figure 19B:
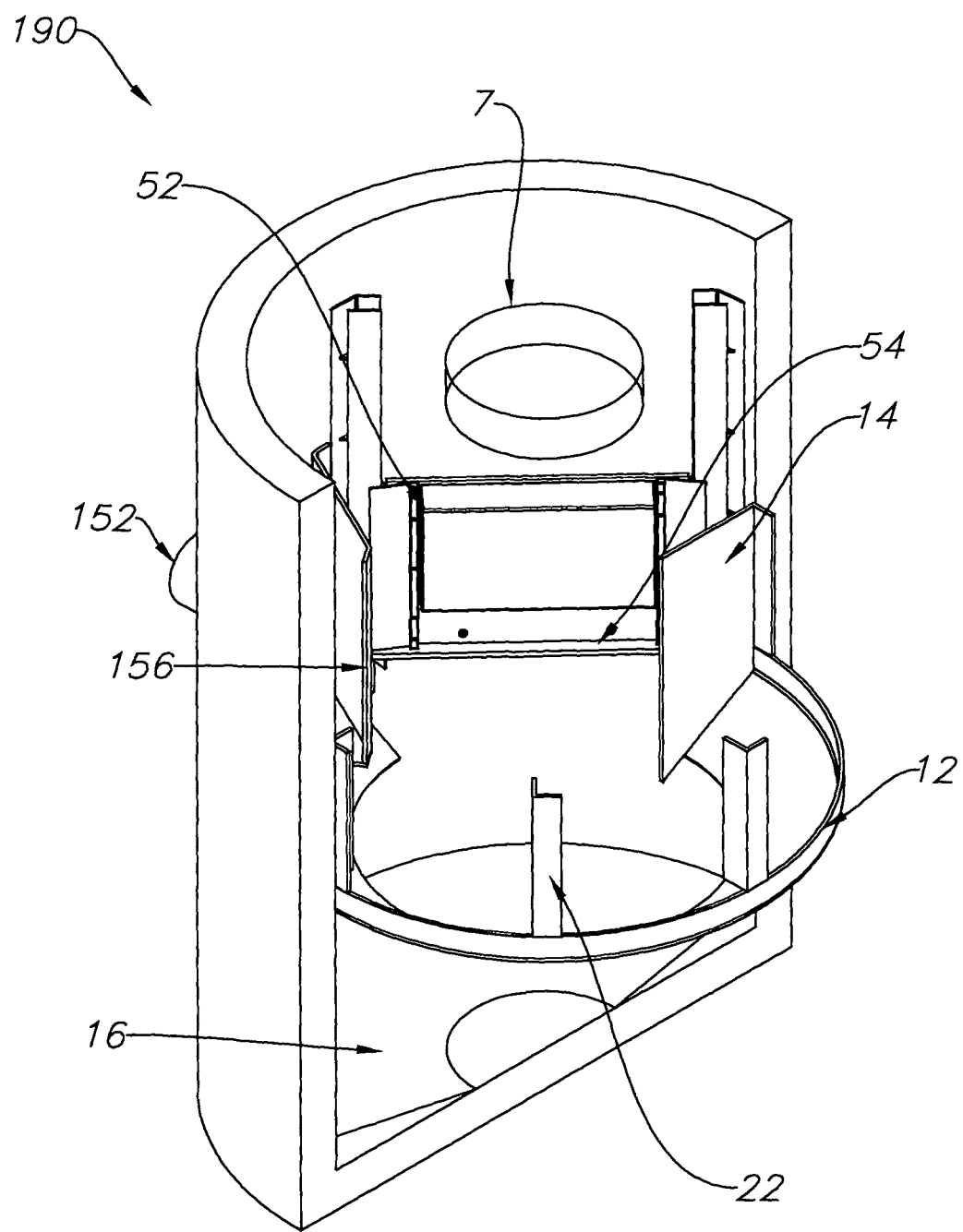
FIG. 19B is partial cut-away perspective view of the cylindrical vault/system of FIG. 19 and FIG. 19A.
Figure 19C:
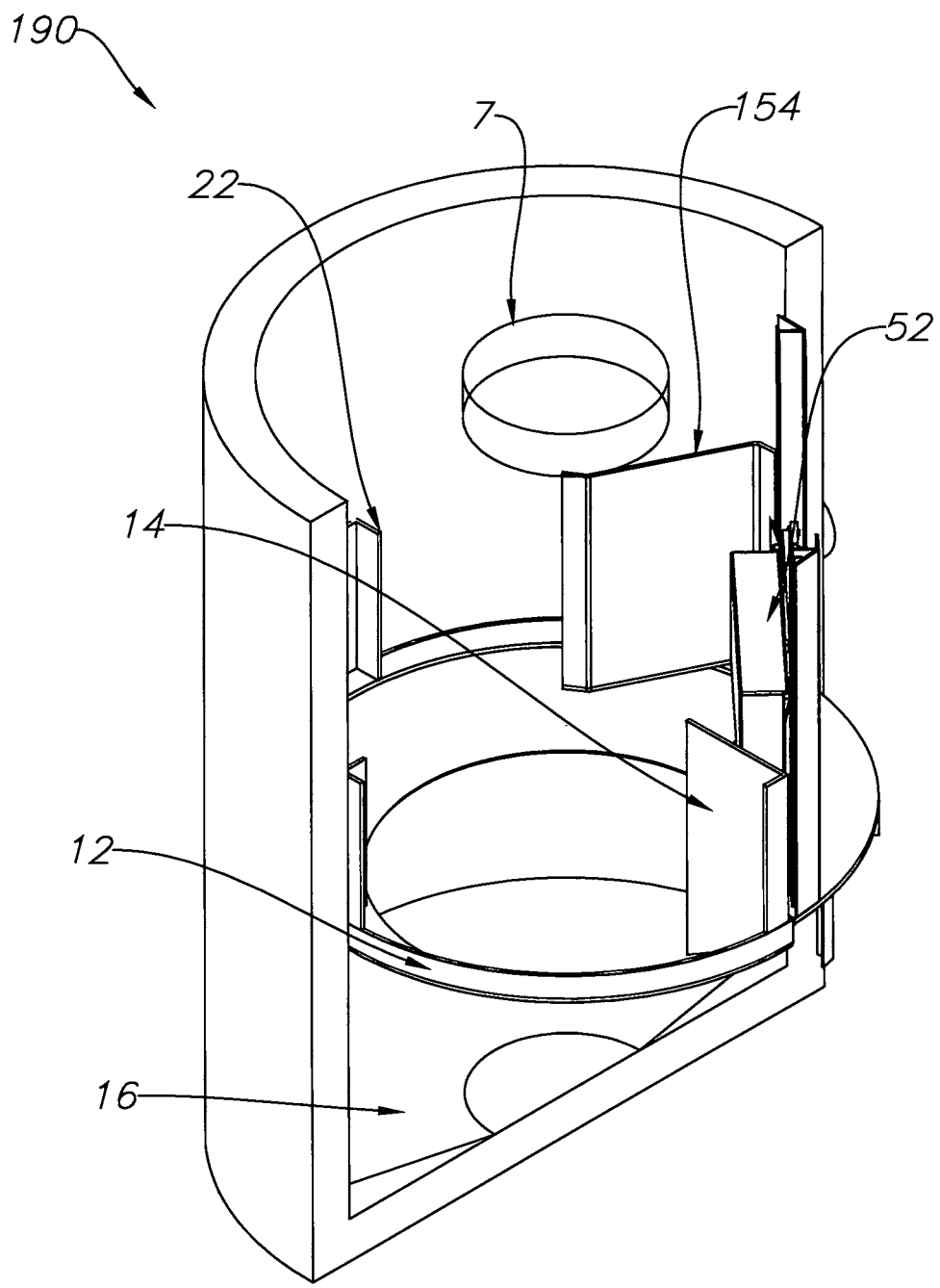
FIG. 19C is another partial cut-away perspective view of the cylindrical vault/system of FIG. 19 and FIG. 19A.

Nineteenth Embodiment Cylindrical Vault/System with Inflow and Outflow Ports on Same Side, Single Direction Inflow Deflector, Horizontal Deflector, High Profile Vertical Baffle, Low Profile Vertical Baffle and Hydro-Variant Skimmer FIG. 19 is a top view of a nineteenth embodiment of a cylindrical vault/system 190 with inflow port 152 and outflow port 154 on same side, single direction inflow deflector 156, horizontal deflector 12, high profile vertical baffle 14, low profile vertical baffles 22 and hydro-variant skimmer 52. FIG. 19A is a side cross-sectional view of the cylindrical vault/system 190 of FIG. 19 along arrows 19A. FIG. 19B is partial cut-away perspective view of the cylindrical vault/system 190 of FIG. 19 and FIG. 19A. FIG. 19C is another partial cut-away perspective view of the cylindrical vault/system 190 of FIG. 19 and FIG. 19A.

Referring to FIGS. 19-19C, the nineteenth embodiment 190 is similar to the eighteenth embodiment 180 with the exception of substituting a hydro-variant skimmer 52 for the flow restricted skimmer 42. The hydro-variant skimmer can operate and function similarly to the hydro-variant skimmer 52 shown and described in FIGS. 5-5H and 14-13C.

Figure 20:
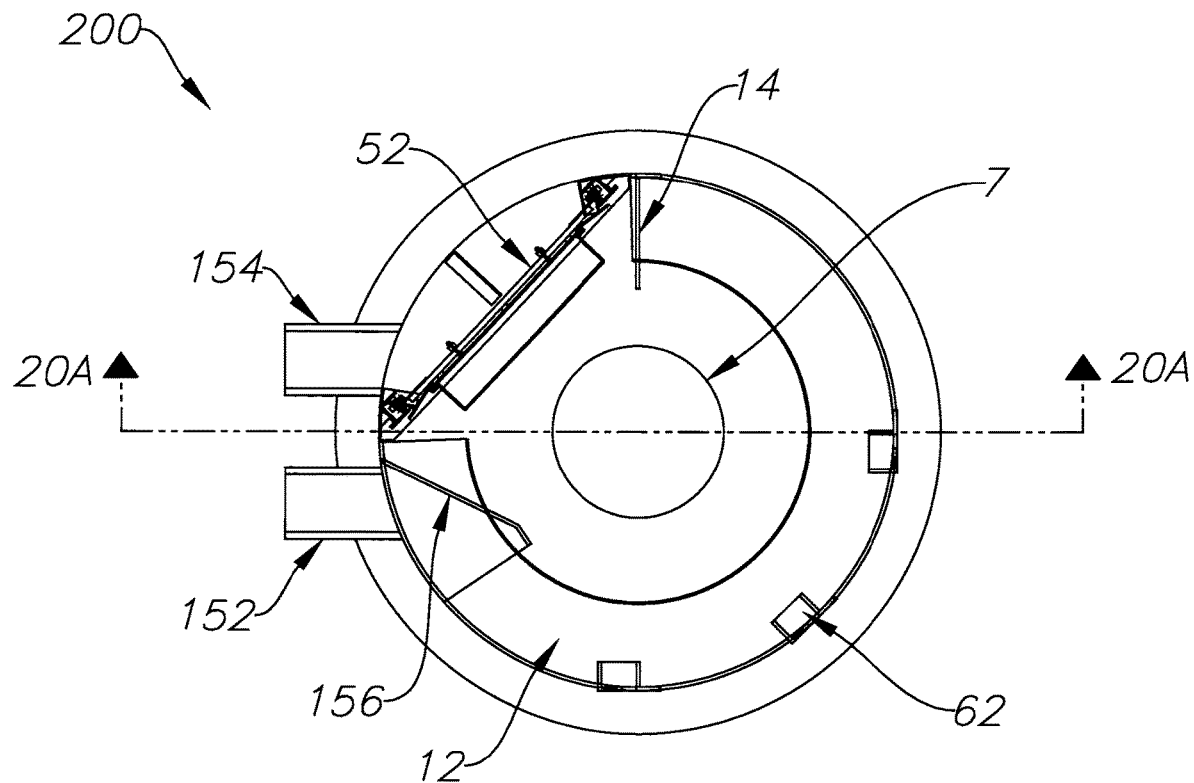
FIG. 20 is a top view of a twentieth embodiment of a cylindrical vault/system with inflow and outflow ports on same side, single direction inflow deflector, horizontal deflector, high profile vertical baffle, angled low profile vertical baffles and hydro-variant skimmer.
Figure 20A:
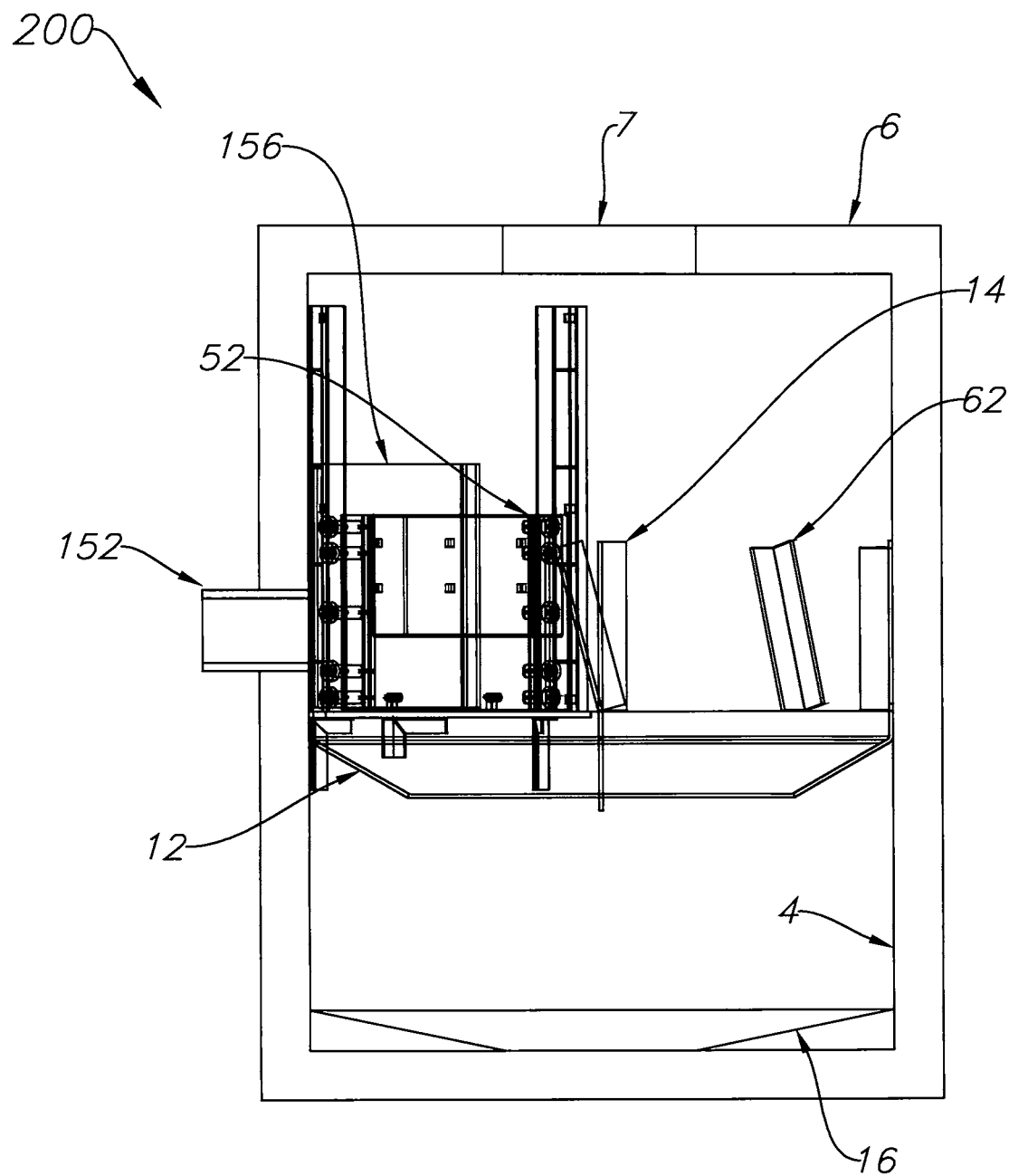
FIG. 20A is a side cross-sectional view of the cylindrical vault/system of FIG. 20 along arrows 20A.
Figure 20B:
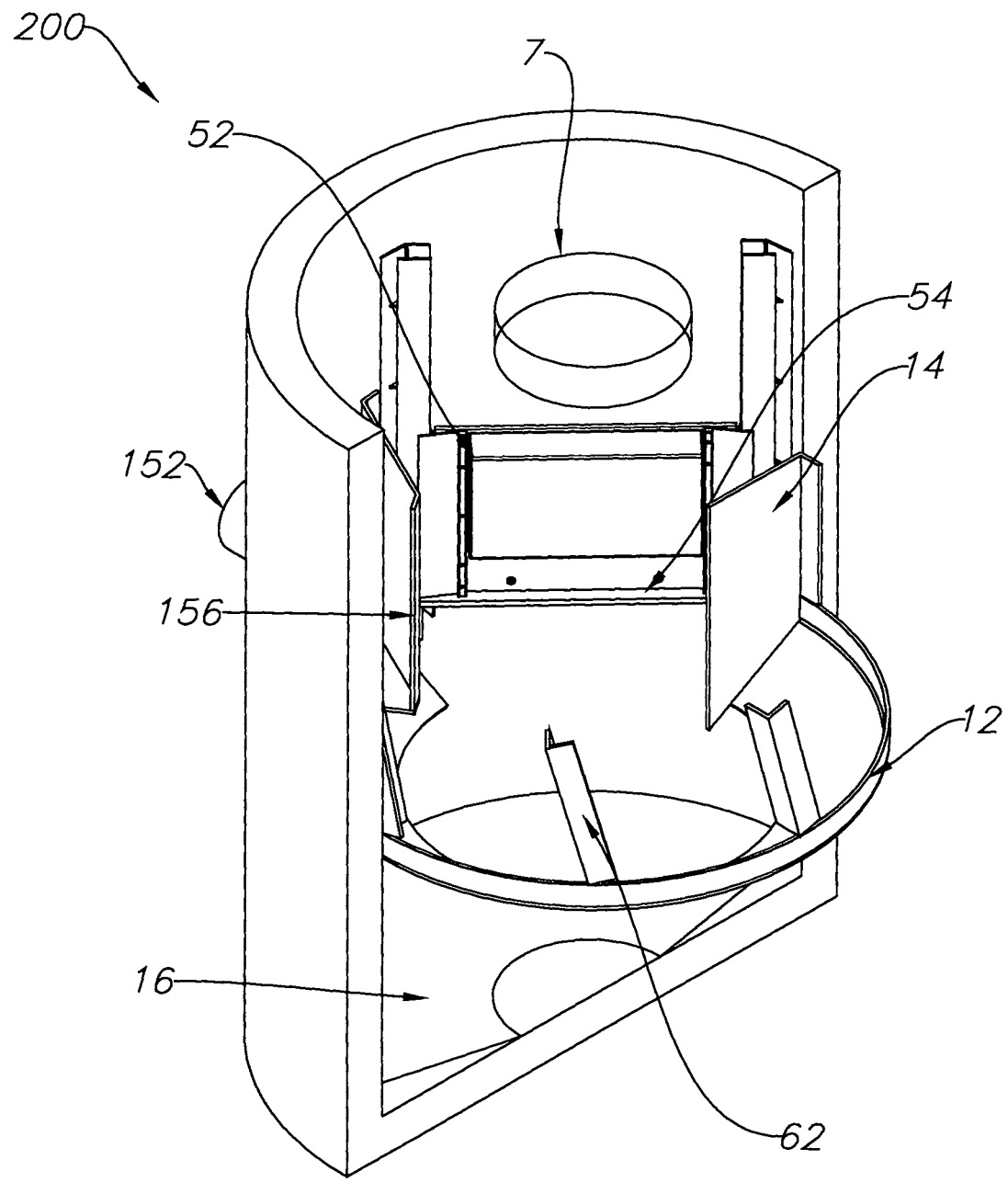
FIG. 20B is partial cut-away perspective view of the cylindrical vault/system of FIG. 20 and FIG. 20A.
Figure 20C:
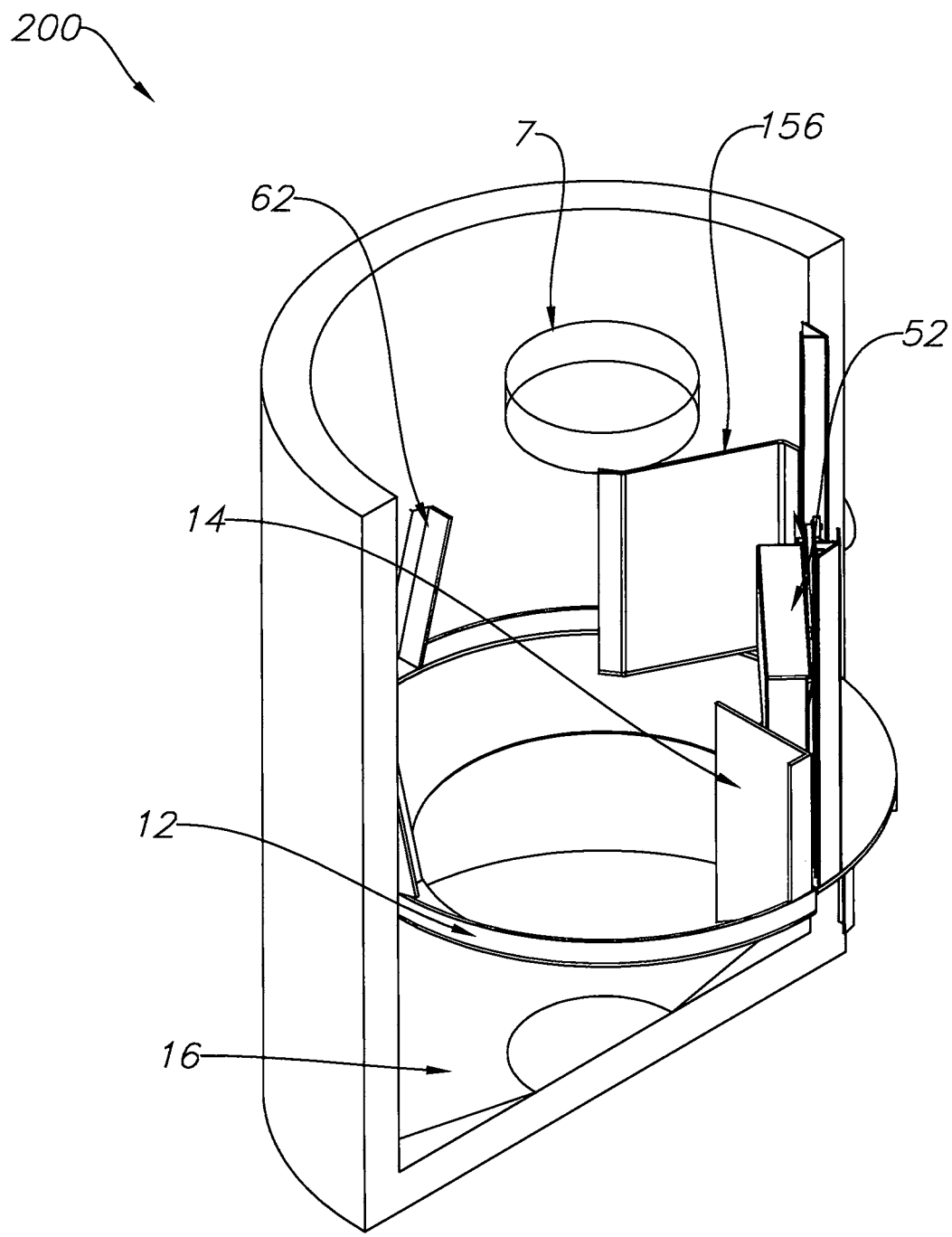
FIG. 20C is another partial cut-away perspective view of the cylindrical vault/system of FIG. 20 and FIG. 20A.

Twentieth Embodiment Cylindrical Vault/System with Inflow and Outflow Ports on Same Side, Single Direction Inflow Deflector, Horizontal Deflector, High Profile Vertical Baffle, Angled Low Profile Vertical Baffles and Hydro-Variant Skimmer FIG. 20 is a top view of a twentieth embodiment of a cylindrical vault/system 200 with inflow port 152 and outflow port 154 on same side, single direction inflow deflector 156, horizontal deflector 12, high profile vertical baffle 14, angled low profile vertical baffles 62 and hydro-variant skimmer 52. FIG. 20A is a side cross-sectional view of the cylindrical vault/system 200 of FIG. 20 along arrows 20A. FIG. 20B is partial cut-away perspective view of the cylindrical vault/system 200 of FIG. 20 and FIG. 20A. FIG. 20C is another partial cut-away perspective view of the cylindrical vault/system 200 of FIG. 20 and FIG. 20A.

Referring to FIGS. 20-20C, the twentieth embodiment 200 is similar to the nineteenth embodiment 190 with the exception of substituting angled low profile vertical baffles 62 for low profile vertical baffles 22, which can operate and function as shown and described in reference to FIGS. 6-6D and 13-13C.

Figure 21:
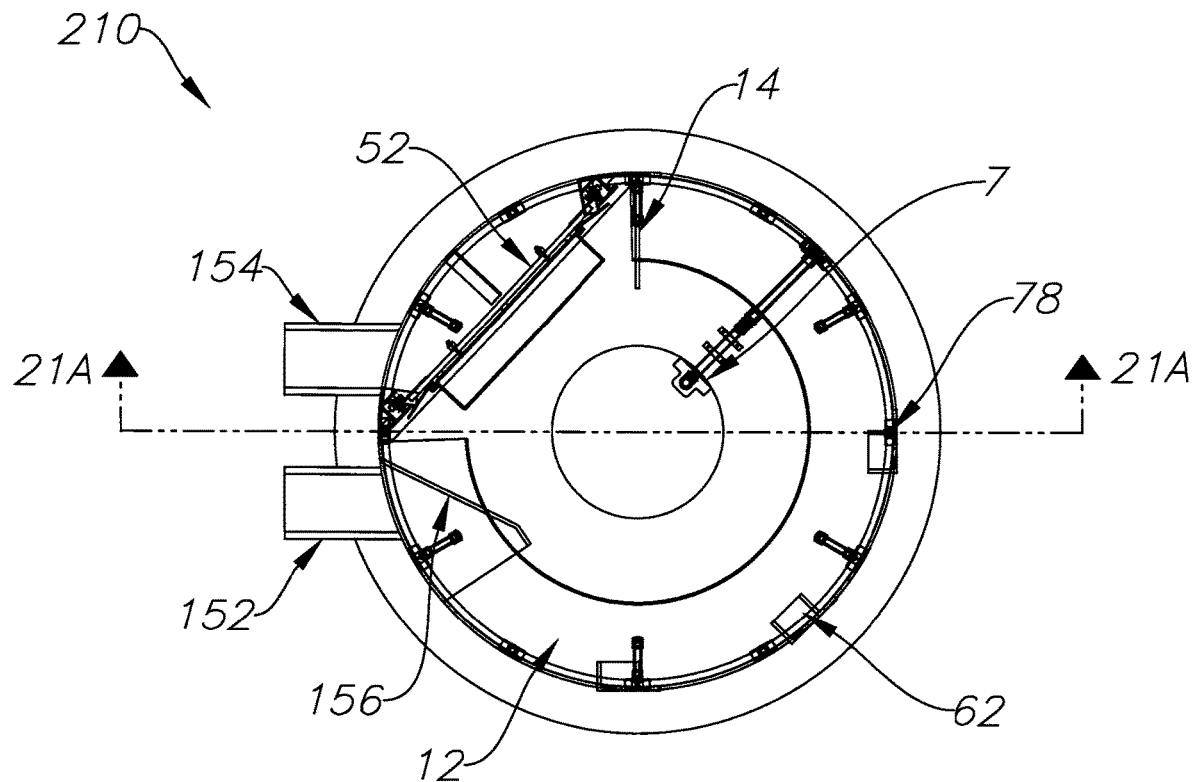
FIG. 21 is a top view of a twenty first embodiment of a cylindrical vault/system with inflow and outflow ports on same side, single direction inflow deflector, horizontal deflector, high profile vertical baffle, angled low profile vertical baffles, hydro-variant skimmer and hydroslide system.
Figure 21A:
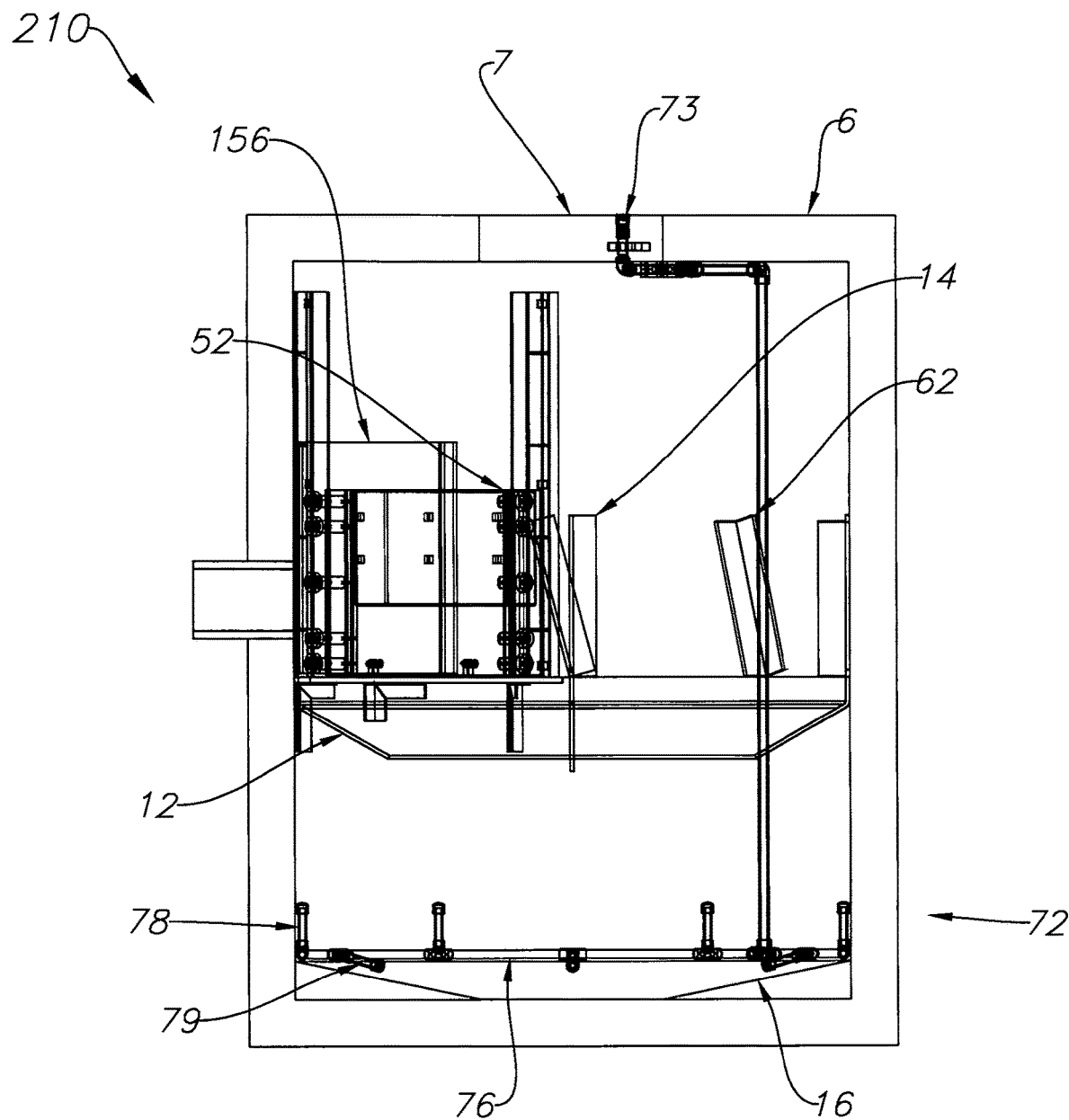
FIG. 21A is a side cross-sectional view of the cylindrical vault/system of FIG. 21 along arrows 21A.
Figure 21B:
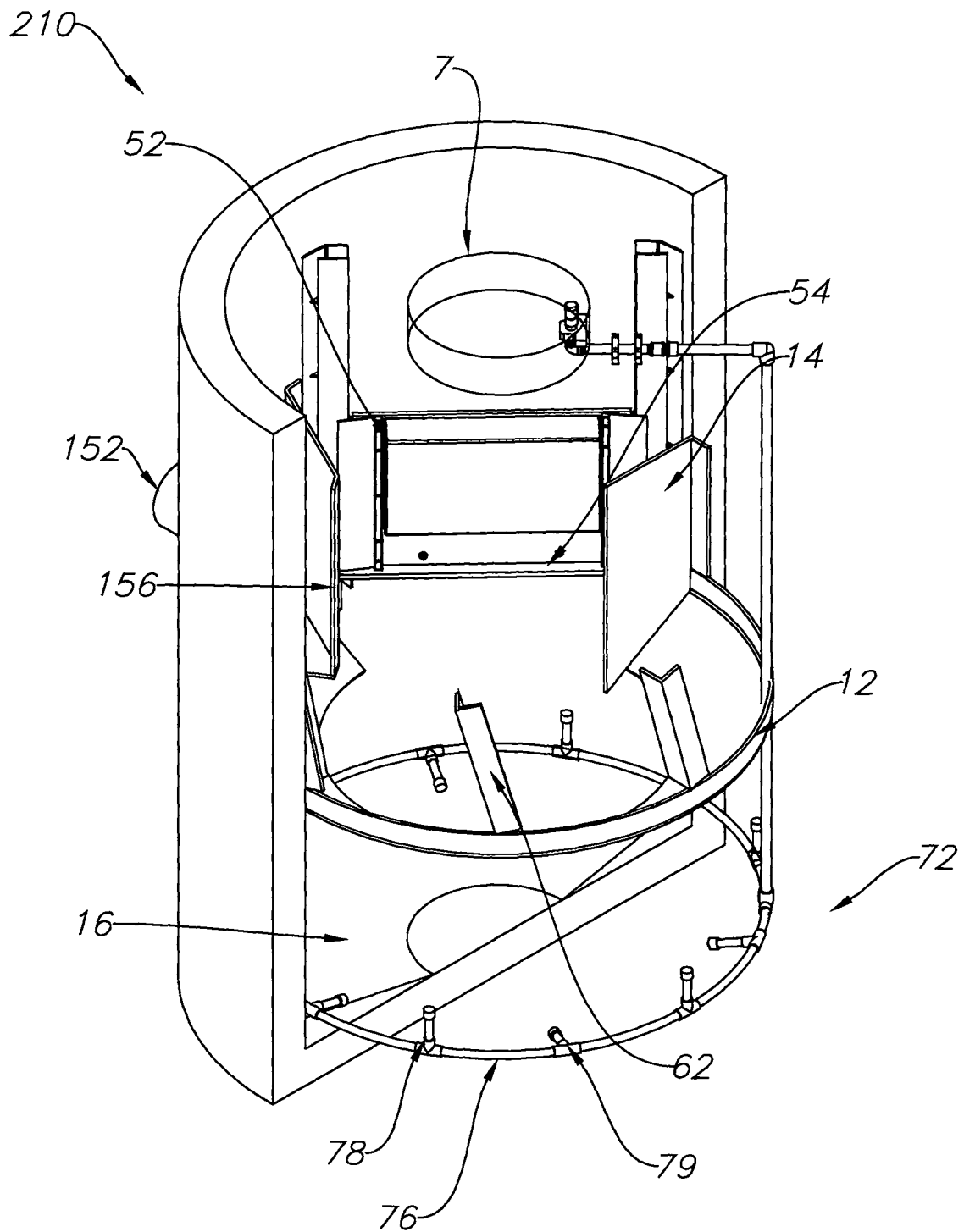
FIG. 21B is partial cut-away perspective view of the cylindrical vault/system of FIG. 21 and FIG. 21A.
Figure 21C:
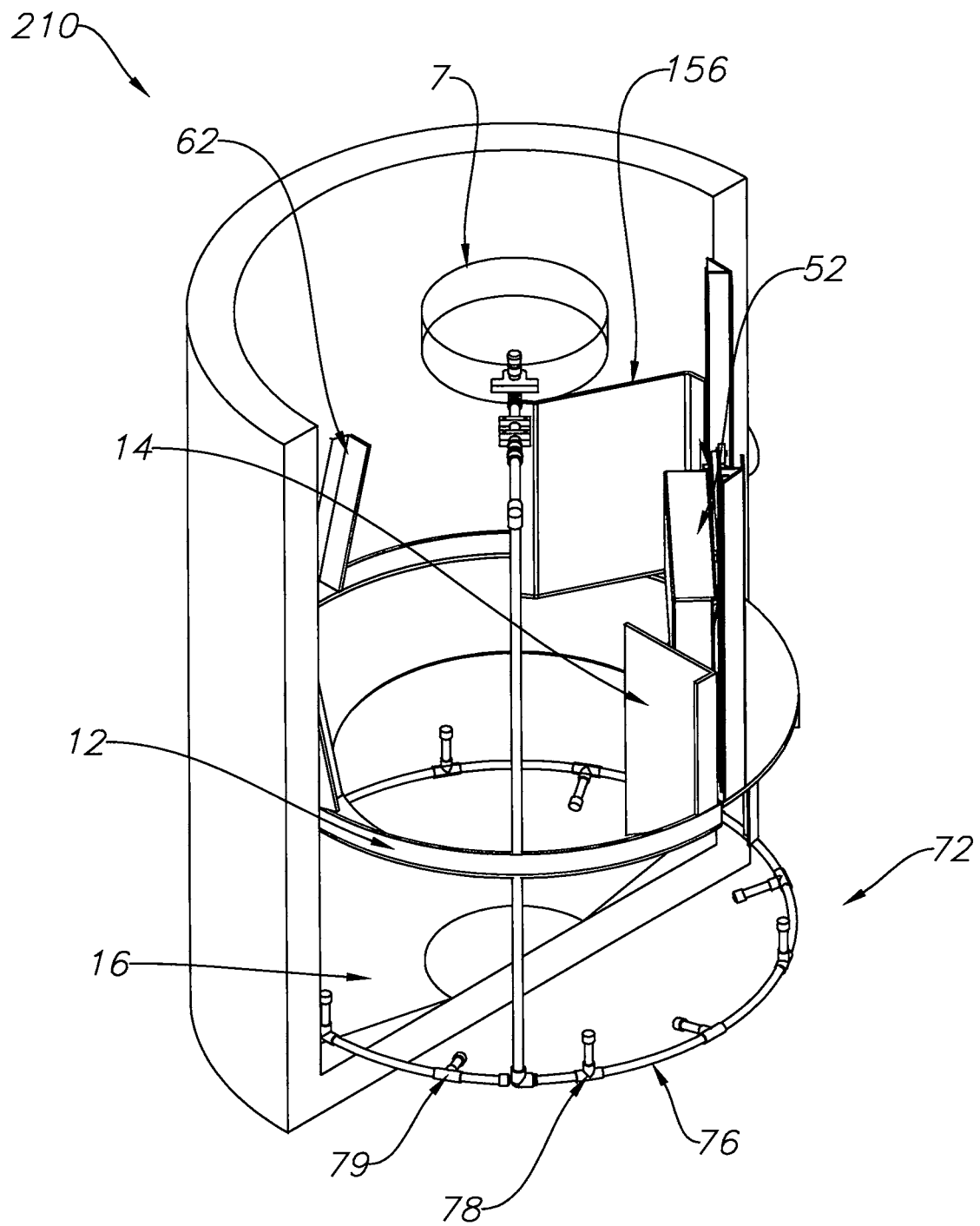
FIG. 21C is another partial cut-away perspective view of the cylindrical vault/system of FIG. 21 and FIG. 21A.

Twenty First Embodiment Cylindrical Vault/System with Inflow and Outflow Ports on Same Side, Single Direction Inflow Deflector, Horizontal Deflector, High Profile Vertical Baffle, Angled Low Profile Vertical Baffles. Hydro-Variant Skimmer and Hydroslide System FIG. 21 is a top view of a twenty first embodiment of a cylindrical vault/system 210 with inflow port 152 and outflow port 154 on same side, single direction inflow deflector 156, horizontal deflector 12, high profile vertical baffle 14, angled low profile vertical baffles 62, hydro-variant skimmer 52 and hydroslide system 72. FIG. 21A is a side cross-sectional view of the cylindrical vault/system 210 of FIG. 21 along arrows 21A. FIG. 21B is partial cut-away perspective view of the cylindrical vault/system 210 of FIG. 21 and FIG. 21A. FIG. 21C is another partial cut-away perspective view of the cylindrical vault/system 210 of FIG. 21 and FIG. 21A.

Referring to FIGS. 21-21C, the twenty first embodiment 210 is similar to the twentieth embodiment 200 with the addition of a hydro-slide system 72 that can operate and function similar to the hydro-slide system 72 shown and described in FIGS. 7-7C and 14-14C.

Figure 22:
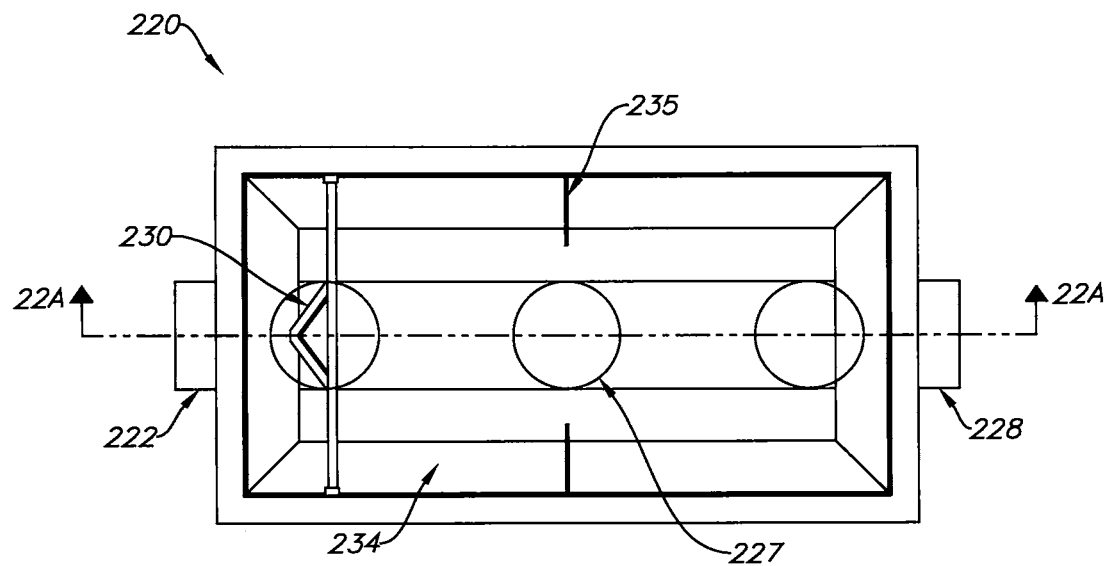
FIG. 22 is a top view of a twenty second embodiment of a rectangular vault/system with inflow deflector, horizontal deflector, high profile vertical baffles, and horizontal deflector.
Figure 22A:
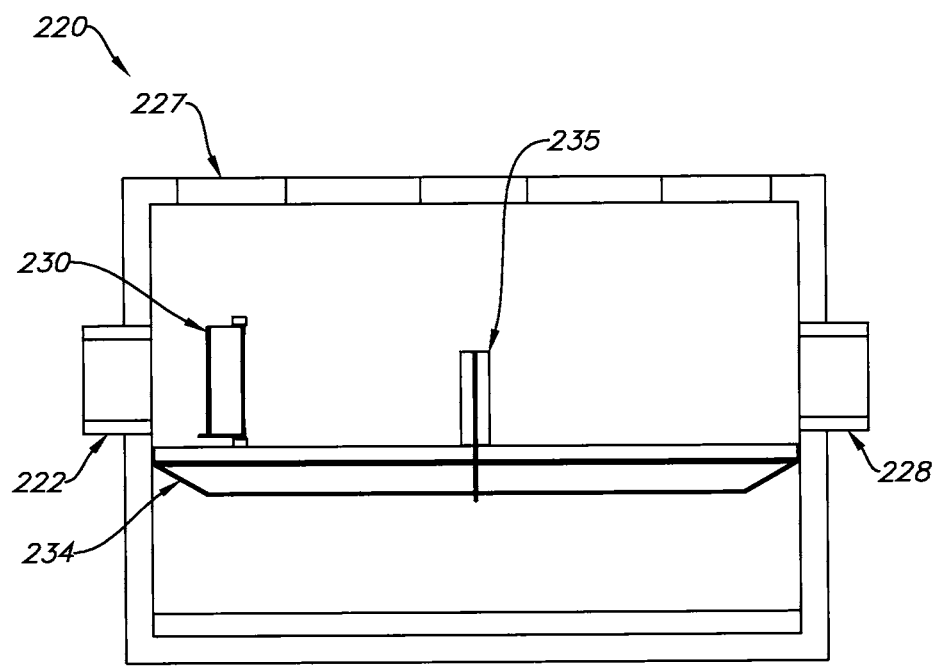
FIG. 22A is a side cross-sectional view of the rectangular vault/system of FIG. 22 along arrows 22A.
Figure 22B:
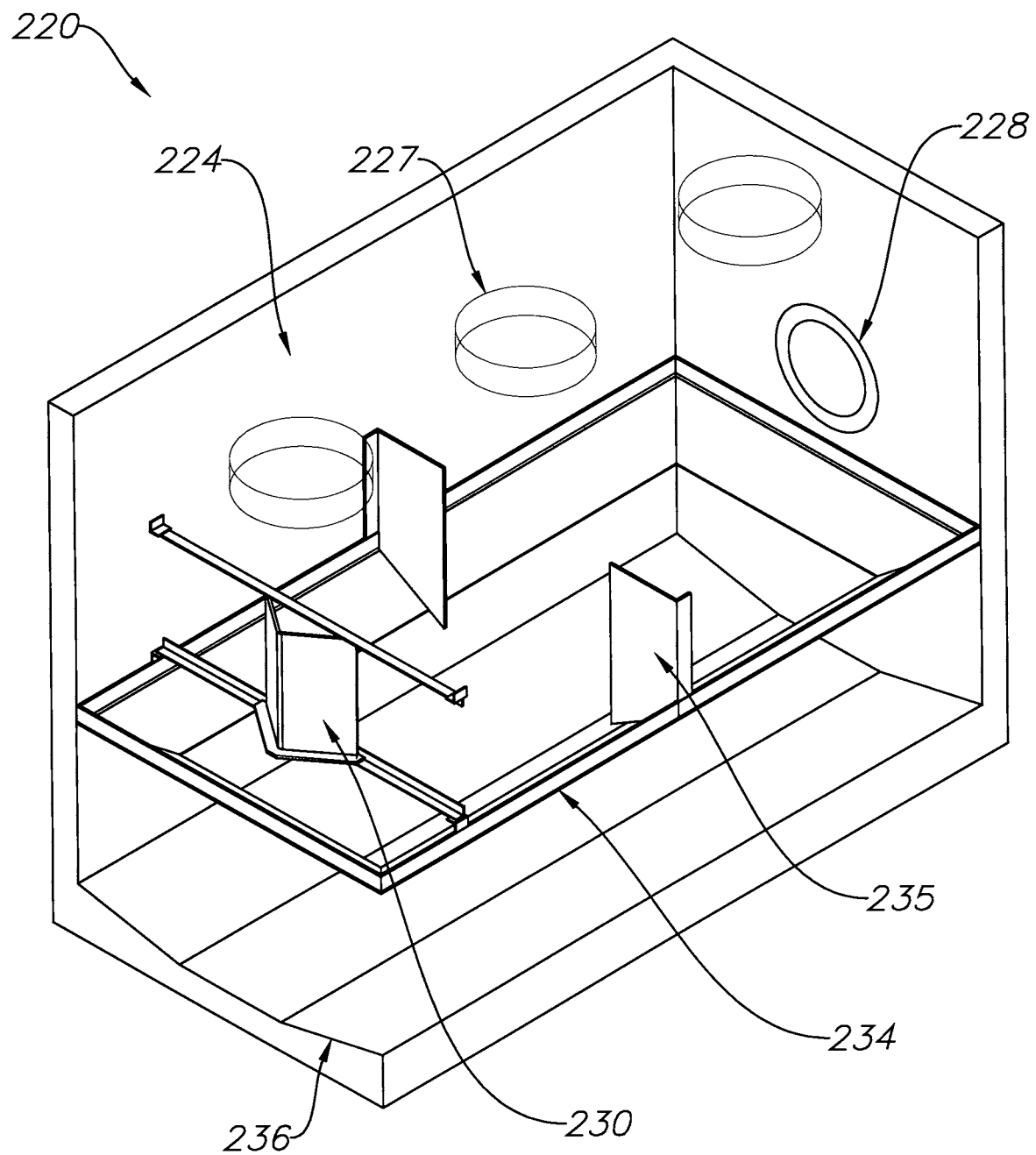
FIG. 22B is partial cut-away perspective view of the cylindrical vault/system of FIG. 22 and FIG. 22A.
Figure 22C:
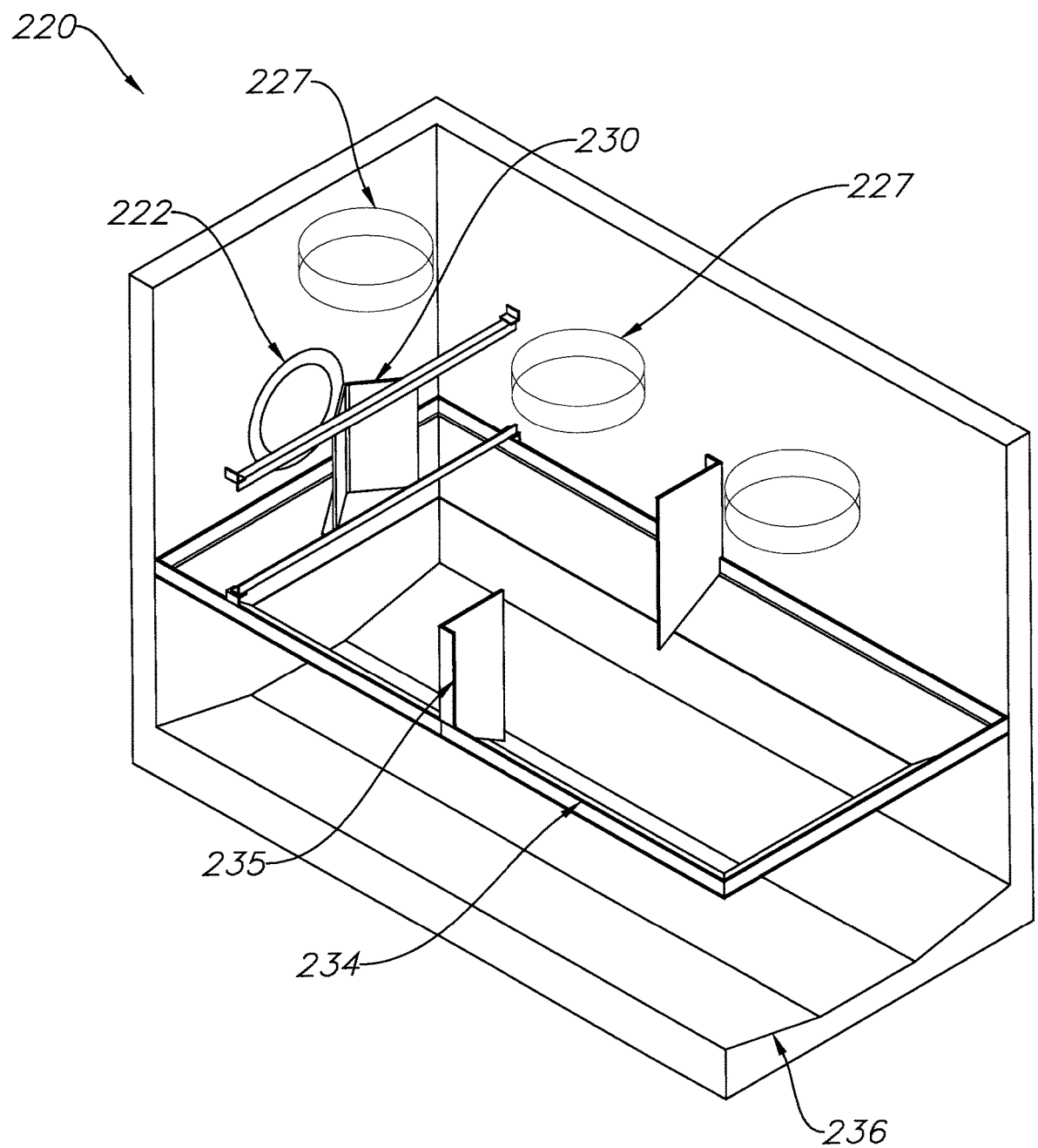
FIG. 22C is another partial cut-away perspective view of the cylindrical vault/system of FIG. 22 and FIG. 22A.

Twenty Second Embodiment Rectangular Vault/System with Inflow Deflector, Horizontal Deflector, High Profile Vertical Baffles and Horizontal Deflector FIG. 22 is a top view of a twenty second embodiment of a rectangular vault/system 220 with inflow deflector 230, horizontal deflector 234, high profile vertical baffles 235, and horizontal deflector 234. FIG. 22A is a side cross-sectional view of the rectangular vault/system 220 of FIG. 22 along arrows 22A. FIG. 22B is partial cut-away perspective view of the cylindrical vault/system 220 of FIG. 22 and FIG. 22A. FIG. 22C is another partial cut-away perspective view of the cylindrical vault/system 220 of FIG. 22 and FIG. 22A.

Referring to FIGS. 22-22C, the rectangular vault/system 220 can include an inflow port 222 which allows storm water to pass therein, and an inflow deflector 230 which can function as a flow spreader (such as 10 shown in the preceding FIGURES). The flow spreader 230 can split the incoming flow into two flow paths that can run about downwardly inclined surfaces of a horizontal deflector 234 having sidewalls 224. High profile vertical baffles 235 can be positioned in the split flow paths on the inclined surfaces of the horizontal deflector 234.

The horizontal deflector 234 can have a central longitudinal opening therein, so that debris can pass downward to a sloped floor 236. Access point(s) 227 can allow for vacuum truck lines that were previously described to remove the debris from the low portions of the sloped floor 236. The treated stormwater can flow can end of passing out of the outflow pipe/line 228.

Similar to the previous embodiments, the rectangular vault/system 220 can also include low profile vertical baffles, angled low profile vertical baffles, bottom open skimmers, flow restricted skimmers, hydro-variant skimmers, and a hydro-slide systems that were described above in previous embodiments.

Lighter than water liquids such as oils and other petroleum products is a primary pollutant of concern. The embodiments described above can make use of hydrocarbon absorption booms that float at the surface of the water within the water treatment system. The absorption booms that can be used can include those described in U.S. patent application Ser. No. 15/948,011 filed Apr. 9, 2018 to Happel, and U.S. patent application Ser. No. 15/686,931 filed Aug. 25, 2017, which are both incorporated by reference in their entirety.

The material used to fill these booms can absorb these pollutants on contact and will not leach them back out over time. These booms can be leashed to an attachment point adjacent to the access opening and left to randomly float around within the invention. To replace the booms a service technician can easily reach the end of the leash from the access opening, and then lift the booms out of the vault using the leash. After servicing the rest of the vault is complete, a new boom can be attached to the attachment point.

Below is a List of Various Problems that can be Solved by the Invention:

1. Problem: As stormwater flow enters a stormwater treatment system the velocity of the incoming water flow is relatively high and can create significant turbulence within the treatment system. This turbulence can cause pollutants not to settle into the lower settling zone and for previously settled debris in the settling zone to resuspend and escape the treatment system.

Solution: The inflow deflector in the invention, which is located adjacent to the inflow of the treatment system, will immediately redirect of the water flow reducing the velocity of the water flow. This redirection of the water flow combined with the much greater cross-sectional area of the vault than the inflow pipe, will greatly reduce the linear velocity of the water flow. The width of the treatment system is significantly wider than the inflow opening. Calming the stormwater flow will avoid the potential for previously pollutants to re-suspend and enable pollutants entering the treatment system to continue to accumulate in the settling chambers.

2. Problem: Litter, foliage, and hydrocarbons such as oils are regarded as primary pollutants of concern. These pollutants are referred to as floatables because they are initially buoyant when they enter a stormwater drain pipe. Being able to capture and retain these pollutants within the water treatment system is important.

Solution: The skimmer positioned adjacent to the outflow opening of the invention will prevent the conveyance of floatables from the invention. Although the floatables are blocked by the skimmer from being conveyed out of the vault, water flow will continue to pass under the lower edge of the skimmer. In addition, the hydrocarbon absorption booms positioned in the vault will absorb and retain oils for easy disposal during servicing. Thus, the water is not able to convey these pollutants downstream.

3. Problem: The debris that has previously settled into the lower settling zone during prior rain events needs to be retained and not allowed to scour or re-suspend. If this collected debris is agitated during high flowing rain events, this debris could be conveyed out of the treatment system. Due to the nature of debris that may collect in the lower settling zone, a small amount of turbulence can cause significant re-suspension.

Solution: A horizontal deflector will be position below the flow line between the inflow and outflow openings, and along the side wall of the invention. The function of the horizontal deflector of the invention is to encourage the settling of debris in the lower settling zone while blocking turbulence from entering the settling zone. The horizontal deflector is lower than both the inflow and outflow openings of the vault, extends from the side wall toward the center of the round treatment vault, and wraps around the vault along the side wall. In addition, it is angled downward from the side walls. The angled surface also creates a hydraulic relief which encourages debris to move downward within the vault. Because upflow currents are minimized within the treatment vault, and the horizontal deflector is substantially lower in elevation than the outflow opening, debris that engages the deflector will continue downward into the settling zone of the treatment system. The horizontal deflector extends a limited distance from the side wall so that a vacuum service truck has easy access into the lower settling zone.

4. Problem: As water flow enters the vault of the invention it is redirected along the side wall of the vault. Although the inflow deflector has significantly reduced the linear flow velocity as the flow enters the vault, there still remains significant velocity. Because the vault is round and the flow is directed along the side wall, the flow is being continuously accelerated along the side wall toward the center of the vault. It is important to slow the velocity to create calm and to prevent the water flow from quickly reaching the skimmer where pollutants may escape. Creating detention time and calm within the vault is an important factor with enhancing the removal efficiency for pollutants.

Solution: Vertical baffles positioned along the side wall of the vault eliminates the velocity and water flow along the side wall, and redirects the flow away from the skimmer. These vertical baffles are positioned above the horizontal deflector. The vertical baffles are divided into 2 categories which are visually apparent based on the distance that the baffles extend from the side wall toward the center of the vault. As the flow leaves the vicinity of the inflow deflector, the flow will first make contact with 1 or more low profile baffles. These low-profile baffles will typically extend just a short distance from the side wall. The low-profile baffles are relatively easy for the water flow to flow around, however, they convey significant resistance to the flow such that they effectively reduce the linear velocity of the flow. In addition, these low-profile baffles can be angled so as to direct the water flow with the debris contained therein downward toward the horizontal deflector. After the water flow has passed the low-profile baffles, the flow engages a high-profile baffle. The high-profile baffles extend a greater distance from the side wall of the vault than the low-profile baffles. The high-profile baffles are sufficiently sized to turn and redirect the water flow toward the center of the vault. However, the high-profile baffles do not extend into the space adjacent to the center of the vault. The center of the vault is left open so that the cross-sectional conveyance at the center is maximized, and so that a substantial open space in the center of the vault is available for servicing.

5. Problem: Debris that is heavier than water such as sediments, liter, and foliage need to be retained within the treatment system in the lower settling zone of the invention. However, for this to happen this debris needs to be influenced to settle downward into the settling zone of the treatment system. Gravity will act on the debris while water turbulence tends to continuously mix the debris throughout the water column in the vault. Solution: The water flowing along the side wall will flatten against the wall, and in doing so the flow and the debris contained therein will have a tendency to be influenced downward. The horizontal deflector positioned along the side wall and below the inflow and outflow openings is angled downward toward the center of the vault. Debris that engages the horizontal deflector will have a tendency to continue to settle into the lower settling zone of the treatment system. Vertical baffles positioned along the side wall of the vault and above the horizontal deflector eliminate the velocity of water flow along the side wall, and redirects the flow away from the skimmer. These vertical baffles can be angled downward from the direction of water flow. The angling of the vertical baffles will have a tendency to direct debris downward onto the horizontal deflector which is substantially below the elevation of the outflow opening. The vertical baffles and the position and shape of the horizontal deflector combine to influence debris to settle into the lower settling zones.

6. Problem: Floating debris and lighter than water liquids such as oils, foliage, and litter will enter the vault of the invention as a part of the stormwater flow. Capturing and retaining these pollutants is an important part of the required of the water treatment requirements.

Solution: Positioning a skimmer in front of the outflow opening within the invention will prevent floating debris and lighter than water liquids from escaping. An opening below the lower edge of the skimmer will act as a conveyance for water flow. Because floating pollutants will be concentrated near the top of the HGL which is substantially higher in elevation than the lower edge of the skimmer, the skimmer will act as a barrier to prevent the passage of pollutants while cleaner water flows under the skimmer and exits though the outflow opening.

7. Problem: Increasing water detention time within the invention will increase the removal efficiency of pollutants contained therein. Water that enters and then quickly exits a treatment system will experience less treatment time resulting with less pollutant removal.

Solution: A flow restricted skimmer positioned in front of the outflow opening of the invention will have the capability of being able to restrict the flow volume. The advantage of a skimmer being able to restrict the flow is that the detention time of the water within the invention will be increased. Increasing the detention time of the water within the invention will also increase the pollution removal efficiency. For the invention to restrict the water flow, a flat impervious shelf can be positioned under the skimmer so that the shelf extends fully underneath the skimmer. A gap of limited size and cross-sectional area will extend between the bottom edge of the skimmer and the top of the shelf. The size of this gap will be determined based on the size of the vault and anticipated water flow rates. The sizing of the gap will be such that the HGL within the vault will substantially elevated for medium to high water flow rates without impacting low flow rates. The elevated HGL within the treatment system will substantially increase the cross-sectional conveyance within the vault which will cause the turbulence to reduce. The results of a flow restricted skimmer are greater water detention time within the vault, turbulence reduction which will enhance the settling of debris into the lower settling zone, and floating pollutants will not be able to exit the treatment system.

8. Problem: Many types of water treatment systems make use of a diversion vault that directs water flow away from a primary water pipe toward a treatment system which is positioned out of the line of full flow, commonly referred to as an off-line treatment system. During sufficiently high flowing rain events the diversion weir can be topped by water flow which will end all water treatment. A flow restricting skimmer creates greater detention time within a treatment system which causes the HGL on the upstream side of the skimmer to be higher in elevation than the HGL on the lower side of the skimmer. This higher HGL will be transferred upstream into a diversion vault which will cause the diversion weir to be topped at lower flow rates.

Solution: A hydro-variant skimmer system positioned in front of the outflow opening of the treatment vault will enable greater water flows to be treated before the diversion weir is topped by water flow. The hydro-variant skimmer system will have the ability to automatically adjust vertically with the changing HGL within the invention. During low to medium flows the gap between the bottom edge of the skimmer the horizontal shelf will be minimal to maximize detention time in the vault for greater pollutant removal. During higher flowing events the skimmer panel will automatically adjust with the HGL to increase the gap between the bottom of the skimmer and the shelf. A larger gap will flow more water which will enable greater flows to receive treatment before the diversion weir is topped. The results of a hydro-variant skimmer system are greater water detention time within the vault, turbulence reduction which will enhance the settling of debris into the lower settling zone, floating pollutants will not be able to exit the treatment system, and greater water flow can receive treatment before an associated upstream diversion weir is topped.

9. Problem: Lighter than water liquids such as oils are a part of stormwater runoff and are a primary pollutant of concern. When oils are prevented from being conveyed by a skimmer, over time oils can mix with water and gradually escape a treatment system.

Solution: The invention can make use of hydrocarbon absorption booms that float at the surface of the water within the water treatment system. The material used to fill these booms will absorb these pollutants on contact and will not leach them back out over time. These booms can be leashed to an attachment point adjacent to the access opening and left to randomly float around within the invention.

10. Problem: A skimmer that restricts the water flow in front of the outflow opening will increase detention time within a stormwater treatment vault. Greater detention time will increase the removal efficiency of a treatment system. Restricting the water flow also means conveying the water flow through a relatively small opening. Debris that is common to stormwater can clog this small opening and prevent any water from being conveyed. When the opening is clogged and no water is flowing out the outflow opening of the treatment system, treatment of the water flow will end until a service technician unclogs the opening.

Solution: A hydro-variant skimmer system positioned in front of the outflow opening within the treatment vault will enable the flow restriction under the skimmer to open wider if the HGL increases in elevation because of debris that may clog the opening. When the skimmer floats upward any debris that may have been clogging the conveyance under the skimmer will flush through and the conveyance will no longer be clogged. Once flow is restored, the HGL will lower back down and the constriction under the skimmer will once again maximize detention and the removal of pollutants.

11. Problem: The ability to service a stormwater treatment system quickly, easily, and safely is an important consideration. A stormwater treatment system's primary function is to capture and retain pollutants of concern over a period of time. Periodically a treatment system must be serviced which involves removing and properly disposing the captured pollutants. Typically, this involves a vacuum service truck and associated service crew. The equipment and service crew costs are significant and are generally proportional to the time that it takes to perform the servicing. The longer it takes to perform the service work the more the cost per servicing. If the service work is difficult to perform the technicians performing the servicing may not do a good job. Another issue with regard to servicing a water treatment vault is safety concerns and having to deal with the confined space within a vault. It is ideal to not require service personnel to enter the confined space of a vault. The protocols set OSHA for personnel to enter into the confined space of a vault is cumbersome, time consuming, and expensive.

Solution: A high-pressure water spray servicing system can be adapted to the treatment system. This high-pressure spray system will significantly reduce the required servicing time of the invention, all the collected pollutants will be removed, and service technicians do not need to enter the vault to do the service work. High-pressure pipe can be used to convey water at high-pressure from a water source outside the vault into the lower settling zone of the invention. A spray bar can be arranged around the perimeter of the settling zone where the floor meets the side walls. The spray bar will have a series of nozzles aimed toward the center of the vault and the water jets from the nozzles will be parallel with the floor of the vault. When the water spray servicing system is activated the spray nozzles will jet water at high-pressure toward the center of the vault and drive the debris within the vault toward the center. The debris will be liquefied into a slurry and the kinetic energy of the high-pressure water jets will push the debris toward the center. A vacuum service line in the center of the vault will remove the debris as it is pushed to the center of the vault. In addition to the water jets influencing the movement of the debris toward the center, the floor of the vault can be sloped downward from the side wall to the center of the vault.

12. Problem: The use of a high-pressure spray system as described in the before mentioned problem can potentially undermine debris within a settling zone of a treatment system without effecting the debris slightly above the floor of the vault. Debris that typically settles into a lower settling zone of a water treatment system may become compacted with significant structural strength. Because the debris can become structural and supported by being braced against the side wall, potentially, the water jets directed from the side wall toward the center of the vault can undermine the collected debris without the debris above collapsing downward. If such a scenario occurs the high-pressure spray system will become ineffective.

Solution: The high-pressure water spray servicing system can be enhanced by adding vertical spray bars to vertical slices through the debris that settles in the settling zone. These vertical slices will sufficiently weaken the structural strength of the debris casing it to collapse to the floor where the horizontal spray jets along the floor can drive it toward the vacuum service line.

13. Problem: During the installation of the before mentioned highpressure spray servicing system it is important for the nozzles along the floor spray bars be aimed perfectly parallel with the floor for maximum effectiveness. If the nozzles are aimed too high, they will not be able to impact the debris closer to the floor. If the nozzles are aim too low, the water jets will hit onto the floor and the kinetic energy of the water jets will be lost to the floor. Keeping the nozzles and their associated water jets parallel to the floor will enable optimal operation of the servicing system. In addition, the time it takes to install and correctly aim the nozzles are long and the task of aiming is difficult.

Solution: To aid with speeding up the installation of the high-pressure spray service system and ensure that the nozzles are aimed parallel with the floor. Aiming levers can be a part of the spray bars. These aiming levers will a part of the spray bar along the perimeter of the vault such that they extend from the spray bar in the direction in which the nozzles are aimed. During the installation of the spray bars the aiming levers will be press flat to the floor of the vault. Because the aiming levers are manufactured parallel with the aim of the nozzles, and then positioned so that the levers are flat onto the floor, the nozzles will always be aimed parallel with the floor. Being able to install the high-pressure spray system quickly and accurately will save time, money, and ensure an accurate installation.

Although the drawing figures show the horizontal deflector having a horizontal funnel shaped surface that can angle downward from the sidewalls of the vault to a central opening, the horizontal deflector can have a flat level and non-angled surface.

While the vertical baffles shown in the drawing figures extend upward from the horizontal deflector, the vertical baffles can also have portions that extend below the horizontal deflector.

Although specific advantages have been enumerated above, various embodiments may include some, none, or all of the enumerated advantages.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A vertical cylinder shaped stormwater treatment system comprising:
   a vertically oriented cylindrical shaped vault with a floor, the vault having an inflow portal for receiving water flow into the vault and an outflow portal for directing treated storm water out of the vault;
   a flow deflector inside the vault adjacent to the inflow portal, the flow deflector redirects the water flow so that a redirected water flow path will flow along an interior sidewall of the vault;
   a generally horizontal shelf deflector positioned below water elevation levels of the inflow and outflow portals, the generally horizontal shelf deflector extends inward from the interior sidewall of the vault partially toward a center of the vault, and has a substantial length along the interior sidewall of the vault;
   at least one vertical baffle extending above the horizontal shelf deflector, and is positioned in the redirected flow path between the inflow and outflow portals, and extends from the side wall of the vault toward the center of the vault;
   a settling chamber below the horizontal shelf deflector that acts as a settling zone for debris that are heavier than water; and
   a central opening through the horizontal shelf deflector for accessing and removing debris that has settled into the lower settling chamber of the vault.

2. The stormwater treatment system of claim 1, wherein the horizontal shelf deflector is angled downward from the interior sidewall of the vault toward the central opening in the horizontal shelf deflector.

3. The stormwater treatment system of claim 1, further comprising:
   a skimmer adjacent to the outflow portal of the vault, whereby the treated water passes under the skimmer to exit out of the outflow portal of the vault.

4. The stormwater treatment system of claim 1, further comprising:
   a skimmer adjacent to the outflow portal of the vault, the skimmer having a moveable skimmer panel with a lower edge and an adjacent horizontal shelf, and a gap between the lower edge of the moveable skimmer panel and the horizontal shelf, wherein the gap restricts the flow of the treated water, such that gap size and associated hydraulic conveyance through the gap will adjust when the movable skimmer panel floats upward with a hydraulic grade line within the vault.

5. The stormwater treatment system of claim 1, further comprising:
   a spray servicing system within the lower settling chamber, whereby, water under high pressure is conveyed from a source outside the vault to a spray bar system that has nozzles along a perimeter of the floor of the vault that are aimed toward the center of the vault, such that water jets will liquify and flush debris that has settled toward the center of the vault.

6. The stormwater treatment system of claim 1, wherein the inflow portal and the outflow portal are oriented at less than approximately 180 degrees apart from one another in the vault.

7. The stormwater treatment system of claim 1, wherein the flow deflector inside the vault adjacent to the inflow portal splits the water flow into first and second flow paths that each pass along opposite interior sidewalls of the vault, and the at least one vertical baffle includes a first vertical baffle extends above the horizontal deflector shelf in the first flow path and a second vertical baffle extends above the horizontal deflector shelf in the second flow path.

8. A vault type storm water treatment system having specialized features comprising:
   a vertically oriented cylindrical shaped vault with a floor, the vault having an inflow portal for receiving water flow into the vault and an outflow portal for directing treated storm water out of the vault;
   a flow deflector inside the vault adjacent to the inflow portal, the flow deflector redirects the water flow so that a redirected water flow path will flow along an interior sidewall of the vault;
   a generally horizontal shelf deflector positioned below water elevation levels of the inflow and outflow portals, the generally horizontal shelf deflector extends inward from the interior sidewall of the vault partially toward a center of the vault, and has a substantial length along the interior sidewall of the vault;
   at least two different height sizes of vertical baffles that extend above the horizontal shelf deflector, the vertical baffles including at least one baffle larger in height than a smaller height baffle, the vertical baffles being positioned in the redirected flow path between the inflow and outflow portals, the vertical baffles each extend from the side wall of the vault toward the center of the vault, whereby at least one vertical baffle extends a substantially greater distance from the side wall of the vault toward the center of the vault than at least one other vertical baffle, and the smaller height baffle is positioned between the inflow portal and the larger baffle;
   a settling chamber below the horizontal shelf deflector that acts as a settling zone for debris that are heavier than water; and
   a central opening through the horizontal shelf deflector for accessing and removing debris that has settled into the lower settling chamber of the vault.

9. The stormwater treatment system of claim 8, wherein the horizontal shelf deflector is angled downward from the interior sidewall of the vault toward the central opening in the horizontal shelf deflector.

10. The stormwater treatment system of claim 8, further comprising:
    a skimmer adjacent to the outflow portal of the vault, whereby the treated water passes under the skimmer to exit out of the outflow portal of the vault.

11. The stormwater treatment system of claim 8, further comprising:
    a skimmer adjacent to the outflow portal of the vault, the skimmer having a moveable skimmer panel with a lower edge and an adjacent horizontal shelf, and a gap between the lower edge of the moveable skimmer panel and the horizontal shelf, wherein the gap restricts the flow of the treated water, such that gap size and associated hydraulic conveyance through the gap will adjust when the movable skimmer panel floats upward with a hydraulic grade line within the vault.

12. The stormwater treatment system of claim 8, further comprising:
    a spray servicing system within the lower settling chamber, whereby, water under high pressure is conveyed from a source outside the vault to a spray bar system that has nozzles along a perimeter of the floor of the vault that are aimed toward the center of the vault, such that water jets will liquify and flush debris that has settled toward the center of the vault.

13. A vertical cylinder shaped stormwater treatment system comprising:
- a vertically oriented cylindrical shaped vault with a floor, the vault having an inflow portal for receiving water flow into the vault and an outflow portal for directing treated storm water out of the vault;
- a flow deflector inside the vault adjacent to the inflow portal, the flow deflector redirects the water flow so that a redirected water flow path will flow along an interior sidewall of the vault;
- a generally horizontal shelf deflector positioned below water elevation levels of the inflow and outflow portals, the generally horizontal shelf deflector extends inward from the interior sidewall of the vault partially toward a center of the vault, and has a substantial length along the interior sidewall of the vault;
- at least two sizes of vertical baffles extending above the horizontal shelf deflector, and are positioned within the redirected flow path between the inflow and outflow portals, and extend inward from the side wall of the vault toward the center of the vault, whereby at least one vertical baffle extends a substantially greater distance from the side wall of the vault toward the center of the vault than another vertical baffle, and the smaller baffle is positioned within the between the inflow portal and the larger baffle, and at least one of the vertical baffles are angled such that a top of the at least one angled baffle is angled to be upstream from a bottom of the at least one angled baffle;
- a settling chamber below the horizontal shelf deflector that acts as a settling zone for debris that are heavier than water; and
- a central opening through the horizontal shelf deflector for accessing and removing debris that has settled into the lower settling chamber of the vault.

14. The stormwater treatment system of claim 13, wherein the horizontal shelf deflector is angled downward from the interior sidewall of the vault toward the central opening in the horizontal shelf deflector.

15. The stormwater treatment system of claim 13, further comprising:
- a skimmer adjacent to the outflow portal of the vault, whereby the treated water passes under the skimmer to exit out of the outflow portal of the vault.

16. The stormwater treatment system of claim 13, further comprising:
- a skimmer adjacent to the outflow portal of the vault, the skimmer having a moveable skimmer panel with a lower edge and an adjacent horizontal shelf, and a gap between the lower edge of the moveable skimmer panel and the horizontal shelf, wherein the gap restricts the flow of the treated water, such that gap size and associated hydraulic conveyance through the gap will adjust when the movable skimmer panel floats upward with a hydraulic grade line within the vault.

17. The stormwater treatment system of claim 13, further comprising:
- a spray servicing system within the lower settling chamber, whereby, water under high pressure is conveyed from a source outside the vault to a spray bar system that has nozzles along a perimeter of the floor of the vault that are aimed toward the center of the vault, such that water jets will liquify and flush debris that has settled toward the center of the vault.

* * * * *